United States Patent
Clarkson et al.

(10) Patent No.: US 10,294,775 B2
(45) Date of Patent: *May 21, 2019

(54) DOWNHOLE COMMUNICATION

(71) Applicant: Weatherford Technology Holdings, LLC, Houston, TX (US)

(72) Inventors: Hugh Clarkson, Aberdeenshire (GB); Daniel George Purkis, Aberdeenshire (GB); Matthew Knight, Aberdeenshire (GB)

(73) Assignee: Weatherford Technology Holdings, LLC, Houston, TX (US)

( * ) Notice: Subject to any disclaimer, the term of this patent is extended or adjusted under 35 U.S.C. 154(b) by 233 days.

This patent is subject to a terminal disclaimer.

(21) Appl. No.: 14/771,238

(22) PCT Filed: Feb. 28, 2014

(86) PCT No.: PCT/GB2014/050601
§ 371 (c)(1),
(2) Date: Aug. 28, 2015

(87) PCT Pub. No.: WO2014/132078
PCT Pub. Date: Sep. 4, 2014

(65) Prior Publication Data
US 2016/0145999 A1 May 26, 2016

Related U.S. Application Data

(63) Continuation-in-part of application No. 13/800,183, filed on Mar. 13, 2013, now Pat. No. 9,677,397.

(30) Foreign Application Priority Data

Feb. 28, 2013 (GB) .................................. 1303614.0
Mar. 13, 2013 (AU) ................................ 2013201675

(Continued)

(51) Int. Cl.
*G01V 3/00* (2006.01)
*E21B 47/09* (2012.01)
(Continued)

(52) U.S. Cl.
CPC ........ *E21B 47/0905* (2013.01); *E21B 47/122* (2013.01); *G01V 3/10* (2013.01); *G01V 3/30* (2013.01)

(58) Field of Classification Search
CPC ... G01V 3/28; G01V 3/38; G01V 3/18; G01V 3/20; G01V 3/22; G01V 3/24; G01V 3/26;
(Continued)

(56) References Cited

U.S. PATENT DOCUMENTS 4,231,908 A    11/1980   Pennino
4,806,928 A *   2/1989   Veneruso ............... E21B 17/003
                                                                       175/40

(Continued)

FOREIGN PATENT DOCUMENTS

CA        2403948 A1    10/2001
EA      200400234 A1    8/2004

(Continued)

OTHER PUBLICATIONS

Patent Examination Report No. 1 in counterpart Australian Appl. 2015207914, dated Jan. 19, 2016.

(Continued)

*Primary Examiner* — Thang X Le
(74) *Attorney, Agent, or Firm* — Blank Rome, LLP

(57) ABSTRACT

A system or apparatus for use in downhole communication or detection comprises a downhole arrangement defining a throughbore and primary and secondary elements. One of the primary and secondary elements is provided on the downhole arrangement and the other of the primary and (Continued)

secondary elements is provided in the throughbore. The primary and secondary elements are configurable for coupling of an electromagnetic field therebetween. The primary or secondary element which is provided in the throughbore may be provided on a tool such as a shifting tool which is deployable through the throughbore. The secondary element may be configured to provide the electromagnetic field coupled between the first and second elements with one or more characteristic features. The system may be configured for use, in particular though not exclusively, for communicating information to and/or from a downhole tool in an oil or gas well.

19 Claims, 18 Drawing Sheets

(30) Foreign Application Priority Data

| Mar. 13, 2013 | (CA) | 2809026 |
|---|---|---|
| Jun. 7, 2013 | (GB) | 1310183.7 |
| Jun. 7, 2013 | (GB) | 1310219.9 |

(51) Int. Cl.
*G01V 3/10* (2006.01)
*G01V 3/30* (2006.01)
*E21B 47/12* (2012.01)

(58) Field of Classification Search
CPC . G01V 3/30; G01V 3/10; G01V 3/265; G01V 3/02; G01V 3/04; G01V 3/06; G01V 3/104; E21B 47/026; E21B 47/122; E21B 47/0905; E21B 47/09; E21B 47/011; E21B 47/12; E21B 47/101; E21B 47/102; G01N 27/223; G01N 33/246; G01R 27/18; G01R 27/20
USPC .......... 340/853.1–853.9, 854.1–854.1, 340/855.1–855.9, 856.1–856.4; 327/324–375
See application file for complete search history.

(56) References Cited

U.S. PATENT DOCUMENTS

| 5,008,664 | A * | 4/1991 | More ................ E21B 34/16 166/66 |
|---|---|---|---|
| 5,629,621 | A | 5/1997 | Goldfine et al. |
| 5,971,072 | A | 10/1999 | Huber et al. |
| 6,021,095 | A | 2/2000 | Tubel et al. |
| 6,061,000 | A | 5/2000 | Edwards |
| 6,215,304 | B1 | 4/2001 | Slade |
| 6,989,764 | B2 | 1/2006 | Thomeer et al. |
| 7,008,249 | B2 | 8/2006 | Senba et al. |
| 2001/0040507 | A1 | 11/2001 | Eckstein et al. |
| 2002/0167418 | A1 | 11/2002 | Goswami |
| 2004/0060708 | A1* | 4/2004 | Clark ................ E21B 47/01 166/380 |
| 2004/0196047 | A1 | 10/2004 | Fanini et al. |
| 2004/0204856 | A1 | 10/2004 | Jenkins et al. |
| 2005/0288576 | A1 | 12/2005 | Fegert et al. |
| 2006/0254768 | A1* | 11/2006 | De Jesus ........... E21B 47/0905 166/255.1 |
| 2007/0137853 | A1* | 6/2007 | Zhang ............... E21B 47/122 166/65.1 |
| 2007/0256829 | A9* | 11/2007 | Hosie ................ E21B 33/0407 166/250.01 |
| 2008/0053662 | A1 | 3/2008 | Williamson et al. |
| 2008/0202768 | A1 | 8/2008 | Hansen |
| 2009/0066535 | A1 | 3/2009 | Patel et al. |
| 2009/0085701 | A1* | 4/2009 | Veneruso ........... E21B 47/122 336/92 |
| 2009/0151932 | A1 | 6/2009 | Hall et al. |
| 2009/0195244 | A1* | 8/2009 | Mouget ............. G01V 3/28 324/221 |
| 2011/0260715 | A1 | 10/2011 | Prost et al. |
| 2013/0048269 | A1* | 2/2013 | Tarayre ............. E21B 47/122 166/65.1 |
| 2013/0057364 | A1 | 3/2013 | Kesler et al. |
| 2013/0120093 | A1 | 5/2013 | Deville et al. |
| 2013/0192851 | A1* | 8/2013 | Algeroy ............ E21B 47/122 166/382 |
| 2014/0111347 | A1* | 4/2014 | Slapal .............. E21B 47/122 340/854.6 |
| 2014/0266210 | A1* | 9/2014 | Godager ........... G01V 3/34 324/323 |
| 2016/0268041 | A1* | 9/2016 | Deville ............. H01F 38/14 |

FOREIGN PATENT DOCUMENTS

| EA | 200700517 A1 | 12/2007 |
|---|---|---|
| EP | 0299863 B1 | 2/1998 |
| RU | 2262598 C2 | 10/2005 |
| RU | 2273868 C2 | 4/2006 |
| SU | 1372386 A1 | 2/1988 |
| WO | 01/73423 A1 | 10/2001 |
| WO | 01/98632 A1 | 12/2001 |
| WO | 2010/123925 A2 | 10/2010 |

OTHER PUBLICATIONS

GB Search Report in counterpart Appl. GB1303614.0, dated Aug. 21, 2013, 1-pg.
Int'l Search Report in counterpart PCT Appl. PCT/GB2014/050601, dated Dec. 3, 2014, 4-pgs.
Examination Report received in counterpart GCC Appl. GC 2014-26558, dated Nov. 15, 2018, 3 pages.
Search Report in counterpart EP Appl. EP 18196645.8, dated Dec. 4, 2018, 7-pg.
Communication of Search Report in counterpart EP Appl. EP 18196651.6, dated Dec. 6, 2018, 6-pg.
Office Action in counterpart CA Appl. 2,981,259, dated Feb. 28, 2019, 4-pgs.

* cited by examiner

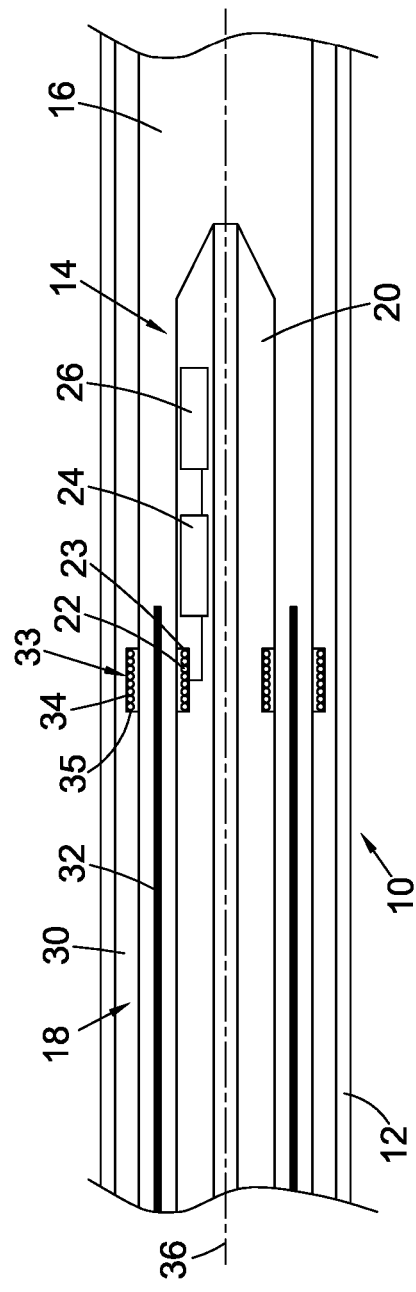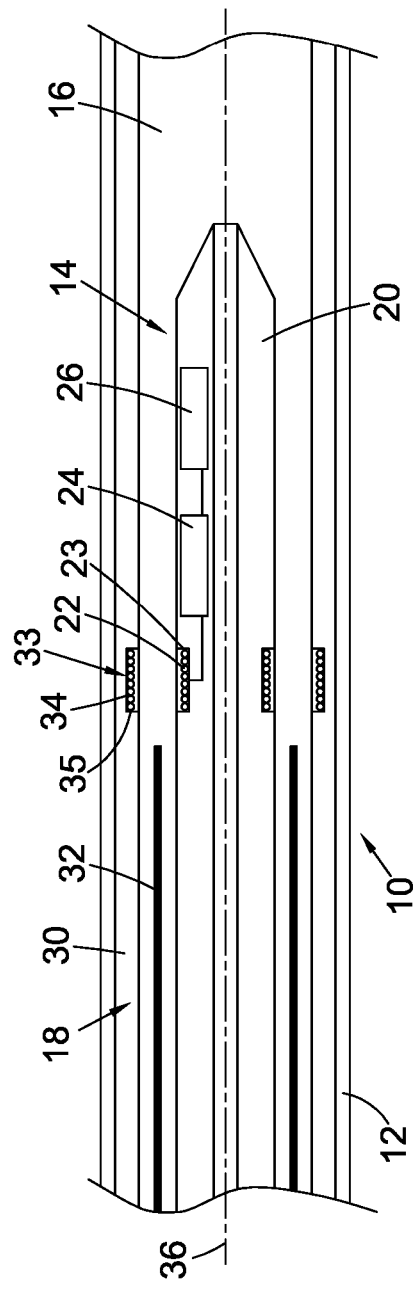

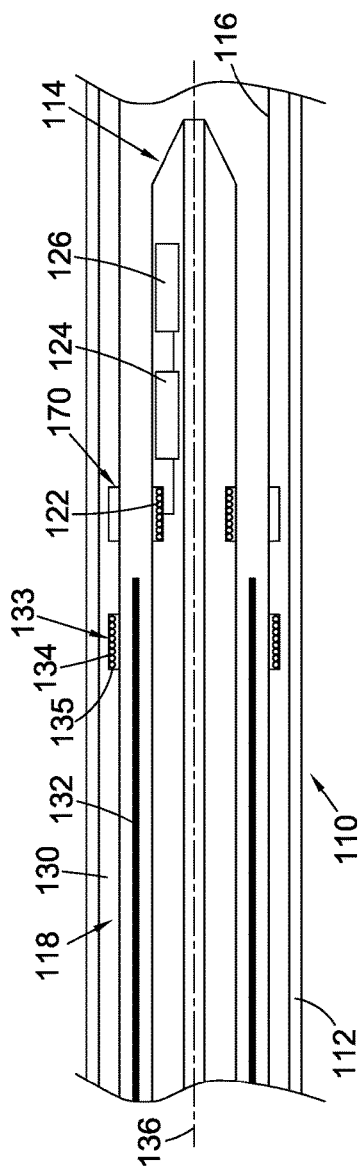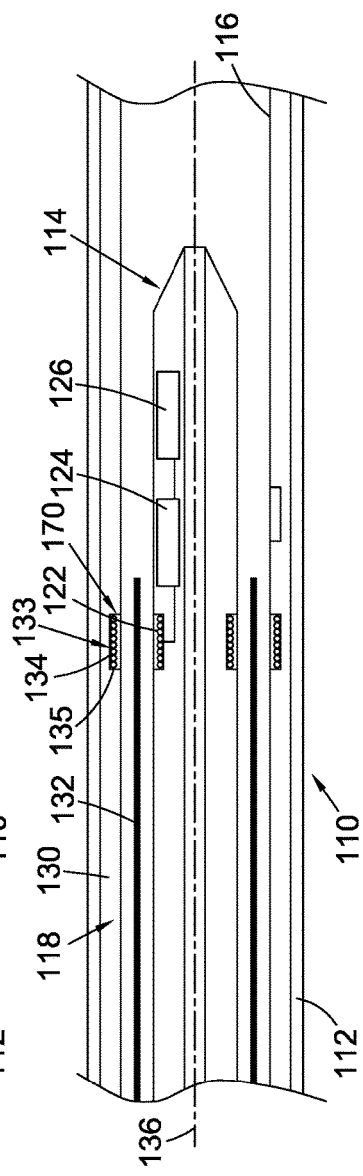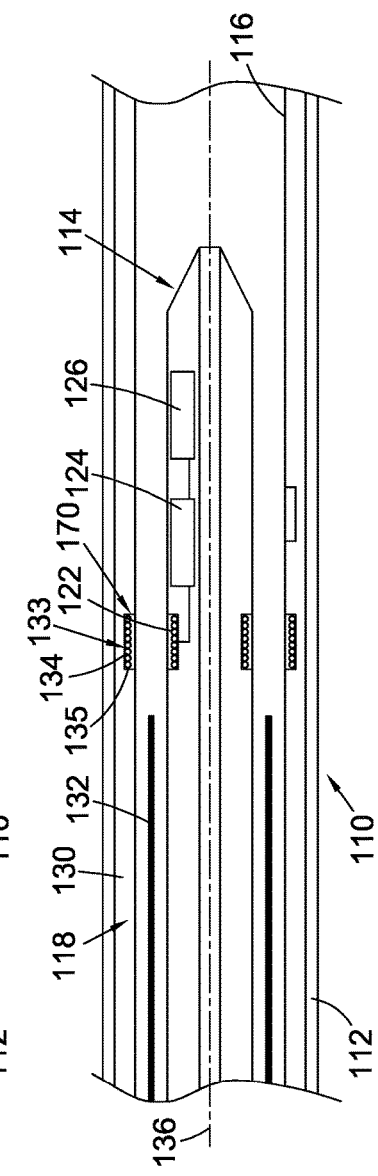

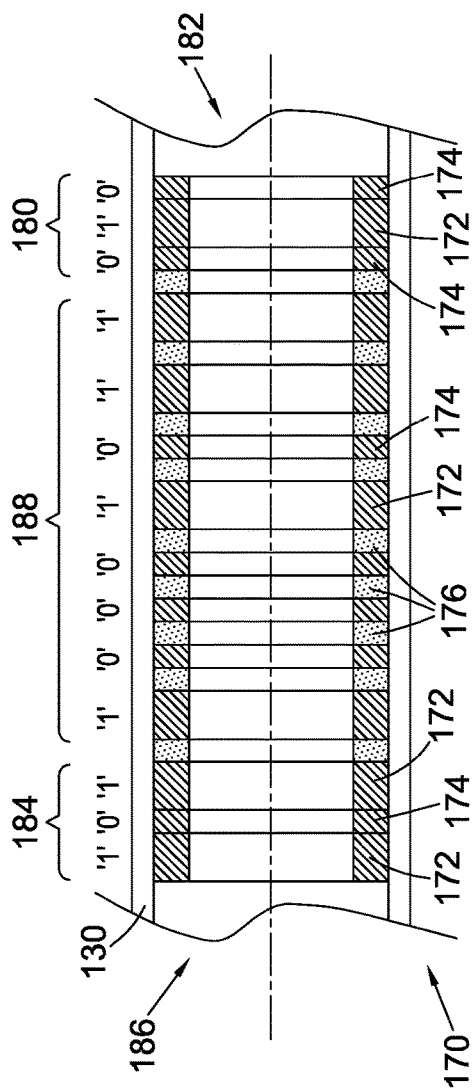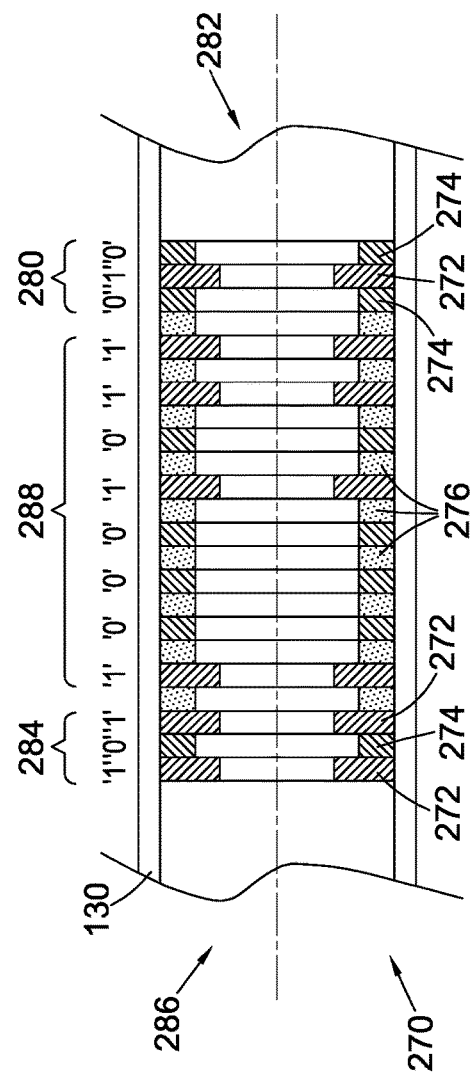

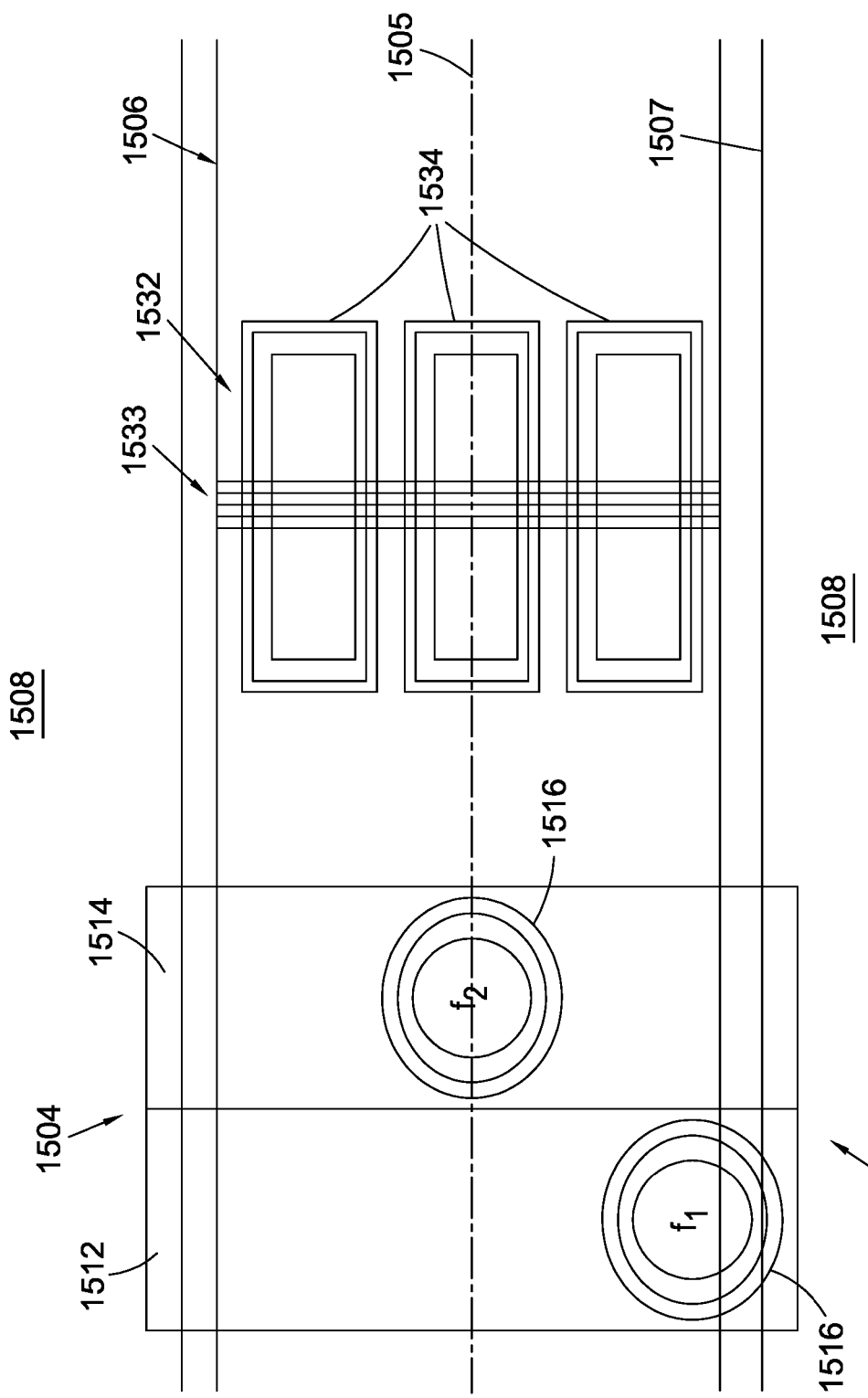

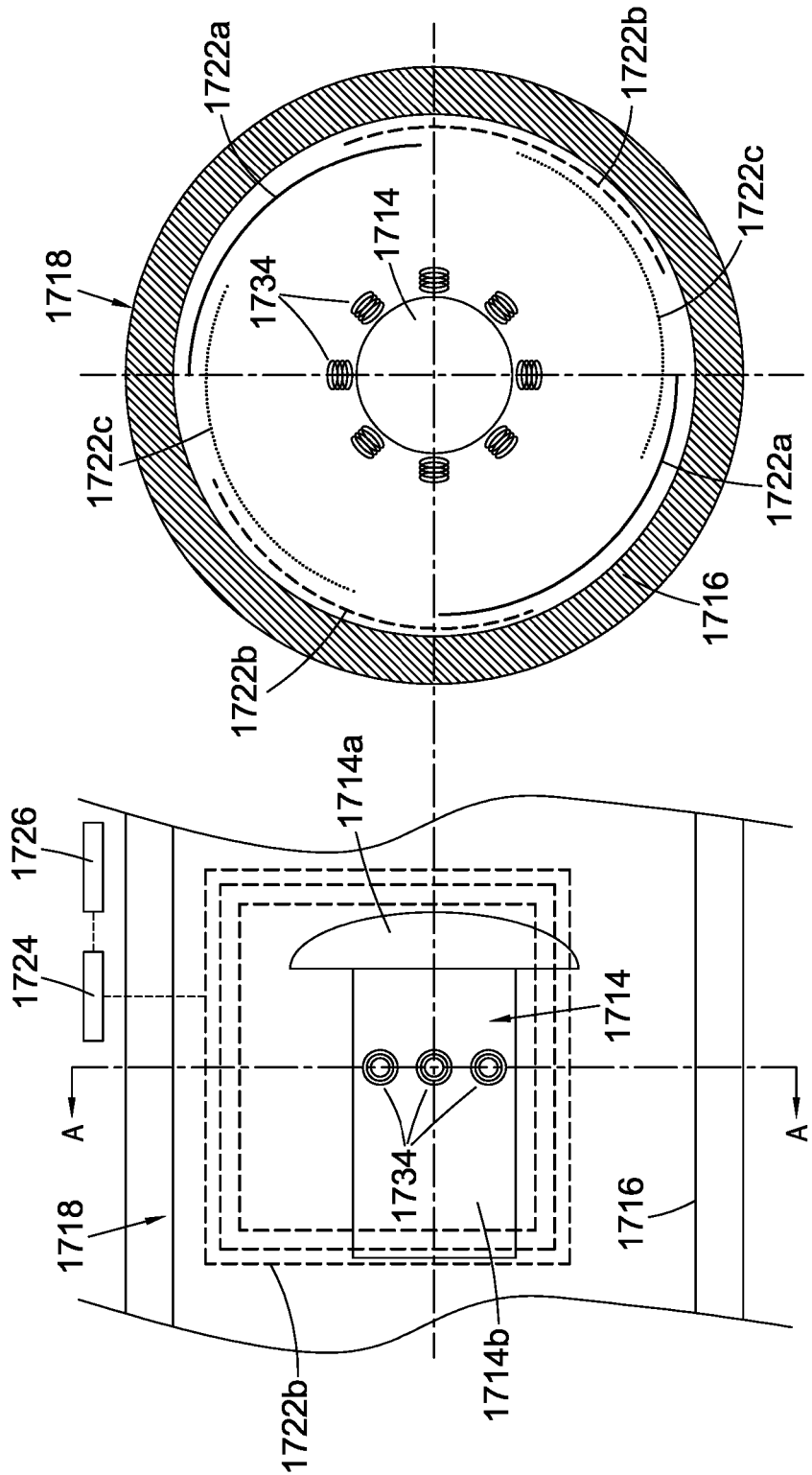

DOWNHOLE COMMUNICATION

FIELD

The present invention relates to a method and system for downhole communication or detection for use, in particular though not exclusively, for communicating information to and/or from a downhole tool in an oil or gas well.

BACKGROUND

Once an oil or gas well has been formed it is common to install completion infrastructure in the well to control production of hydrocarbon fluids from a hydrocarbon-bearing formation surrounding the well to surface. The completion infrastructure may comprise a string of downhole tools joined by a string of production tubing to surface. The downhole tools are generally flow control or circulation devices such as packers, injection sleeves, production sleeves and the like. Such downhole tools are generally activated mechanically using a shifting tool attached to a work string to open, close or otherwise shift the position of sliding sleeves.

Typically a shifting tool is run on a work-string through the completion infrastructure to mechanically actuate the various downhole tools in a desired sequence. In order to mechanically actuate a downhole tool, the shifting tool is manipulated (via the work-string) from surface. Typically, actuation is achieved by locking the shifting tool onto profiles provided on the downhole tools and pulling (work-string in tension), pushing (work-string in compression), jarring, or rotating the work string to deliver the necessary force or impact to the downhole tool with which it is engaged.

As will be appreciated, it can be difficult to accurately control the operations of the shifting tool especially when it is situated at the end of several kilometers of work string and/or the shifting tool is located in a horizontal or highly deviated wellbore. In these situations it is usually not possible to accurately predict at surface whether the intended actuation has been successful. An additional disadvantage of these conventional shifting tools is the difficulty of use. For example, jarring down or slacking off to cause compression of the work-string risks that the work string will 'catch' on other downhole tools or land on an unintended component with some force thereby causing damage.

In view of the aforementioned problems with the use of conventional shifting tools, the Applicant developed a method for operating a downhole tool described in co-pending UK patent application no. 1205985.3, in which a work-string is first run into a well without actuating any downhole tools. The work-string is then used to operate a plurality of downhole tools in a desired sequence as it is pulled out of the well whilst being maintained in tension. This may provide an operator at surface with a more positive indication of the location of the shifting tool and a more accurate log of the operations performed using the shifting tool since every action requires a positive step in order to perform a subsequent operation. Such a system does not, however, provide conclusive confirmation that a shifting tool has actually actuated or shifted a sliding sleeve of a particular downhole tool. Moreover, such a system does not provide any information about the degree to which a sliding sleeve of a particular downhole tool has been actuated or shifted.

It is known to use Radio Frequency Identification (RFID) tags in oil and gas wells for conveying information between surface and a downhole tool. Although such RFID tags may have no built-in power supply or battery, such RFID tags do include active electronics (i.e. one or more electronic devices which are configured to electrically control a flow of electrons or an electrical current) for storing and communicating information to a tag reader. Such RFID tags generally include a memory, such as a memory defined on an integrated circuit, for storing information such a binary code which uniquely identifies the RFID tag.

For example, it is known to use "Type I" RFID arrangements and methods in which an RFID tag is located with or embedded into a downhole tool which is installed downhole. An RFID reader is subsequently run or conveyed downhole past the RFID tag. In response to reading information from the RFID tag, the RFID reader may communicate directly with the downhole tool causing the downhole tool to perform a downhole operation. Alternatively, the RFID reader may be incorporated into a shifting tool which is run or conveyed downhole and which is configured so that, in response to information read from the tag by the RFID reader, the shifting tool acts upon the downhole tool and causes the downhole tool to perform a downhole operation. Additionally or alternatively, the RFID reader may communicate the presence of the RFID tag to a surface controller. For example, the RFID reader may communicate the presence of the RFID tag to the surface controller over a cable such as a wireline or the like which supports the RFID reader, or the RFID reader may communicate the presence of the RFID tag to the surface controller along a work-string to which the RFID reader is connected. As such, the use of "Type I" RFID technology may permit bi-directional communications between a downhole tool and a surface controller. This may not only provide the capability to actuate a downhole tool, but may also provide real-time access to downhole measurement data, such as logging data.

"Type II" RFID arrangements and methods are also known in which an RFID reader is located with or embedded into a downhole tool which is installed downhole. An RFID tag is subsequently dropped or pumped downhole where the RFID reader reads the stored information from the RFID tag and, in response, actuates the downhole tool thereby causing the downhole tool to perform a downhole operation.

RFID tags may harvest energy from an electromagnetic field generated by an RFID reader and store the harvested energy in the form of charge on a capacitance located within the RFID tag. The charge is subsequently used to power the RFID tag for the wireless communication of the information stored in the memory of the RFID tag to the RFID reader. For example, the RFID tag may inductively couple the stored information to the RFID reader and/or may radiate the stored information to the RFID reader as an electromagnetic signal. In either case, the RFID tag wirelessly communicates the stored information to the RFID reader by modulating a harmonically varying electromagnetic field. For example, it is known for a RFID tag to modulate the amplitude or frequency of a harmonically varying electrical carrier signal according to a baseband information carrying signal, and to apply the modulated electrical carrier signal to an antenna of the RFID tag in order to wirelessly communicate information stored in the memory of the RFID tag to an RFID reader. Accordingly, such RFID downhole communication methods require the RFID reader and the RFID tag to have active electronics, for example integrated active electronics for the modulation of the electrical carrier signal. Active electronics may, however, be prone to failure in the harsh environment of an oil and gas well. For example, commercially available RFID tags and RFID tag readers and are generally only rated to 150° C. and may malfunction or may have a limited lifetime at temperatures in excess of 150° C. This is particularly true for a RFID tag or a RFID tag reader which is installed in an oil or gas well for the lifetime of the well which may extend for many years. Consequently, the use of RFID technology may be prohibited, or the reliability of RFID technology may be limited, at such temperatures.

Moreover, as temperature increases, the charge stored on the capacitance of a RFID tag may dissipate more rapidly thereby reducing a time period over which the RFID tag can wirelessly communicate information stored in a memory of the RFID tag to the RFID reader. In practice, this may impose a further restriction on the operating temperature range.

Accordingly, for the case of Type II RFID technology, it is not uncommon to drop or pump multiple RFID tags downhole to increase the probability that information stored on at least one of the RFID tags is wirelessly communicated to an RFID reader for actuation of a downhole device such as a downhole tool. Even then, actuation of the downhole device may not be sufficiently reliable depending on the operating temperature.

It is also known to use inductive coupling downhole for the wireless communication of data across a pressure barrier between different housing sections of a downhole tool string. For example, U.S. Pat. No. 6,021,095 entitled "Method and Apparatus for Remote Control of Wellbore End Devices" discloses the wireless communication of data along an axial direction across a pressure barrier between different housing sections of a downhole tool string by modulating a harmonically varying electromagnetic field coupled between a first coil mounted within a first housing section of a downhole tool string and a second coil mounted within a second housing section of a downhole tool string.

It is also known to use an array of electromagnets downhole to move objects along a throughbore along which the electromagnets are arranged. For example, US 2008/0053662 entitled "Electrically Operated Well Tools" discloses an operating member which includes an array of permanent magnets and which is moved along a throughbore using an array of electromagnets arranged along the throughbore. Similarly, US 2008/0202768 entitled "Device for Selective Movement of Well Tools and also a Method of Using Same" discloses a movable check valve which comprises a magnetizable material and which is moved along a throughbore using an array of electromagnets arranged along the throughbore.

SUMMARY

It should be understood that one or more of the features, for example the optional features, defined in relation to any one of the following aspects of the present invention may apply alone or in any combination in relation to one or more of the other aspects of the present invention.

According to a first aspect of the present invention there is provided a system or apparatus for use in downhole communication or detection comprising:
 a downhole arrangement defining a throughbore; and
 a primary element and a secondary element,
 wherein one of the primary and secondary elements is provided on the downhole arrangement and the other of the primary and secondary elements is provided in the throughbore, and the primary and secondary elements are configurable for coupling of an electromagnetic field therebetween.

The electromagnetic field may comprise a magnetic field and/or an electric field. Such a system may be beneficial for use in determining a degree of coupling of the electromagnetic field between the primary and secondary elements.

The secondary element may be configured to provide a characteristic electromagnetic field. The secondary element may have a geometry and/or may be formed from one or more materials selected to provide the characteristic electromagnetic field.

The secondary element may be configured to provide the electromagnetic field coupled between the first and second elements with one or more characteristic features.

The secondary element may have a geometry and/or may be formed from one or more materials selected to provide the electromagnetic field coupled between the first and second elements with one or more characteristic features.

Detection of a coupled electromagnetic field between the primary and secondary elements having one or more features which are characteristic of, or are associated with, the secondary element may allow the proximity of the secondary element to the primary element to be detected.

The secondary element may be incapable of electrically controlling a flow of electrons or an electrical current.

The secondary element may be electronically passive.

In contrast to known RFID tags for use in downhole communication systems, such a system does not rely upon the modulation of an electrical carrier signal such as a harmonic electrical carrier signal by a baseband information carrying signal. Accordingly, unlike known RFID tags, there is no requirement for the secondary element to include any active electronics for modulating an electrical carrier signal.

Nor is there any requirement for the secondary element to include any active electronics for storing information such as a code in a memory. Accordingly, the secondary element may be formed using robust technology which is able to withstand and operate reliably at temperatures in excess of 150° C. In particular, there is no requirement for the secondary element to include any temperature sensitive semiconductor circuitry. Moreover, due to the absence of any active electronics in the secondary element, there is no requirement to store energy in the secondary element that may otherwise be required to power any active electronics. Consequently, relative to an RFID system, the system may tolerate a greater range of operating temperatures.

In contrast to known systems comprising an array of electromagnets for moving objects along a throughbore along which the electromagnets are arranged, the system of the present invention is configured for use in downhole communication. In particular, the system of the present invention is configured for detecting and/or confirming coupling of the electromagnetic field between the primary and secondary elements. Such a system may provide an indication of the proximity of the primary and secondary elements.

The secondary element may be provided on the downhole arrangement which defines the throughbore. The primary element may be positioned or located in the throughbore of the downhole arrangement. The primary element may be provided on a tool deployable through the throughbore of the downhole arrangement. The deployable tool may be movable along the throughbore of the downhole arrangement so that the primary element passes the secondary element. Such a system may avoid any requirement for any active electronics to be located downhole with the downhole arrangement. This may be advantageous where the downhole arrangement is to be installed downhole for an extended period of time, for example for one or more years.

The primary element may be provided on a downhole arrangement which defines a throughbore. The secondary element may be positioned or located in the throughbore of the downhole arrangement. The secondary element may be provided on a tool deployable through the throughbore of the downhole arrangement. The deployable tool may be movable along the throughbore of the downhole arrangement so that the secondary element passes the primary element. The secondary element may be configured to be dropped, pumped or otherwise conveyed along the throughbore of the downhole arrangement so that the secondary element passes the primary element.

The downhole arrangement may comprise a downhole tool.

The deployable tool may comprise a shifting tool for actuating the downhole tool.

When used in conjunction with a downhole tool, the system may be beneficial for use in measuring a degree of coupling of the electromagnetic field between the primary and secondary elements and any changes arising therein on actuation and/or de-actuation of the downhole tool. Such a system may be used to detect the presence of a downhole tool. Such a system may be used to provide positive confirmation of a state of the downhole tool before, during and/or after actuation and/or de-actuation of the downhole tool.

The system may be configured to measure any degree of coupling of the electromagnetic field between the primary and secondary elements including the case where the primary and secondary elements are completely uncoupled and the degree of coupling of the electromagnetic field between the primary and secondary elements is zero.

The downhole arrangement may be configurable for at least one of fluid injection, stimulation, fracturing and production.

The electromagnetic field may comprise a time-varying magnetic field.

Coupling of the electromagnetic field may comprise inductively coupling the primary and secondary elements.

An alternating electrical signal may be applied to the primary element. When the primary element is sufficiently close to the secondary element, this may induce an alternating current in the secondary element. The secondary element may be configured to provide a characteristic frequency response which is imposed upon the induced alternating current and coupled to the primary element. The alternating current induced in the primary element may be detected and analysed. The alternating current induced in the primary element may be representative of, or be dependent upon, the characteristic frequency response of the secondary element. As such, the primary element may be used to read information from the secondary element.

The electromagnetic field may comprise a time-varying electric field.

Coupling of the electromagnetic field may comprise capacitively coupling the primary and secondary elements.

The electromagnetic field may comprise a static magnetic field.

The electromagnetic field may comprise a static electric field.

The primary element may comprise a primary electromagnetic element.

The secondary element may comprise a secondary electromagnetic element.

The primary and secondary elements may be configured for alignment along a radial direction relative to a longitudinal axis defined by the throughbore of the downhole arrangement.

The primary and secondary elements may be arranged for coupling of the electromagnetic field therebetween along a radial direction relative to a longitudinal axis defined by the throughbore of the downhole arrangement.

The primary and secondary elements may be configurable for coupling of an electromagnetic field at a frequency in the range of 10 kHz to 1 MHz, 50 kHz to 500 kHz, or 100 kHz to 150 kHz.

Coupling of an electromagnetic field may be possible in such frequency ranges through any wellbore fluids that may be present between the primary and secondary elements.

The system may comprise a controller.

The controller may be electrically coupled to the primary element.

The controller may be configured to generate and apply an electrical signal to the primary element.

The controller may be configured to measure an electrical signal existing on the primary element.

The controller may be configured to determine a degree of coupling of the electromagnetic field between the primary and secondary elements from the measured electrical signal.

The controller may be configured to determine a degree of coupling of the electromagnetic field between the primary and secondary elements according to a frequency spectrum of the measured electrical signal.

The controller may be configured to determine a degree of coupling of the electromagnetic field between the primary and secondary elements according to the shape of the frequency spectrum of the measured electrical signal.

The controller may be configured to determine a degree of coupling of the electromagnetic field between the primary and secondary elements according to a resonant feature in the frequency spectrum of the measured electrical signal.

The controller may be configured to determine a degree of coupling of the electromagnetic field between the primary and secondary elements according to a resonant peak or dip in the frequency spectrum of the measured electrical signal.

The controller may be configured to determine a degree of coupling of the electromagnetic field between the primary and secondary elements according to a shape or Q-factor of the resonant feature.

The controller may be configured to determine a degree of coupling of the electromagnetic field between the primary and secondary elements according to a frequency of the resonant feature.

The controller may be configured to log the determined degree of coupling of the electromagnetic field between the primary and secondary elements in a memory.

The deployable tool may comprise the controller.

The downhole arrangement may comprise the controller.

The controller may be configured for communication to surface.

The controller may be located at surface.

The system may comprise a power source for providing power to the controller.

The deployable tool may comprise the power source.

The downhole arrangement may comprise the power source.

A deployable tool which comprises the controller, the power source and the primary element may be used to probe or determine a status of a downhole arrangement such as a downhole tool.

The primary element may comprise an insulated conductor.

The primary element may comprise copper.

The primary element may comprise an electrically conductive turn, loop, coil or ring.

The primary element may comprise a plurality of electrically conductive turns, loops, coils or rings.

The plurality of electrically conductive turns, loops, coils or rings may be connected electrically in series. Thus, when an electrical current is applied to such a plurality of electrically conductive turns, loops, coils or rings, each of the turns, loops, coils or rings generate a respective electromagnetic field at the same time.

The plurality of electrically conductive turns, loops, coils or rings may be connected electrically in parallel.

The primary element may be coiled.

The primary element may comprise a coil of insulated wire.

The primary element may have a helical configuration.

The primary element may extend circumferentially around the deployable tool.

The primary element may extend completely around the deployable tool. This may enhance the strength of any electromagnetic coupling between the primary and secondary elements. This may allow coupling of the electromagnetic field between the primary and secondary elements if the secondary element is circumferentially non-continuous.

The primary element may extend part-way around the deployable tool.

The primary element may be arranged helically around the deployable tool.

The primary element may be arranged helically around a body portion of the deployable tool. Such an orientation of the primary element may be accommodated on the deployable tool without unduly increasing the radial extent of the deployable tool.

The primary element may be encapsulated in a potting compound. Encapsulation of the primary element may provide protection for the primary element from an environment surrounding the primary element.

The system may comprise a primary enclosure.

The deployable tool may comprise the primary enclosure.

The downhole arrangement may comprise the primary enclosure.

The primary element may be housed within the primary enclosure. The primary enclosure may provide mechanical protection for the primary element.

The primary enclosure may be filled with the potting compound. Filling the primary enclosure with a potting compound may provide support for the primary enclosure and provide enhanced environmental and mechanical protection for the primary element.

The potting compound may comprise an epoxy or an elastomeric compound.

The primary enclosure may comprise a generally tubular base member and a generally tubular lid member.

The primary element may be wrapped around the base member.

At least part of the primary enclosure may be transparent to an electromagnetic field at a frequency in the range of 10 kHz to 1 MHz, 50 kHz to 500 kHz, or 100 kHz to 150 kHz.

The primary enclosure may comprise a polyether ether ketone (PEEK) material. As well as being relatively transparent to an electromagnetic field in the frequency range of the electromagnetic field, PEEK is a relatively inert material and may be formed and/or machined.

The primary element may extend around an axis arranged radially relative to a longitudinal axis of the downhole arrangement. Such an orientation of the primary element may serve to generate a magnetic field which is directed radially outward towards the secondary element of the downhole arrangement. This may serve to enhance any coupling of the electromagnetic field between the primary and secondary elements.

The primary element may be formed separately from the deployable tool and then fitted around the deployable tool.

The primary element may be formed separately from the downhole arrangement and then fitted around the throughbore defined by the downhole arrangement.

The primary element may be formed on a substrate.

The substrate may be generally planar.

The substrate may be electrically insulating.

The substrate may be flexible.

The use of a flexible substrate may allow the substrate to extend or be fitted around, to adopt or to comply with a non-planar geometry.

The substrate may extend or be fitted around the deployable tool.

The substrate may extend or be fitted around the base member of the primary enclosure.

The substrate may extend or be fitted around the throughbore defined by the downhole arrangement.

The substrate may be rigid.

The primary element may be formed by printing, writing, depositing or otherwise applying an electrically conductive material to the substrate.

The primary element may comprise an electrically conductive path or track defined on the substrate.

The primary element may have a generally convoluted configuration.

The primary element may have a spiral configuration.

Each turn of the primary element may have a curvature which increases towards a centre of the primary element.

Each turn of the primary element may comprise one or more straight sections. Each turn, loop, coil or ring of the primary element may extend around a different axis, each axis arranged along a different radial direction relative to a longitudinal axis of the deployable tool. The secondary element may extend circumferentially around the throughbore of the downhole arrangement.

The secondary element may extend completely around the throughbore of the downhole arrangement. This may enhance the strength of any coupling of the electromagnetic field between the primary and secondary elements. This may allow coupling of the electromagnetic field between the primary and secondary elements if the primary element is circumferentially non-continuous.

The secondary element may extend part-way around the throughbore of the downhole arrangement.

The secondary element may comprise an insulated conductor.

The secondary element may comprise copper.

The secondary element may comprise an insulated wire.

The secondary element may be coiled.

The secondary element may comprise a coil of wire.

The secondary element may have a helical configuration.

The secondary element may be arranged helically about the throughbore of the downhole arrangement.

The secondary element may comprise a capacitance.

The capacitance may be electrically connected between two ends of the insulated conductor.

The secondary element may comprise a capacitor.

The capacitor may be electrically connected between two ends of the insulated conductor.

The secondary element may be encapsulated in a potting compound.

The system may comprise a secondary enclosure

The downhole arrangement may comprise the secondary enclosure. The secondary element may be housed within the secondary enclosure.

The secondary enclosure may be filled with the potting compound.

The potting compound may comprise an epoxy or a elastomeric compound.

The secondary enclosure may comprise a generally tubular base member and a generally tubular lid member. The base member and the lid member may define a generally annular cavity therebetween. The radial extent of the annular cavity may be selected so that, when the downhole arrangement comprises the secondary enclosure, coupling of the electromagnetic field between the secondary element and a body portion of the downhole arrangement is avoided or at least reduced. Such coupling of the electromagnetic field may alter any coupling of the electromagnetic field between the primary and secondary elements. This may make measurement of a degree of coupling of the electromagnetic field between the primary and secondary elements from the frequency spectrum of the measured electrical signal more difficult.

The deployable tool may comprise the secondary enclosure.

The secondary element may be wrapped around the base member.

At least part of the secondary enclosure may be transparent to an electromagnetic field at a frequency in the range of 10 kHz to 1 MHz, 50 kHz to 500 kHz, or 100 kHz to 150 kHz.

The secondary enclosure may comprise a polyether ether ketone (PEEK) material.

The secondary element may extend around an axis arranged radially relative to a longitudinal axis of the downhole arrangement.

The secondary element may be formed separately from the downhole arrangement and then fitted around the throughbore of the downhole arrangement.

The secondary element may be formed separately from the deployable tool and then fitted around the deployable tool.

The secondary element may be formed on a substrate.

The substrate may be generally planar.

The substrate may be electrically insulating.

The substrate may be flexible.

The use of a flexible substrate may allow the substrate to extend or be fitted around, to adopt or to comply with a non-planar geometry.

The substrate may extend or be fitted around the throughbore of the downhole arrangement.

The substrate may extend or be fitted around the base member of the secondary enclosure.

The substrate may extend or be fitted around the deployable tool.

The substrate may be rigid.

The secondary element may be formed by printing, writing, depositing or otherwise applying an electrically conductive material to the substrate.

Such a manufacturing process may be controlled more readily than a winding process. This may enhance the uniformity and/or accuracy of the resonant features and frequencies associated with a frequency response of the secondary element.

The secondary element may comprise an electrically conductive path or track defined on the substrate.

The secondary element may have a generally convoluted configuration.

The secondary element may have a spiral configuration.

The secondary element may comprise one or more turns.

Each turn of the secondary element may have a curvature which increases towards a centre of the secondary element.

Each turn of the secondary element may comprise one or more straight sections.

A capacitance may be defined on the substrate.

The substrate may comprise a dielectric material.

The substrate may comprise a layer of dielectric material.

The substrate may comprise an electrically conductive layer which is separated from the electrically conductive path or track by a layer of dielectric material so as to define a predetermined capacitance between two ends of the electrically conductive path or track.

The substrate may comprise a dielectric material.

The substrate may comprise an electrically conductive back-plane.

The back-plane may be separated from the electrically conductive path or track by the thickness of the substrate.

The secondary element may comprise an electrically conductive pad defined on the substrate.

The pad may be electrically connected to one end of the electrically conductive path or track.

The pad may be defined by an extension or a portion of the electrically conductive path or track.

The pad may be defined by a portion of the electrically conductive path or track having a greater width than the remainder of the electrically conductive path or track.

The pad may be formed integrally with the electrically conductive path or track.

The other end of the electrically conductive path or track may be electrically connected to the back-plane through the substrate so as to define a predetermined capacitance between the pad and the back-plane. Such a capacitance may be more robust and, therefore, less susceptible to damage or change in a hostile downhole environment than a capacitor component such as a surface mount capacitor component.

The substrate may support a capacitor component which is electrically connected between two ends of the electrically conductive path or track defined on the substrate.

The substrate may support a surface mount capacitor.

The secondary element may comprise an electrically conductive ring.

The ring may comprise a metal.

The ring may extend around the throughbore of the downhole arrangement.

The ring may be defined by an annular portion of the downhole arrangement.

The secondary element may be configured such that coupling of the electromagnetic field between the primary and secondary elements as a function of frequency of an electrical signal applied to the primary element provides a corresponding measured electrical signal on the primary element having a characteristic frequency spectrum. In other words, the secondary element may be configured so as to have a characteristic frequency response.

The predetermined frequency spectrum may have a predetermined shape.

The predetermined frequency spectrum may include a resonant feature having a predetermined shape.

The resonant feature may comprise a resonant peak or dip.

The resonant feature may have a predetermined Q-factor.

The resonant feature may have a predetermined resonant frequency.

The predetermined resonant frequency may be predetermined for a given temperature and/or pressure to which the secondary element is exposed.

A material and/or geometry of the secondary element may be selected so as to provide the secondary element with a characteristic frequency response. This may result in the measured electrical signal on the primary element having a characteristic frequency spectrum.

A capacitance of the secondary element may be selected so as to provide the secondary element with a characteristic frequency response.

The system may comprise a tertiary element.

The tertiary element may comprise any of the features of which the primary element may comprise.

The tertiary element may be provided with the primary element but may be electrically insulated from and, therefore, independent of the primary element.

The tertiary element may be coupled to the electromagnetic field which is coupled between the primary and secondary elements.

Such a tertiary element may at least partially isolate an electrical signal induced in the tertiary element from an electrical signal applied to the primary element. This may reduce electrical noise induced in the tertiary element, thereby improving measurement sensitivity.

The tertiary element may extend circumferentially or helically relative to a longitudinal axis of the deployable tool. The primary element may comprise a plurality of electrically conductive turns, loops, coils or rings connected electrically in series, each turn, loop, coil or ring of the primary element may extend around a different axis, each axis may be arranged along a different radial direction relative to a longitudinal axis of the deployable tool, and each turn, loop, coil or ring of the primary element may be elongated in an axial direction relative to a longitudinal axis of the deployable tool.

Conversely, the primary element may extend circumferentially or helically relative to a longitudinal axis of the deployable tool. The tertiary element may comprise a plurality of electrically conductive turns, loops, coils or rings, the electrically conductive turns, loops, coils or rings of the tertiary element may be connected electrically in series, each turn, loop, coil or ring of the tertiary element may extend around a different axis, wherein each axis is arranged along a different radial direction relative to a longitudinal axis of the deployable tool, and each turn, loop, coil or ring of the tertiary element may be elongated in an axial direction relative to a longitudinal axis of the deployable tool.

Such arrangements of the primary and the tertiary elements may mean that the electromagnetic field coupled from the primary element is generally orthogonally oriented relative to an electromagnetic field coupled to the tertiary element. This may further reduce any cross-coupling of a signal from the primary element directly to the tertiary element without first inducing an AC current in the secondary element. This may reduce noise on the signal induced in the tertiary element, thereby improving measurement sensitivity.

The tertiary element may be electrically connected to the controller.

The controller may be configured to measure an electrical signal existing on the tertiary element.

The controller may be configured to determine a degree of coupling of the electromagnetic field between the secondary element and the tertiary element. The electromagnetic field coupled from the primary element to the secondary element may be separated in space and/or in time from the electromagnetic field coupled from the secondary element to the tertiary element.

The electromagnetic field coupled from the primary element to the secondary element may at least partially overlap in space and/or in time with the electromagnetic field coupled from the secondary element to the tertiary element.

The electromagnetic field coupled from the primary element to the secondary element may be orthogonal to the electromagnetic field coupled from the secondary element to the tertiary element.

The electromagnetic field coupled from the primary element to the secondary element may have the same frequency as the electromagnetic field coupled from the secondary element to the tertiary element.

The electromagnetic field coupled from the primary element to the secondary element may have a different frequency to the electromagnetic field coupled from the secondary element to the tertiary element.

The controller may be configured to determine a characteristic frequency response of the secondary element.

The secondary element may be configured to modify the electromagnetic field coupled thereto from the primary element by imposing the characteristic frequency response on the electromagnetic field coupled thereto from the primary element.

The primary element may be configured to stimulate the secondary element with a stimulating electromagnetic field as a function of frequency and the tertiary element may be configured to sense an electromagnetic field provided by the secondary element as a function of frequency in response to stimulation of the secondary element with the stimulating electromagnetic field.

The controller may be configured to detect the proximity of the tertiary element to the secondary element according to a result of a comparison between the frequency spectrum of the electromagnetic field sensed by the tertiary element and a characteristic frequency spectrum associated with the secondary element.

The downhole arrangement may comprise a plurality of secondary elements.

Each secondary element of the plurality of secondary elements may comprise one or more of the features of which the secondary element may comprise.

At least two of the secondary elements may be configured so that an electrical signal existing on the primary element when a respective electromagnetic field is coupled between the primary element and each of the at least two secondary elements has a different predetermined frequency spectrum over a frequency range of the electromagnetic field.

Each secondary element may be configured such that coupling of a respective electromagnetic field from each secondary element and the primary element provides a corresponding measured electrical signal having a characteristic frequency spectrum. In other words, each secondary element may be configured so as to have a characteristic frequency response. The resulting series of frequency responses may be used to encode information. For example, such an arrangement may permit a number to be encoded as a series of different frequency responses. The number may, for example, be a unique identification code for the downhole arrangement with which the plurality of secondary elements is associated or on which the plurality of secondary elements is mounted. This may allow the downhole arrangement to be distinguished from other downhole arrangements in the same completion string. This may allow the downhole arrangement to be uniquely identified.

Each secondary element may be configured so that an electrical signal existing on the primary element when a respective electromagnetic field is coupled between the primary element and each secondary element has a different predetermined frequency spectrum over a frequency range of the electromagnetic field.

Each predetermined frequency spectrum may have a predetermined shape.

Each predetermined frequency spectrum may include a resonant feature having a predetermined shape.

Each resonant feature may comprise a resonant peak or dip.

Each resonant feature may have a predetermined Q-factor.

Each resonant feature may have a predetermined resonant frequency.

Each predetermined resonant frequency may be predetermined for a given temperature and/or pressure to which each secondary element is exposed.

Each secondary element may be configured so as to avoid the resonant frequency of any one secondary element being a multiple of the resonant frequency of any other secondary element. This may avoid the possibility of harmonic effects.

A material and/or geometry of each secondary element may be selected so as to provide the secondary e element with a characteristic frequency spectrum.

A capacitance of each secondary element may be selected so as to provide the secondary element with a characteristic frequency spectrum.

The configuration of each secondary element may be selected from a finite set of different secondary element configurations. Each secondary element configuration may have a corresponding characteristic frequency response. This may permit a secondary element configuration to be determined from the measurement of the frequency response.

Each characteristic frequency response may be associated with a different symbol of a code. Accordingly, each secondary element configuration may be associated with or may represent a different symbol of a code. The plurality of frequency responses associated with the plurality of secondary elements may define the code.

Each secondary element may be unconnected electrically to the other secondary elements.

One or more of the secondary elements may be configured to be selectively altered.

Such secondary elements may allow a code to be selectively written to the plurality of secondary elements before and/or after deployment of the downhole arrangement. This may allow a unique identification code to be selectively written to the plurality of secondary elements for the unique identification of the downhole tool on which the secondary elements are mounted. This may allow the downhole tool to be identified unambiguously when deployed as part of a completion string which includes multiple downhole tools.

When the downhole tool is deployed as part of a completion string which includes multiple downhole tools, each downhole tool may be configured to have a plurality of secondary elements, wherein each of the pluralities of secondary elements of the different downhole tools are initially identically configured. Each of the identically configured pluralities of secondary elements of the different downhole tools may be later selectively written with a unique identification code for the corresponding downhole tool on which the secondary elements are mounted. This may allow each downhole tool to be manufactured with an identically configured plurality of secondary elements which is later selectively written with a unique identification code either later during the manufacturing process or at the point of use either at the wellhead or downhole. This may simplify logistics and reduce or eliminate any inventory problems that may be associated with the manufacture of downhole tools which each have a differently configured plurality of secondary elements.

Additionally or alternatively, other information may be written to the secondary elements. For example, the number and/or nature of operations performed by the downhole tool on which the secondary elements are mounted may be selectively written to the secondary elements.

One or more of the secondary elements may be configured to be irreversibly altered.

One or more of the secondary elements may be configured for selective alteration of a frequency response of the secondary element.

One or more of the secondary elements may be configured for selective alteration of a resonant feature of the frequency response of the secondary element.

One or more of the secondary elements may be configured for selective alteration of a shape of a resonant feature of the frequency response of the secondary element.

One or more of the secondary elements may be configured for selective alteration of a frequency of a resonant feature of the frequency response of the secondary element.

One or more of the secondary elements may be configured for selective suppression of a resonant feature of the frequency response of the secondary element.

One or more of the secondary elements may be configured for selective elimination of a resonant feature of the frequency response of the secondary element.

One or more of the secondary elements may be configured for selective alteration by melting, fusing, burning and/or breaking.

One or more of the secondary elements may be configured for selective alteration by exposing the secondary element to an electromagnetic field of sufficient strength. The controller may be configured to generate and apply an electrical signal to the primary element of sufficient strength for this purpose.

The material and/or geometry of one or more of the secondary elements may be configured for selective alteration by coupling an electromagnetic field of sufficient strength with the secondary element.

One or more of the secondary elements may comprise an electrical conductor having a resistivity and/or a cross-sectional geometry configured to fuse and/or break on coupling an electromagnetic field of sufficient strength with the secondary element.

One or more of the secondary elements may comprise an electrically conductive portion having a resistivity and/or a cross-sectional geometry configured to fuse and/or break on coupling of an electromagnetic field of sufficient strength with the secondary element.

Each secondary element may extend circumferentially around the throughbore of the downhole arrangement.

Each secondary element may extend completely around the throughbore of the downhole arrangement. This may enhance the strength of any coupling of an electromagnetic field between the primary element and each secondary element.

Each secondary element may extend part-way around the throughbore of the downhole arrangement.

The plurality of secondary elements may be axially distributed.

The different secondary elements may be axially separated or axially adjacent to one another.

Each secondary element may comprise an insulated conductor.

Each secondary element may comprise copper.

Each secondary element may comprise an electrically conductive core surrounded by an electrically insulating outer layer.

Each secondary element may be coiled.

Each secondary element may have a helical configuration.

Each secondary element may be arranged helically about the throughbore of the downhole arrangement.

Each secondary element may comprise a capacitance.

The capacitance may be electrically connected between two ends of the insulated conductor of the secondary element.

Each secondary element may comprise a capacitor.

The capacitor may be electrically connected between two ends of the insulated conductor.

Each secondary element may extend around an axis arranged along a radial direction relative to a longitudinal axis of the downhole arrangement.

The secondary elements may be circumferentially distributed.

Each secondary element may extend around a different axis, each axis arranged along a different radial direction relative to a longitudinal axis of the downhole arrangement.

Each secondary element may be formed separately from the downhole arrangement and then fitted around the throughbore of the downhole arrangement.

Each secondary element may be formed on a common substrate.

Each secondary element may be formed on a different substrate.

Each substrate may be generally planar.

Each substrate may be electrically insulating.

Each substrate may be flexible.

Each substrate may be fitted around the throughbore of the downhole arrangement.

Each substrate may be fitted around the base member of the secondary enclosure.

The use of one or more flexible substrates may allow the one or more substrates to be fitted around, to adopt or to comply with a non-planar geometry. For example, this may allow the one or more substrates to be fitted around, to adopt or to comply with the throughbore of the downhole arrangement or an outer surface of the base member of the secondary enclosure.

Each secondary element may be formed by printing, writing, depositing or otherwise applying an electrically conductive material to a substrate. Thus, each secondary element may be formed using a relatively inexpensive manufacturing technique.

Each secondary element may comprise an electrically conductive path or track defined on a substrate.

Each secondary element may define an electrically conductive path or track on a substrate having a different configuration to the electrically conductive path or track of every other secondary element.

Each secondary element may have a generally convoluted configuration.

Each secondary element may have a spiral configuration.

Each secondary element may comprise one or more turns.

Each turn of each secondary element may have a curvature which increases towards a centre of the secondary element.

Each turn of each secondary element may comprise one or more straight sections.

Each substrate may be configured to support a capacitor which is electrically connected between two ends of the electrically conductive path or track defined on the substrate.

Each substrate may define a capacitance between two ends of the electrically conductive path or track defined on the substrate.

Each substrate may comprise a dielectric material.

Each substrate may comprise a layer of dielectric material.

Each substrate may comprise an electrically conductive layer which is separated from the electrically conductive path or track by a layer of dielectric material so as to define a predetermined capacitance between two ends of the electrically conductive path or track.

Each substrate may comprise a dielectric material which extends through a thickness of the substrate.

Each substrate may comprise an electrically conductive back-plane which is separated from the electrically conductive path or track by the dielectric material of the substrate so as to define a predetermined capacitance between two ends of the electrically conductive path or track.

The plurality of secondary elements may comprise a plurality of electrically conductive rings distributed axially along a longitudinal axis of the downhole arrangement, each ring extending around the throughbore of the downhole arrangement.

The rings may be arranged axially adjacent to one another.

Each ring may be configured such that coupling of an electromagnetic field between each ring and the primary element provides a corresponding measured electrical signal having a characteristic frequency spectrum. In other words, each ring may have a corresponding characteristic frequency response.

Each ring may be configured such that coupling of an electromagnetic field between each ring and the primary element provides a corresponding measured electrical signal having a characteristic frequency spectrum over a frequency range of the electromagnetic field.

The configuration of each ring may be selected from a finite set of different ring configurations. Each ring configuration may have a corresponding characteristic frequency response. This may permit a ring configuration to be determined from the measurement of the frequency response.

Each characteristic frequency response may be associated with a different symbol of a code. Accordingly, each ring configuration may be associated with or may represent a different symbol of a code. The plurality of frequency responses associated with the plurality of rings may define the code.

Each ring configuration may be defined at least in part by an inner profile of the ring.

Each ring configuration may be defined at least in part by an inner diameter of the ring.

Each ring configuration may be defined at least in part by a material from which the ring is formed.

Each ring configuration may be defined at least in part by an axial extent of the ring.

The finite set of ring configurations may comprise a first ring configuration and a second ring configuration.

The first ring configuration may represent a first symbol of a binary code and the second ring configuration may represent a second symbol of the binary code.

The finite set of ring configurations may comprise a plurality of data ring configurations and a checking ring configuration which is different from the data ring configurations. A ring configured according to the checking ring configuration may have an inner diameter which is different to the inner diameter of a ring configured according to any of the data ring configurations. A ring configured according to the checking ring configuration may be formed from an electrically insulating material and a ring configured according to a data ring configuration may be formed from an electrically conductive material. A ring configured according to the checking ring configuration may have a different axial extent to a ring configured according to a data ring configuration.

The plurality of rings may define a series of rings in which a checking ring is included repeatedly. In such a series of rings, the repeated appearance of a checking ring may enable a checking function to be performed in which the series of frequency responses corresponding to the series of ring configurations is checked to ascertain whether the frequency response corresponding to the checking ring configuration is measured in the correct repeating series. This may permit a series of readings obtained while the primary element is stationary relative to the series of rings to be distinguished from a series of readings obtained as the primary element is run past the series of rings.

The plurality of rings may define a series of rings in which a checking ring is included with a regular axial periodicity.

Alternate rings in the series of rings may be checking rings.

The plurality of rings may define a series of rings which are configured to permit a change in a direction of the primary element relative to the secondary element to be determined when the primary element is located adjacent to the secondary element. For example, the plurality of rings may define a series of rings in which a series of ring configurations is repeated at least once. This may also provide a way of checking the accuracy of a series of frequency responses obtained from a series of rings. This may provide a more reliable code detection method and/or provide greater confidence in the code detection method.

The plurality of secondary elements may comprise an axially inner plurality of rings, a first axially outer plurality of rings, and a second axially outer plurality of rings.

The series of ring configurations of the first axially outer plurality of rings may be different to the series of ring configurations of the axially inner plurality of rings and the second axially outer plurality of rings.

The series of ring configurations of the second axially outer plurality of rings may be different to the series of ring configurations of the axially inner plurality of rings and the first axially outer plurality of rings.

One of the series of ring configurations of the first and second axially outer plurality of rings may define a unique start code and the other may define a unique end code. This may permit the code extracted from reading the axially inner plurality of rings to be interpreted as data. The use of such start and end codes may serve to avoid false readings.

The downhole arrangement may be configurable between a first configuration in which coupling of an electromagnetic field between the primary and secondary elements is prevented and a second configuration in which coupling of an electromagnetic field between the primary and secondary elements is permitted.

The secondary element may be covered so as to prevent coupling with an electromagnetic field generated by the primary element when the downhole arrangement is in the first configuration. The secondary element may be accessible by an electromagnetic field generated by the primary element when the downhole arrangement is in the second configuration.

The downhole arrangement may be configurable between the first and second configurations on actuation or de-actuation of the downhole arrangement. Thus, detection of a change in a degree of coupling of an electromagnetic field between the primary and secondary elements may provide a positive indication of actuation or de-actuation of the downhole arrangement.

The downhole arrangement may comprise a cover member.

The cover member may comprise a cover sleeve.

The secondary element may be arranged radially outwardly of the cover sleeve relative to a longitudinal axis of the throughbore of the downhole arrangement.

The secondary element and the cover member may be moveable relative to one another.

The cover member may extend at least partially between the secondary element and the throughbore of the downhole arrangement in the first configuration and the cover member may be at least partially withdrawn from between the secondary element and the throughbore of the downhole arrangement in the second configuration.

The secondary element may be attached to a body portion of the downhole arrangement and the cover member may be slideable relative to the body portion on actuation or de-actuation of the downhole arrangement.

The cover member may be attached to a body portion of the downhole arrangement and the secondary element may be slideable relative to the body portion on actuation or de-actuation of the downhole arrangement.

The downhole arrangement may comprise a plurality of further secondary elements for coupling of an electromagnetic field with the primary element.

The plurality of further secondary elements may comprise one or more of the features of which the plurality of secondary elements may comprise. The further secondary elements may be accessible for coupling of an electromagnetic field with the primary element regardless of a status of the downhole arrangement. The presence of such further secondary elements may permit identification of the downhole arrangement regardless of whether the downhole arrangement is in an actuated or a de-actuated state.

The further secondary elements may be configured for location downhole of the secondary element. This may permit the primary element of the deployable tool to detect the further secondary elements before it detects the secondary element or elements as the deployable tool is pulled uphole from a position downhole of the further secondary elements. If the further secondary elements are accessible for coupling of an electromagnetic field with the primary element regardless of a status of the downhole arrangement, this may permit the deployable tool to identify the downhole arrangement via electromagnetic coupling between the primary element and the further secondary elements and then check the status of the downhole arrangement via the coupling of an electromagnetic field between the primary element and the secondary element or elements.

The system may be configured to apply an electrical signal such as a harmonically varying electrical signal to the primary element during a transmit period and to detect an electrical signal present on the primary element during a receive period which is subsequent to the transmit period. The electrical signal present on the primary element during the receive period may be characteristic of the configuration of any secondary element coupled with the primary element. The electrical signal present on the primary element during the receive period may be caused by a characteristic time-variant response or ringing of any secondary element coupled with the primary element.

The secondary element may be configured to provide a characteristic time-variant response during the receive period when coupled to the primary element during the transmit period. For example, the geometry and/or materials of which the secondary element are formed may be selected to provide a characteristic time-variant response during the receive period when coupled to the primary element during the transmit period.

Applying and detecting electrical signals via the primary element during different sequential transmit and receive periods in this way may serve to improve measurement sensitivity compared to the case where an electrical signal is applied to the primary element and detected from the primary element during the same time period. Applying and detecting electrical signals via the primary element during different sequential transmit and receive periods allows the primary and secondary elements to be arranged to maximise coupling of the electromagnetic field. This may serve to improve measurement sensitivity compared to the case where an electrical signal is applied to a primary element to stimulate or excite a secondary element via the coupled electromagnetic field and an electrical signal is detected on a separate tertiary element because the primary and tertiary elements must be generally orthogonal to reduce cross-talk.

The system may comprise a signal generator for applying the electrical signal to the primary element during the transmit period.

The system may comprise a signal receiver for detecting the electrical signal present on the primary element during the receive period.

The signal generator may be configured to apply a first electrical signal at a first frequency to the primary element during a first transmit period and the signal receiver may be configured to detect an electrical signal present on the primary element during a first receive period which is subsequent to the first transmit period.

The signal generator may be configured to apply a second electrical signal at a second frequency to the primary element during a second transmit period and the signal receiver may be configured to detect an electrical signal present on the primary element during a second receive period which is subsequent to the second transmit period.

The signal generator may apply electrical signals at different frequencies to the primary element, one frequency at a time. For each frequency, the signal receiver may subsequently detect an electrical signal present on the primary element. This may allow the system to step or sweep through a frequency range searching for a characteristic response which is known to be associated with a given secondary element, thereby indicating the proximity of the given secondary element to the primary element.

The deployable tool may comprise a plurality of primary elements.

The plurality of primary elements may be electrically unconnected. Each primary element may be independently electrically connected to the controller. The controller may be configured to measure an electrical signal existing on each of the primary elements. The controller may be configured to determine a degree of coupling of a corresponding electromagnetic field between each of the primary elements and the secondary element from the measured electrical signals.

Each primary element may allow measurement of a degree of coupling of a corresponding electromagnetic field with a secondary element. As such, the plurality of primary elements may allow repeated detection of the secondary element. This may improve accuracy and/or confidence in the detection of the secondary element. A plurality of primary elements may also provide one or more spare primary elements which may be relied upon in the event of failure of one of the primary elements.

Each primary element may comprise one or more of the features of which the primary element may comprise.

The plurality of primary elements may be axially distributed.

The plurality of primary elements may be axially separated or axially adjacent.

Each primary element may extend around an axis arranged along a radial direction relative to a longitudinal axis of the throughbore of the downhole arrangement.

The plurality of primary elements may be circumferentially distributed.

Each primary element may extend around a different axis, each axis arranged along a different radial direction relative to a longitudinal axis of the throughbore of the downhole arrangement. Such a plurality of primary elements may permit discrimination of the circumferential position of the secondary element relative to the plurality of primary elements.

The system may be configured to apply an electrical signal to each primary element. This may establish a more uniform electromagnetic field around the plurality of primary elements for the detection of one or more secondary elements. For example, where the primary elements are arranged extend around a different axis, each axis arranged along a different radial direction relative to a longitudinal axis of the throughbore of the downhole arrangement, this may result in a more circumferentially uniform electromagnetic field. This may be important when the primary elements are being moved along the throughbore of the downhole arrangement but where the rotational alignment of the primary and secondary elements relative to an axis of the throughbore is unknown.

The system may be configured to apply an electrical signal to each primary element sequentially The system may be configured to apply a harmonically varying electrical signal to each primary element sequentially.

The system may be configured to apply different electrical signals to different primary elements at different times.

The system may be configured to apply an electrical signal having a first frequency sequentially to each primary element and then to apply an electrical signal having a second frequency sequentially to each primary element.

The system may be configured to sequentially apply electrical signals having different frequencies to a first primary element. The system may be configured to sequentially apply electrical signals having different frequencies to a second primary element.

The system may be configured to apply an electrical signal to each primary element simultaneously.

The system may be configured to apply different electrical signals to each primary element simultaneously.

The system may be configured to apply different electrical signals to each primary element at the same frequency but with a different phase.

Each primary element may comprise a pair of coils which are connected electrically in parallel. Both coils of each primary element may be located diametrically opposite one another relative to a throughbore of a downhole arrangement. The use of such primary elements may reduce the complexity of the electronic circuitry used to drive the primary elements. For example, the use of such primary elements may mean that the number of signal generator channels required to drive the primary elements is half the number of coils. Each primary element may be mounted on a body such as a body of the deployable tool.

The body may be formed of a non-magnetic material or may be non-magnetisable. This may at least partially suppress any coupling of the electromagnetic field through the body. This may serve to provide a more uniform electromagnetic field around the body.

The body may be formed of a magnetic or a magnetisable material such as a ferrite or the like. This may serve to enhance any coupling of the electromagnetic field through the body. This may be advantageous for providing a more uniform electromagnetic field around the body. Where each primary element comprises a pair of parallel connected diametrically opposed coils, the coils may be connected together so that the electromagnetic fields provided by the coils add constructively or re-enforce one another.

The coils of each primary element may have a circumferential extent of 30°-150°, 60°-120°, or approximately 90° relative to an axis of the throughbore of the downhole arrangement. Such a circumferential extent of the coils of each primary element may provide a circumferentially more uniform electromagnetic field.

A coil of each primary element may overlap circumferentially with a coil of an adjacent primary element. Overlapping the circumferential extent of adjacent coils in this way may provide a circumferentially more uniform electromagnetic field and may, in particular, avoid the presence of any dips or nulls in the electromagnetic field around the plurality of primary elements.

The circumferential overlap may be between 0°-40°, 10°-30°, or approximately 20° relative to an axis of the throughbore of the downhole arrangement.

The system may be configured to apply an electrical signal to the coils of each primary element one at a time to ensure that the electromagnetic field is swept circumferentially around the plurality of primary elements.

The frequency of the electrical signal may be stepped over a desired frequency range which is known to include the characteristic frequencies, such as the characteristic frequencies of any resonant frequencies associated with the secondary elements to be detected.

The frequency step size may be selected so as to be smaller than a bandwidth of resonant features in the frequency responses of the secondary elements.

The system may be configured to apply an electrical signal at a first frequency to the coils of the first primary element during a first transmit period.

The system may be configured to detect any residual response of one of the secondary elements such as any residual ringing of one of the secondary elements present on the coils of the first primary element at the first frequency during a first receive period subsequent to the first transmit period.

The system may be configured to apply an electrical signal at a second frequency to the coils of the first primary element during a second transmit period.

The system may be configured to detect any residual response of one of the secondary elements such as any residual ringing of one of the secondary elements present on the coils of the first primary element at the second frequency during a second receive period subsequent to the second transmit period.

The system may be configured to repeat the transmit and receive steps for the first primary element for each frequency in the desired frequency range. The system may be configured to repeat the transmit and receive steps for each frequency in the desired frequency range for each of the other primary elements to ensure a sweep of the electromagnetic field both circumferentially around the plurality of primary elements and through the desired frequency range.

Alternatively, the system may be configured to apply an electrical signal at a first frequency to the coils of the first primary element during a first transmit period and to detect an electrical signal present on the coils of the first primary element during a first receive period subsequent to the first transmit period and to then apply an electrical signal at the first frequency to the coils of the second primary element during a second transmit period and to detect an electrical signal present on the coils of the second primary element during a second receive period subsequent to the first transmit period. The system may be configured to repeat the transmit and receive steps for the coils of the remaining primary elements before the frequency is stepped up to the next frequency in the desired frequency range. The system may be configured to repeat the process for each of the primary elements at each frequency in the desired frequency range.

The one or more primary elements may be provided on the downhole arrangement and the one or more secondary elements and/or the one or more further secondary elements may be provided in the throughbore defined by the downhole arrangement. In such a system, the downhole arrangement may also include a controller and a power supply. The one or more secondary elements and/or the one or more further secondary elements may be run, dropped, pumped or otherwise conveyed along the throughbore defined by the downhole arrangement. In such a system, the one or more secondary elements and/or the one or more further secondary elements may serve as a tag which may be provided from surface for the communication of information from surface to the downhole arrangement. However, unlike an RFID tag which incorporates active electronics, the one or more secondary elements and/or the one or more further secondary elements would be electronically passive and would therefore be more robust and more reliable in a high temperature environment.

The one or more secondary elements and/or the one or more further secondary elements may be mounted on a carrier such as a mandrel or the like. The carrier may be configured to be dropped, pumped or otherwise conveyed in a fluid along the throughbore defined by the downhole arrangement. The carrier may comprise a head portion and an elongated body portion. Such a carrier may result in the one or more secondary elements and/or the one or more further secondary elements adopting a preferred orientation relative to the throughbore of the downhole arrangement when conveyed by a fluid flowing along the throughbore. This may serve to improve the coupling of an electromagnetic field between the primary element located on the downhole arrangement and the one or more secondary elements and/or the one or more further secondary elements. The one or more secondary elements and/or the one or more further secondary elements may be encapsulated for mechanical and/or environmental protection.

According to a second aspect of the present invention there is provided a downhole arrangement for use in downhole detection, the downhole arrangement defining a throughbore and the downhole arrangement comprising an element configurable for coupling of an electromagnetic field with a further element provided in the throughbore.

The further element may be provided on a tool deployable within the throughbore.

The downhole arrangement may comprise a downhole tool which is configurable to perform a wellbore operation.

The downhole arrangement may be configurable for at least one of fluid injection, stimulation, fracturing and production.

The downhole arrangement may be assembled with, connected to, coupled to or otherwise joined to one or more further downhole arrangements to form a completion string for an oil or gas well.

According to a third aspect of the present invention there is provided a tool for use in downhole detection, the tool being deployable through a throughbore defined by a downhole arrangement and the deployable tool comprising an element configurable for coupling of an electromagnetic field with a further element provided on the downhole arrangement.

According to a fourth aspect of the present invention there is provided an element for use in downhole communication or detection, the element being configured for deployment in a throughbore defined by a downhole arrangement and the element being configured for coupling of an electromagnetic field with a further element provided on the downhole arrangement.

Such an element may be run, dropped, pumped or otherwise conveyed along the throughbore defined by the downhole arrangement. The downhole arrangement may include a controller and a power supply and the element may serve as a tag which may be provided from surface for the communication of information from surface to the further element provided on the downhole arrangement. However, unlike an RFID tag which incorporates active electronics, the element would be electronically passive and would therefore be more robust and more reliable in a high temperature environment.

The element may be mounted on a carrier such as a mandrel or the like. The carrier may be configured to be dropped, pumped or otherwise conveyed in a fluid along the throughbore defined by the downhole arrangement. The carrier may comprise a head portion and an elongated body portion. Such a carrier may result in the element adopting a preferred orientation relative to the throughbore of the downhole arrangement when conveyed by a fluid flowing along the throughbore. This may serve to improve the coupling of an electromagnetic field between the element and the further element provided on the downhole arrangement. The element may be encapsulated for mechanical and/or environmental protection.

According to a fifth aspect of the present invention there is provided a method for use in downhole detection, the method comprising:

providing a primary element on one of a downhole arrangement and in a throughbore of the downhole arrangement;

providing a secondary element on the other of the downhole arrangement and in the throughbore of the downhole arrangement, wherein the primary and secondary elements are configurable for coupling of an electromagnetic field therebetween; and aligning the primary and secondary elements.

Aligning the primary and secondary elements may comprise moving one of the primary and secondary elements past the other of the primary and secondary elements.

Aligning the primary and secondary elements may comprise bringing one of the primary and secondary elements into proximity with the other of the primary and secondary elements.

The one of the primary and secondary elements provided in the throughbore of the downhole arrangement may be provided on a tool deployable within the throughbore.

The method may comprise applying an electrical signal to the primary element.

The method may comprise measuring an electrical signal existing on the primary element.

The method may comprise measuring a degree of coupling of an electromagnetic field between the primary and secondary elements from the measured electrical signal.

The method may comprise comparing the electromagnetic field coupled between the primary and secondary elements with a characteristic electromagnetic field associated with the secondary element.

The method may comprise detecting the proximity of the primary and secondary elements according to whether the electromagnetic field coupled between the primary and secondary elements matches a characteristic electromagnetic field associated with the secondary element.

The secondary element may be configured to provide the electromagnetic field coupled between the first and second elements with one or more characteristic features.

The secondary element may have a geometry and/or may be formed from one or more materials to provide the electromagnetic field coupled between the first and second elements with one or more characteristic features.

The method may comprise detecting the proximity of the primary and secondary elements according to whether the electromagnetic field coupled between the primary and secondary elements has one or more features which match the one or more characteristic features of the electromagnetic field associated with the secondary element.

The method may comprise logging a measured degree of coupling of an electromagnetic field between the primary and secondary elements in a memory provided on one of the downhole arrangement and the deployable tool.

The method may comprise communicating a measured degree of coupling of an electromagnetic field between the primary and secondary elements from one of the downhole arrangement and the deployable tool to the other.

The method may comprise communicating a measured degree of coupling of an electromagnetic field between the primary and secondary elements from one of the downhole arrangement and the deployable tool to surface.

The method may comprise preventing coupling of an electromagnetic field between the primary and secondary elements and then, in response to actuation or de-actuation of the downhole arrangement, permitting coupling of the electromagnetic field between the primary and secondary elements.

The method may comprise permitting coupling of an electromagnetic field between the primary and secondary elements and then, in response to actuation or de-actuation of the downhole arrangement, preventing coupling of the electromagnetic field between the primary and secondary elements.

Preventing coupling of an electromagnetic field between the primary and secondary e elements may comprise at least partially covering the secondary element using a cover member that extends at least partially between the primary and secondary elements.

Permitting coupling of an electromagnetic field between the primary and secondary elements may comprise at least partially withdrawing the cover member from between the primary and secondary elements.

The method may comprise providing the primary element on the deployable tool.

The method may comprise providing the secondary element on the downhole arrangement.

The method may comprise providing a plurality of further secondary elements on the downhole arrangement.

The method may comprise providing the further secondary elements on the downhole arrangement downhole of the secondary element.

The further secondary elements may be accessible for coupling of an electromagnetic field with the primary element regardless of a status of the downhole arrangement.

The method may comprise running the primary element past the further secondary elements.

The method may comprise pulling the primary element past the further secondary elements using a line such as a wireline, slickline, cable or the like.

The method may comprise running the primary element from a position downhole of the further secondary elements uphole past the further secondary elements.

The method may comprise monitoring an electrical signal existing on the primary element as the primary element is run past the further secondary elements.

Each secondary element and/or each further secondary element may be configured to have a characteristic frequency response.

The method may comprise using the plurality of secondary elements and/or the plurality of further secondary elements to encode a number as a series of different frequency responses.

The method may comprise using the plurality of secondary elements and/or the plurality of further secondary elements to encode a number as a series of different frequency responses.

The method may comprise selectively altering at least one of the secondary elements and/or selectively altering at least one of the further secondary elements.

The method may comprise exposing at least one of the secondary elements and/or at least one of the further secondary elements to an electromagnetic field of sufficient strength for this purpose. The method may comprise applying an electrical signal to the primary element of sufficient strength for this purpose.

The method may comprise selectively writing a code to at least one of the secondary elements and/or selectively writing a code to at least one of the further secondary elements before and/or after deployment of the downhole arrangement.

The method may comprise irreversibly altering at least one of the secondary elements and/or irreversibly altering at least one of the further secondary elements.

The method may comprise using the plurality of secondary elements and/or the plurality of further secondary elements to encode an identification number for the downhole arrangement.

The method may comprise associating the plurality of secondary elements and/or the plurality of further secondary elements with the downhole arrangement.

The method may comprise determining a series of frequency spectra of the monitored electrical signal as the primary element is run past each secondary element of the plurality of secondary elements and/or each further secondary element of the plurality of further secondary elements.

The method may comprise determining the identification number from the determined series of frequency spectra.

The method may comprise actuating or de-actuating the downhole arrangement according to the determined identification number.

The method may comprise running the primary element past the secondary element.

The method may comprise pulling the primary element past the secondary elements using a wireline.

The method may comprise monitoring an electrical signal existing on the primary element as the primary element is run past the secondary element.

The method may comprise determining a series of frequency spectra of the monitored electrical signal as the primary element is run past the secondary element.

The method may comprise determining a status of the downhole arrangement from the determined series of frequency spectra determined as the primary element is run past the secondary element.

According to a sixth aspect of the present invention there is provided a method for determining a status of a downhole tool, comprising:

providing a primary element within a throughbore of the downhole tool;

providing a secondary element on the downhole tool;

applying an electrical signal to the primary element;

aligning the primary element with the secondary element;

measuring an electrical signal existing on the primary element; and determining a degree of coupling of an electromagnetic field between the primary and secondary elements from the measured electrical signal.

The method may comprise providing the primary element on a shifting tool which is deployable within the throughbore of the downhole tool.

The method may comprise preventing coupling of an electromagnetic field between the primary and secondary elements and then, in response to actuation or de-actuation of the downhole arrangement, permitting coupling of the electromagnetic field between the primary and secondary elements.

The method may comprise permitting coupling of an electromagnetic field between the primary and secondary elements and then, in response to actuation or de-actuation of the downhole arrangement, preventing coupling of the electromagnetic field between the primary and secondary elements.

According to a seventh aspect of the present invention there is provided a method for identifying a downhole tool, comprising:

providing a primary element within a throughbore of the downhole tool;

providing a secondary element on the downhole tool;

applying an electrical signal to the primary element;

running the primary element past the secondary element;

monitoring an electrical signal existing on the primary element as the primary element is run past the secondary element; and determining an identity of the downhole tool from the monitored electrical signal.

The method may comprise providing the primary element on a shifting tool which is deployable within the throughbore of the downhole tool.

According to an eighth aspect of the present invention there is provided a system for use in downhole detection comprising:

a first part defining a throughbore;

a second part deployable through the throughbore;

a primary element provided on one of the first and second parts; and a secondary element provided on the other of the first and second parts, wherein the primary and secondary elements are configurable for coupling of an electromagnetic field therebetween.

The first part may comprise a downhole arrangement.

The first part may comprise a downhole tool which is configurable to perform a wellbore operation.

The first part may be configurable for at least one of fluid injection, stimulation, fracturing and production.

The second part may comprise a deployable tool.

The second part may comprise a shifting tool.

According to a ninth aspect of the present invention there is provided a first part for use in downhole detection, the first part defining a throughbore for deployment of a second part therethrough and the first part comprising an element configurable for coupling of an electromagnetic field to a further element provided on the second part.

According to a tenth aspect of the present invention there is provided a second part for use in downhole detection, the second part being deployable through a throughbore defined by a first part and the second part comprising an element configurable for coupling of an electromagnetic field to a further element provided on the first part.

According to an eleventh aspect of the present invention there is provided a downhole arrangement comprising a plurality of secondary elements, wherein each secondary element is configured so as to have a characteristic frequency response when an electromagnetic field is coupled from a primary element of a deployable tool to the secondary element.

The downhole arrangement may comprise a downhole tool which is configurable to perform a wellbore operation.

The downhole arrangement may be configurable for at least one of fluid injection, stimulation, fracturing and production.

The downhole arrangement may be assembled with, connected to, coupled to or otherwise joined to one or more further downhole arrangements to form a completion string for an oil or gas well.

Each of the one or more further downhole arrangements may comprise a corresponding plurality of secondary elements, wherein each secondary element is configured so as to have a characteristic frequency response when an electromagnetic field is coupled from a primary element of the deployable tool to the secondary element.

The configuration of each of the secondary elements of a given plurality of secondary elements of a given downhole arrangement may be selected so as to define a different series of frequency responses to the series of frequency responses defined by the one or more pluralities of secondary elements of every other downhole arrangement in the completion string. This may allow the downhole arrangement to be distinguished or identified uniquely from all of the other the downhole arrangements in the completion string.

According to a twelfth aspect of the present invention there is provided a method of assembling a completion string which includes a plurality of downhole arrangements, the method comprising:

providing each downhole arrangement with a corresponding plurality of secondary elements, wherein each of the secondary elements of each plurality of secondary elements defines a characteristic frequency response when an electromagnetic field is coupled with a primary element of a deployable tool; and configuring each of the secondary elements of a given plurality of secondary elements of a given downhole arrangement so as to define a different series of frequency responses to the series of frequency responses defined by the one or more pluralities of secondary elements of every other downhole arrangement in the completion string.

The method may comprise assembling, connecting, coupling or otherwise joining the plurality of downhole arrangements together to form a completion string for an oil or gas well.

The method may comprise assembling, connecting, coupling or otherwise joining the plurality of downhole arrangements together before or after the step of configuring each of the secondary elements of a given plurality of secondary elements of a given downhole arrangement so as to define a different series of frequency responses for the given downhole arrangement.

The method may comprise deploying the plurality of downhole arrangements downhole before or after the step of configuring each of the secondary elements of a given plurality of secondary elements of a given downhole arrangement so as to define a different series of frequency responses for the given downhole arrangement.

The method may comprise selectively altering one or more of the secondary elements of a given downhole arrangement so as to define a different series of frequency responses for the given downhole arrangement to the series of frequency responses defined by the one or more pluralities of secondary elements of every other downhole arrangement in the completion string.

The method may comprise irreversibly altering one or more of the secondary elements so as to irreversibly alter the frequency responses of the one or more of the secondary elements.

The method may comprise selectively altering one or more of the secondary elements of the given downhole arrangement at the time of manufacture or assembly of the given downhole arrangement before being transported to the point of use.

The method may comprise selectively altering one or more of the secondary elements of the given downhole arrangement at the point of use, but before assembling, connecting, coupling or otherwise joining the plurality of downhole arrangements together.

The method may comprise selectively altering one or more of the secondary elements of the given downhole arrangement at the point of use, but before deployment downhole.

The method may comprise selectively altering one or more of the secondary elements of the given downhole arrangement after deployment downhole.

Such methods may allow each downhole arrangement to be manufactured with an identically configured plurality of secondary elements which is later selectively written with a unique identification code, for example later during the manufacturing process at the wellhead or downhole. This may simplify logistics and reduce or eliminate any inventory problems that may be associated with the manufacture of downhole arrangements which each have a differently configured plurality of secondary elements.

According to a thirteenth aspect of the present invention there is provided a downhole arrangement which is arranged along a longitudinal axis and which comprises a plurality of insulated conductors, wherein each insulated conductor extends around a respective axis which is arranged along a different radial direction relative to the longitudinal axis of the downhole arrangement.

According to a fourteenth aspect of the present invention there is provided a method of selectively writing information to a downhole arrangement which comprises a plurality of secondary elements, the method comprising:

exposing one or more of the secondary elements to an electromagnetic field of sufficient strength so as to alter a characteristic frequency response of the one or more of the secondary elements.

The method may comprise irreversibly altering one or more of the secondary elements so as to irreversibly alter the characteristic frequency response of the one or more of the secondary elements.

According to a fifteenth aspect of the present invention there is provided a system for use in downhole detection comprising:

a downhole arrangement defining a throughbore;

a primary electromagnetic element and a secondary electromagnetic element, wherein one of the primary and secondary electromagnetic elements is provided on the downhole arrangement and the other of the primary and secondary electromagnetic elements is provided in the throughbore, and the primary and secondary electromagnetic elements are configurable for electromagnetic coupling therebetween.

According to a sixteenth aspect of the present invention there is provided a system for use in downhole detection comprising:

a downhole arrangement defining a throughbore;

a tool deployable through the throughbore of the downhole arrangement;

a primary electromagnetic element provided on one of the downhole arrangement and the deployable tool; and a secondary electromagnetic element provided on the other of the downhole arrangement and the deployable tool, wherein the primary and secondary electromagnetic elements are configurable for electromagnetic coupling therebetween.

Throughout the following aspects of the present invention, it should be understood that, each stimulator element may comprise the primary element, each indicator element may comprise the secondary element, and each sensor element may comprise the tertiary element of any preceding aspect of the present invention. Similarly, each further indicator element may comprise the further secondary element of any preceding aspect of the present invention.

According to a seventeenth aspect of the present invention there is provided a system for use in determining the relative position of first and second parts of a downhole arrangement, the system comprising:

a plurality of indicator elements having a predetermined spatial arrangement relative to the first part of the downhole arrangement, each indicator element capable of providing a distinct electromagnetic field; and a sensor element which is capable of sensing respective electromagnetic fields coupled from each of the indicator elements, wherein the second part of the downhole arrangement selectively extends between the sensor element and one or more of the indicator elements according to the relative position of the first and second parts of the downhole arrangement.

Such a system may be beneficial for use in determining a degree to which a downhole arrangement has been actuated.

The plurality of indicator elements may have a fixed spatial arrangement.

The electromagnetic field provided by each indicator element may comprise a magnetic field.

The electromagnetic field provided by each indicator element may comprise an electric field.

The electromagnetic field provided by each indicator element may be static.

The electromagnetic field provided by each indicator element may be time-varying.

Such a system does not require any active electronics to be incorporated or embedded into the downhole arrangement.

The downhole arrangement may comprise a downhole tool.

When used in conjunction with a downhole tool, the system may be beneficial for use in measuring a degree of coupling between each indicator element and the sensor element and any changes arising therein on actuation and/or de-actuation of the downhole tool. Such a system may be used to provide positive confirmation of a state of the downhole tool before, during and/or after actuation and/or de-actuation of the downhole tool. Such a system may be used to provide positive confirmation of degree to which the downhole tool has been actuated or de-actuated before, during and/or after actuation and/or de-actuation of the downhole tool.

The system may be configured to measure any degree of coupling between a given indicator element and the sensor element including the case where the given indicator element and the sensor element are completely uncoupled and the degree of coupling between the given indicator element and the sensor element is zero.

The downhole arrangement may be configurable for at least one of fluid injection, stimulation, fracturing and production.

The system may comprise a controller.

The sensor element and the controller may be configured for communication with one another.

The controller may be capable of discriminating electromagnetic fields extending from the different indicator elements.

The controller may be configured to determine a relative position of the first and second parts of the downhole arrangement from a respective field sensed from each of the different indicator elements.

The controller may be configured to log the determined degree of coupling between the indicator elements and the sensor element in a memory.

The deployable tool may comprise the controller.

The downhole arrangement may comprise the controller.

The controller may be configured for communication to surface.

The controller may be located at surface.

The system may comprise a power source for providing power to the controller.

The deployable tool may comprise the power source.

The downhole arrangement may comprise the power source.

The sensor element may be separate from the downhole arrangement.

The downhole arrangement may define a throughbore.

Each indicator element may be arranged to provide an electromagnetic field extending into the throughbore.

The sensor element may be located within the throughbore.

The sensor element may be mounted on a deployable tool.

The deployable tool may be configured for actuating the downhole tool.

The deployable tool may comprise a shifting tool.

The deployable tool may be configured to cause relative movement between the first and second parts of the downhole arrangement.

The deployable tool may be configured to permit the relative position of the first and second parts of the downhole arrangement to be monitored in real-time.

The first and second parts of the downhole arrangement may be configured for relative linear movement.

The first and second parts of the downhole arrangement may be configured for relative rotation.

The second part of the downhole arrangement may comprise a window which is transparent to each of the respective electromagnetic fields extending from the indicator elements.

The window may be configured to selectively allow at least partial coupling of one or more of the respective electromagnetic fields extending from each of the different indicator elements to the sensor element.

The window may be configured to progressively allow at least partial coupling of the respective electromagnetic fields extending from an increasing number of the different indicator elements to the sensor element.

The second part of the downhole arrangement may comprise a cover member.

The second part of the downhole arrangement may comprise a cover sleeve.

The second part of the downhole arrangement may be configured to alter the respective electromagnetic fields extending from each of the indicator elements.

The second part of the downhole arrangement may be configured to attenuate the respective electromagnetic fields extending from each of the indicator elements.

The second part of the downhole arrangement may be configured to block the respective electromagnetic fields extending from each of the indicator elements.

The second part of the downhole arrangement may comprise metal.

The second part of the downhole arrangement may comprise steel.

Each indicator element may be capable of providing a time-varying magnetic field.

Each indicator element may be capable of providing a time-varying output magnetic field in response to the application of a time-varying input magnetic field to the indicator element.

The time-varying magnetic field may have a frequency in the range of 10 kHz to 1 MHz, 50 kHz to 500 kHz, or 100 kHz to 150 kHz.

Coupling of a magnetic field may be possible in such frequency ranges through any wellbore fluids that may be present between the indicator and sensor elements.

Each indicator element may comprise an electrical conductor.

Each indicator element may comprise an insulated electrical conductor.

Each indicator element may extend along a path having at least one loop or turn.

Each indicator element may extend along a helical path or a spiral path.

Each indicator element may comprise at least one turn, loop or coil of wire.

Each indicator element may comprise a ring.

Each indicator element may comprise a capacitance.

Each indicator element may comprise a capacitance which is electrically connected between two ends of the electrical conductor.

Such an indicator element may provide a resonant frequency response.

Each indicator element may comprise a capacitor.

Each indicator element may comprise a capacitor which is electrically connected between two ends of the electrical conductor.

Each indicator element may extend circumferentially around the throughbore of the downhole arrangement.

Each indicator element may extend completely around the throughbore of the downhole arrangement. This may enhance the strength of any coupling between the each indicator element and the sensor element. This may allow coupling between each indicator element and the sensor element if the sensor element is circumferentially non-continuous.

Each indicator element may extend part-way around the throughbore of the downhole arrangement.

Each indicator element may be arranged helically about the throughbore of the downhole arrangement.

The plurality of indicator elements may be axially distributed.

The different indicator elements may be axially separated or axially adjacent to one another.

Each indicator element may be encapsulated in a potting compound.

The downhole arrangement may comprise an indicator element enclosure.

Each indicator element may be housed within the indicator element enclosure.

The indicator element enclosure may be filled with the potting compound.

The potting compound may comprise an epoxy or a elastomeric compound.

The indicator element enclosure may comprise a generally tubular base member and a generally tubular lid member. The base member and the lid member may define a generally annular cavity therebetween. The radial extent of the annular cavity may be selected so as to avoid coupling between the indicator elements and a body portion of the downhole arrangement. Such coupling may alter any coupling between the indicator elements and the sensor element. This may make measurement of a degree of coupling between the indicator elements and the sensor element from the frequency spectrum of the measured electrical signal more difficult.

Each indicator element may be wrapped around the base member.

At least the base member of the indicator element enclosure may be transparent to a magnetic field at a frequency in the range of 10 kHz to 1 MHz, 50 kHz to 500 kHz, or 100 kHz to 150 kHz.

The indicator element enclosure may comprise a polyether ether ketone (PEEK) material.

Each indicator element may extend around an axis arranged along a radial direction relative to a longitudinal axis of the downhole arrangement.

The indicator elements may be circumferentially distributed.

Each indicator element may extend around a different axis, each axis arranged along a different radial direction relative to a longitudinal axis of the downhole arrangement.

Each indicator element may be formed separately from the downhole arrangement and then fitted around the throughbore of the downhole arrangement.

Each indicator element may be formed on a common substrate.

Each indicator element may be formed on a different substrate.

Each substrate may be generally planar.

Each substrate may be electrically insulating.

Each substrate may be flexible.

Each substrate may be fitted around the throughbore of the downhole arrangement.

Each substrate may be fitted around the base member of the indicator element enclosure.

The use of one or more flexible substrates may allow the one or more substrates to be fitted around, to adopt or to comply with a non-planar geometry. For example, this may allow the one or more substrates to be fitted around, to adopt or to comply with the throughbore of the downhole arrangement or an outer surface of the base member of the indicator element enclosure.

Each indicator element may be formed by printing, writing, depositing or otherwise applying an electrically conductive material to a substrate. Thus, each indicator element may be formed using a relatively inexpensive manufacturing technique.

Each indicator element may comprise an electrically conductive path or track defined on a substrate.

Each indicator element may define an electrically conductive path or track on a substrate having a different configuration to the electrically conductive path or track of every other indicator element.

Each indicator element may have a generally convoluted configuration.

Each indicator element may have a spiral configuration.

Each indicator element may comprise one or more turns.

Each turn of each indicator element may have a curvature which increases towards a centre of the indicator element.

Each turn of each indicator element may comprise one or more straight sections.

Each substrate may be configured to support a capacitor.

The capacitor may be electrically connected between two ends of the electrically conductive path or track defined on the substrate.

Each substrate may define a capacitance between two ends of the electrically conductive path or track defined on the substrate.

Each substrate may comprise a dielectric material.

Each substrate may comprise a layer of dielectric material.

Each substrate may comprise an electrically conductive layer which is separated from the electrically conductive path or track by a layer of dielectric material so as to define a predetermined capacitance between two ends of the electrically conductive path or track.

Each substrate may comprise a dielectric material which extends through a thickness of the substrate.

Each substrate may comprise an electrically conductive back-plane which is separated from the electrically conductive path or track by the dielectric material of the substrate so as to define a predetermined capacitance between two ends of the electrically conductive path or track.

Each indicator element may comprise an electrically conductive ring.

The ring may comprise a metal.

The ring may extend around the throughbore of the downhole arrangement.

The ring may be defined by an annular portion of the downhole arrangement.

Each indicator element may be capable of providing a distinct magnetic field.

At least two of the indicator elements may be capable of providing magnetic fields of a different polarity.

At least two of the indicator elements may be capable of providing magnetic fields of a different strength.

Each indicator element may be capable of providing a static magnetic field.

Each indicator element may comprise a magnet.

Each indicator element may comprise a permanent magnet.

Each indicator element may comprise an electromagnet.

The plurality of indicator elements may comprise a plurality of substantially identical magnets, each magnet having a different orientation relative to the sensor element.

The plurality of indicator elements may comprise a plurality of substantially identical magnets and a plurality of magnetic field attenuators, each magnetic field attenuator being located between a corresponding magnet and the sensor element, and each magnetic field attenuator being configured to provide a different level of magnetic field attenuation.

The plurality of indicator elements may comprise a plurality of substantially identical magnets and a plurality of magnetic field apertures, each magnetic field aperture being located between a corresponding magnet and the sensor element, and each magnetic field aperture being configured to spatially limit the extent of the magnetic field to a different degree.

The sensor element may comprise an electrical conductor.

The sensor element may comprise an insulated electrical conductor.

The sensor element may extend along a path having at least one loop or turn.

The sensor element may extend along a helical path or a spiral path.

The sensor element may comprise at least one turn, loop or coil of wire.

The sensor element may comprise a ring.

The sensor element may be capable of sensing respective electromagnetic fields extending from two or more of the indicator elements at the same time.

The sensor element may be capable of sensing respective electromagnetic fields extending from two or more of the indicator elements at different times.

The sensor element may be encapsulated in a potting compound. Encapsulation of the sensor element may provide protection for the sensor element from an environment surrounding the sensor element.

The deployable tool may comprise a sensor element enclosure.

The sensor element may be housed within the sensor element enclosure.

The sensor element enclosure may provide mechanical protection for the sensor element.

The sensor element enclosure may be filled with the potting compound. Filling the sensor element enclosure with a potting compound may provide support for the sensor element enclosure and provide enhanced environmental and mechanical protection for the sensor element.

The potting compound may comprise an epoxy or an elastomeric compound.

The sensor element enclosure may comprise a generally tubular base member and a generally tubular lid member.

The sensor element may be wrapped around the base member.

At least the lid member of the sensor element enclosure may be transparent to a magnetic field at a frequency in the range of 10 kHz to 1 MHz, 50 kHz to 500 kHz, or 100 kHz to 150 kHz.

The sensor element enclosure may comprise a polyether ether ketone (PEEK) material. As well as being relatively transparent to an electromagnetic field in the frequency range of the magnetic field, PEEK is a relatively inert material and may be formed and/or machined.

The sensor element may extend around an axis arranged radially relative to a longitudinal axis of the downhole arrangement. Such an orientation of the sensor element may serve to enhance coupling with a magnetic field extending from the indicator elements of the downhole arrangement.

The sensor element may be formed separately from the deployable tool and then fitted around the deployable tool.

The sensor element may be formed on a substrate.

The substrate may be generally planar.

The substrate may be electrically insulating.

The substrate may be flexible.

The substrate may be fitted around the deployable tool.

The substrate may be fitted around the base member of the sensor element enclosure.

The use of a flexible substrate may allow the substrate to be fitted around, to adopt or to comply with a non-planar geometry. For example, this may allow the substrate to be fitted around, to adopt or to comply with the deployable tool or an outer surface of the base member of the sensor element enclosure.

The substrate may be rigid.

The sensor element may be formed by printing, writing, depositing or otherwise applying an electrically conductive material to the substrate.

The sensor element may comprise an electrically conductive path or track defined on the substrate.

The sensor element may have a generally convoluted configuration.

The sensor element may have a spiral configuration.

Each turn of the sensor element may have a curvature which increases towards a centre of the sensor element.

Each turn of the sensor element may comprise one or more straight sections. Each turn, loop, coil or ring of the sensor element may extend around a different axis, each axis arranged along a different radial direction relative to a longitudinal axis of the deployable tool.

The sensor element may comprise a magnetic field sensor.

The sensor element may comprise a Hall effect sensor.

The system may comprise a stimulator element for stimulating each of the indicator elements so as to provide the respective electromagnetic fields.

The stimulator element may comprise an electrical conductor.

The stimulator element may comprise an insulated electrical conductor.

The stimulator element may extend along a path having at least one loop or turn.

The stimulator element may extend along a helical path or a spiral path.

The stimulator element may comprise at least one turn, loop or coil of wire.

The stimulator element may comprise a ring.

The stimulator element may be likened to a primary coil of a transformer and each of the indicator elements may be likened to a different secondary coil of a transformer. The sensor element may be likened to a tertiary coil which is coupled to a time-varying magnetic field of the transformer for interrogation thereof.

The stimulator element may be coupled to one or more of the indicator elements simultaneously.

The stimulator element may be coupled to one or more of the indicator elements sequentially.

The stimulator element may be provided on the deployable tool.

The stimulator element may be electrically isolated from and, therefore, independent of the sensor element.

This may at least partially isolate an electrical signal induced in the sensor element from an electrical signal applied to the stimulator element. This may reduce electrical noise induced in the sensor element, thereby improving measurement sensitivity.

Each indicator element may have a characteristic frequency response.

The characteristic frequency response may include a characteristic resonant feature.

The characteristic resonant feature may be a resonant peak or a resonant dip.

The characteristic resonant feature may occur at a characteristic resonant frequency.

The controller may be capable of discriminating a characteristic frequency response of one indicator element from a characteristic frequency response of a different indicator element.

The controller may be capable of discriminating a characteristic resonant feature of one indicator element from a characteristic resonant feature of a different indicator element.

The stimulator element may comprise an electrical conductor which extends circumferentially around the deployable tool.

The stimulator element may extend completely around the deployable tool. This may enhance the strength of any coupling between the between the stimulator element and the indicator elements. This may allow coupling between the stimulator element and the indicator elements if the indicator elements are circumferentially non-continuous.

The stimulator element may extend part-way around the deployable tool.

The stimulator element may be arranged helically around the deployable tool.

The stimulator element may be arranged helically around a body portion of the deployable tool. Such an orientation of the stimulator element may be accommodated on the deployable tool without unduly increasing the radial extent of the deployable tool.

The stimulator element may be encapsulated in a potting compound. Encapsulation of the stimulator element may provide protection for the stimulator element from an environment surrounding the stimulator element.

The stimulator element may be housed within the sensor element enclosure.

The stimulator element may extend around an axis arranged radially relative to a longitudinal axis of the downhole arrangement. Such an orientation of the stimulator element may serve to enhance coupling of a magnetic field extending from the stimulator element to the indicator elements of the downhole arrangement.

The stimulator element may be formed separately from the deployable tool and then fitted around the deployable tool.

The stimulator element may be formed on a substrate.

The substrate may be generally planar.

The substrate may be electrically insulating.

The substrate may be flexible.

The substrate may be fitted around the deployable tool.

The substrate may be fitted around the base member of the stimulator element enclosure.

The use of a flexible substrate may allow the substrate to be fitted around, to adopt or to comply with a non-planar geometry. For example, this may allow the substrate to be fitted around, to adopt or to comply with the deployable tool or an outer surface of the base member of the stimulator element enclosure.

The substrate may be rigid.

The stimulator element may be formed by printing, writing, depositing or otherwise applying an electrically conductive material to the substrate.

The stimulator element may comprise an electrically conductive path or track defined on the substrate.

The stimulator element may have a generally convoluted configuration.

The stimulator element may have a spiral configuration.

Each turn of the stimulator element may have a curvature which increases towards a centre of the stimulator element.

Each turn of the stimulator element may comprise one or more straight sections. Each turn, loop, coil or ring of the stimulator element may extend around a different axis, each axis arranged along a different radial direction relative to a longitudinal axis of the deployable tool.

The stimulator element and the sensor element may be oriented orthogonally to one another. For example, the sensor element may be arranged helically around a body portion of the deployable tool. The stimulator element may extend around one or more axes which are arranged radially relative to a longitudinal axis of the deployable tool. Each turn, loop, coil or ring of the stimulator element may be elongated in an axial direction relative to a longitudinal axis of the deployable tool.

Conversely, the stimulator element may be arranged helically around a body portion of the deployable tool. The sensor element may extend around one or more axes which are arranged radially relative to a longitudinal axis of the deployable tool. Each turn, loop, coil or ring of the sensor element may be elongated in an axial direction relative to a longitudinal axis of the deployable tool.

Such orthogonal arrangements of the stimulator and sensor elements may mean that the electromagnetic field coupled from the stimulator element is generally orthogonally oriented relative to an electromagnetic field coupled to the sensor element. This may reduce any cross-coupling of the magnetic field from the stimulator element directly to the sensor element. This may reduce noise on the signal induced in the sensor element, thereby improving measurement sensitivity.

The controller may be electrically connected to the stimulator element.

The controller may be configured to generate and apply an electrical signal to the stimulator element.

The controller may be electrically connected to the sensor element.

The controller may be configured to measure an electrical signal existing on the sensor element.

The controller may be configured to determine a degree of coupling between the stimulator element and the sensor element via the indicator elements from the measured electrical signal.

The controller may be configured to determine a degree of coupling between the stimulator element and the sensor element via the indicator elements according to a frequency spectrum of the measured electrical signal.

The controller may be configured to determine a degree of coupling between the stimulator element and the sensor element via the indicator elements according to the shape of the frequency spectrum of the measured electrical signal.

The controller may be configured to determine a degree of coupling between the stimulator element and the sensor element via the indicator elements according to a resonant feature in the frequency spectrum of the measured electrical signal.

The controller may be configured to determine a degree of coupling between the stimulator element and the sensor element via the indicator elements according to a resonant peak or dip in the frequency spectrum of the measured electrical signal.

The controller may be configured to determine a degree of coupling between the stimulator element and the sensor element via the indicator elements according to a shape or Q-factor of the resonant feature.

The controller may be configured to determine a degree of coupling between the stimulator element and the sensor element via the indicator elements according to a frequency of the resonant feature.

The deployable tool may comprise a plurality of stimulator elements.

This may allow measurements of any coupling between different stimulator elements and the sensor element via the indicator elements. This may improve accuracy and/or confidence in the measurement of a degree of coupling between a stimulator element and the sensor element via the indicator elements. A plurality of stimulator elements may also provide one or more spare stimulator elements which may be relied upon in the event of failure of one of the stimulator elements.

Each stimulator element of the plurality of stimulator elements may comprise one or more of the features of which the stimulator element may comprise.

The plurality of stimulator elements may be electrically unconnected.

Each of the stimulator elements may be independently connected to the controller.

The downhole arrangement may be configurable between a first configuration in which coupling between one or more of the indicator elements and the sensor element is prevented and a second configuration in which coupling between one or more of the indicator elements and the sensor element is permitted.

One or more of the indicator elements may be covered so as to prevent coupling of an electromagnetic field provided by one or more of the indicator elements to the sensor element when the downhole arrangement is in the first configuration. One or more of the indicator elements may be accessible for coupling of an electromagnetic field to the sensor element when the downhole arrangement is in the second configuration.

The downhole arrangement may be configurable between the first and second configurations on actuation or de-actuation of the downhole arrangement. Thus, detection of a change in a degree of coupling between one or more of the indicator elements to the sensor element may provide a positive indication of a degree of actuation or a degree of de-actuation of the downhole arrangement.

The downhole arrangement may comprise a plurality of further indicator elements for providing an electromagnetic field which may be coupled to the sensor element.

The plurality of further indicator elements may comprise one or more of the features of which the plurality of indicator elements may comprise. The further indicator elements may be accessible for coupling with the sensor element regardless of a status of the downhole arrangement.

The presence of such further indicator elements may permit identification of the downhole arrangement regardless of a state of the downhole arrangement.

The plurality of further indicator elements may be configured for location downhole of the plurality of indicator elements. This may permit the sensor element of the deployable tool to couple with the plurality of further indicator elements before it detects the plurality of indicator elements as the deployable tool is pulled uphole from a position downhole of the plurality of further indicator elements. If the plurality of further indicator elements are accessible for coupling with the sensor element regardless of a status of the downhole arrangement, this may permit the deployable tool to identify the downhole arrangement via coupling between the plurality of further indicator elements and the sensor element and then check the degree of actuation and/or de-actuation of the downhole arrangement via coupling between the plurality of indicator elements and the sensor element.

According to an eighteenth aspect of the present invention there is provided a method for use in determining the relative position of first and second parts of a downhole arrangement, the method comprising:

providing a distinct electromagnetic field from each indicator element of a plurality of indicator elements, the plurality of indicator elements having a predetermined spatial arrangement relative to the first part of the downhole arrangement;

sensing respective electromagnetic fields coupled from each of the indicator elements to a sensor element; and selectively extending the second part of the downhole arrangement between the sensor element and one or more of the indicator elements according to the relative position of the first and second parts of the downhole arrangement.

The method may comprise determining a degree of coupling of the respective electromagnetic fields from each of the indicator elements to the sensor element.

The method may comprise determining the relative position of the first and second parts of the downhole arrangement from the determined degree of coupling of the respective electromagnetic fields from each of the indicator elements to the sensor element.

The method may comprise selectively extending the second part of the downhole arrangement between the sensor element and one or more of the indicator elements so as to prevent coupling of the respective electromagnetic fields between one or more of the indicator elements and the sensor element.

The method may comprise selectively removing the second part of the downhole arrangement from between the sensor element and one or more of the indicator elements so as to permit coupling of the respective electromagnetic fields between one or more of the indicator elements and the sensor element.

The method may comprise moving or running the sensor element past the plurality of indicator elements.

According to a nineteenth aspect of the present invention there is provided a system for use in determining the relative position of first and second parts of a downhole arrangement, the system comprising:

a first indicator element fixed relative to a first part of the downhole arrangement, the first indicator element being capable of providing a first electromagnetic field;

a second indicator element fixed relative to a second part of the downhole arrangement, the second indicator element being capable of providing a second electromagnetic field which is distinct from the first electromagnetic field; and a sensor arrangement which is capable of sensing and discriminating between the first and second electromagnetic fields coupled from the first and second indicator elements.

Such a system may be beneficial for use in determining a degree to which a downhole arrangement has been actuated.

The electromagnetic field provided by each indicator element may comprise a magnetic field.

The electromagnetic field provided by each indicator element may comprise an electric field.

The electromagnetic field provided by each indicator element may be static.

The electromagnetic field provided by each indicator element may be time-varying.

Such a system does not require any active electronics to be incorporated or embedded into the downhole arrangement.

The downhole arrangement may comprise a downhole tool.

When used in conjunction with a downhole tool, the system may be beneficial for use in measuring a degree of coupling between each indicator element and the sensor arrangement and any changes arising therein on actuation and/or de-actuation of the downhole tool. Such a system may be used to provide positive confirmation of a state of the downhole tool before, during and/or after actuation and/or de-actuation of the downhole tool. Such a system may be used to provide positive confirmation of degree to which the downhole tool has been actuated or de-actuated before, during and/or after actuation and/or de-actuation of the downhole tool.

The system may be configured to measure any degree of coupling between a given indicator element and the sensor arrangement including the case where the given indicator element and the sensor arrangement are completely uncoupled and the degree of coupling between the given indicator element and the sensor arrangement is zero.

The downhole arrangement may be configurable for at least one of fluid injection, stimulation, fracturing and production.

The system may comprise a controller.

The sensor arrangement and the controller may be configured for communication with one another.

The controller may be capable of discriminating electromagnetic fields sensed by the sensor arrangement from the first and second indicator elements.

The controller may be configured to determine a relative position of the first and second parts of the downhole arrangement from the electromagnetic fields sensed by the sensor arrangement from the first and second indicator elements.

The sensor arrangement may be capable of sensing respective electromagnetic fields extending from two or more of the indicator elements at the same time.

The sensor arrangement may be capable of sensing respective electromagnetic fields extending from two or more of the indicator elements at different times.

The sensor arrangement may comprise a plurality of sensor elements.

The plurality of sensor elements may be electrically unconnected.

Each of the sensor elements may be independently connected to the controller.

The plurality of sensor elements may have a predetermined spatial arrangement.

The plurality of sensor elements may have a fixed spatial arrangement.

The sensor elements may be circumferentially distributed around the deployable tool.

The sensor elements may have a uniform circumferential distribution around the deployable tool.

The controller may be configured to determine the position of the first indicator with respect to the plurality of sensor elements from the electromagnetic fields coupled from the first indicator element to the plurality of sensor elements.

The controller may be configured to determine the position of the second indicator with respect to the plurality of sensor elements from the electromagnetic fields sensed coupled from the second indicator element to the plurality of sensor elements.

The controller may be configured to determine a relative position of the first and second parts of the downhole arrangement from each of the determined positions of the first and second indicators with respect to the plurality of sensor elements.

The controller may be configured to log the determined degree of coupling between the indicator elements and the sensor arrangement in a memory.

The deployable tool may comprise the controller.

The downhole arrangement may comprise the controller.

The controller may be configured for communication to surface.

The controller may be located at surface.

The system may comprise a power source for providing power to the controller.

The deployable tool may comprise the power source.

The downhole arrangement may comprise the power source.

The sensor arrangement may be separate from the downhole arrangement.

The downhole arrangement may define a throughbore.

Each indicator element may be arranged to provide an electromagnetic field extending into the throughbore.

The sensor arrangement may be located within the throughbore.

The sensor arrangement may be mounted on a deployable tool.

The deployable tool may be configured for actuating the downhole tool.

The deployable tool may comprise a shifting tool.

The deployable tool may be configured to cause relative movement between the first and second parts of the downhole arrangement.

The deployable tool may be configured to permit the relative position of the first and second parts of the downhole arrangement to be monitored in real-time.

The first and second parts of the downhole arrangement may be configured for relative linear movement.

The first and second parts of the downhole arrangement may be configured for relative rotation.

Each indicator element may be capable of providing a time-varying magnetic field.

Each indicator element may be capable of providing a time-varying output magnetic field in response to the application of a time-varying input magnetic field to the indicator element.

The time-varying magnetic field may have a frequency in the range of 10 kHz to 1 MHz, 50 kHz to 500 kHz, or 100 kHz to 150 kHz.

Coupling of a magnetic field may be possible in such frequency ranges through any wellbore fluids that may be present between the indicator elements and the sensor arrangement.

Each indicator element may have a characteristic frequency response.

The characteristic frequency response may include a characteristic resonant feature.

The characteristic resonant feature may be a resonant peak or a resonant dip.

The characteristic resonant feature may occur at a characteristic resonant frequency.

The controller may be capable of discriminating a characteristic frequency response of one indicator element from a characteristic frequency response of a different indicator element.

The controller may be capable of discriminating a characteristic resonant feature of one indicator element from a characteristic resonant feature of a different indicator element.

Each indicator element may comprise an electrical conductor.

Each indicator element may comprise an insulated electrical conductor.

Each electrical conductor may extend along a path having at least one loop or turn.

Each electrical conductor may extend along a helical path or a spiral path.

Each electrical conductor may comprise at least one turn, loop or coil of wire.

Each electrical conductor may comprise a ring.

Each indicator element may comprise a capacitance.

Each indicator element may comprise a capacitance which is electrically connected between two ends of the electrical conductor.

Such an indicator element may provide a resonant frequency response.

Each indicator element may comprise a capacitor.

Each indicator element may comprise a capacitor which is electrically connected between two ends of the electrical conductor.

Each indicator element may extend circumferentially around the throughbore of the downhole arrangement.

Each indicator element may extend completely around the throughbore of the downhole arrangement. This may enhance the strength of any coupling between the each indicator element and the sensor arrangement. This may allow coupling between each indicator element and the sensor arrangement if the sensor arrangement is circumferentially non-continuous.

Each indicator element may extend part-way around the throughbore of the downhole arrangement.

Each indicator element may be arranged helically about the throughbore of the downhole arrangement.

The first and second indicator elements may be axially distributed.

The first and second indicator elements may be axially separated or axially adjacent to one another.

Each indicator element may be encapsulated in a potting compound.

The downhole arrangement may comprise an indicator element enclosure.

Each indicator element may be housed within the indicator element enclosure.

The indicator element enclosure may be filled with the potting compound.

The potting compound may comprise an epoxy or a elastomeric compound.

The indicator element enclosure may comprise a generally tubular base member and a generally tubular lid member. The base member and the lid member may define a generally annular cavity therebetween. The radial extent of the annular cavity may be selected so as to avoid coupling between the first and second indicator elements and a body portion of the downhole arrangement. Such coupling may alter any coupling between the indicator elements and the sensor element. This may make measurement of a degree of coupling between the indicator elements and the sensor element from the frequency spectrum of the measured electrical signal more difficult.

Each indicator element may be wrapped around the base member.

At least the base member of the indicator element enclosure may be transparent to a magnetic field at a frequency in the range of 10 kHz to 1 MHz, 50 kHz to 500 kHz, or 100 kHz to 150 kHz.

The indicator element enclosure may comprise a polyether ether ketone (PEEK) material.

Each indicator element may extend around an axis arranged along a radial direction relative to a longitudinal axis of the downhole arrangement.

The first and second indicator elements may be circumferentially distributed.

Each indicator element may extend around a different axis, each axis arranged along a different radial direction relative to a longitudinal axis of the downhole arrangement.

Each indicator element may be formed separately from the downhole arrangement and then fitted around the throughbore of the downhole arrangement.

Each indicator element may be formed on a common substrate.

Each indicator element may be formed on a different substrate.

Each substrate may be generally planar.

Each substrate may be electrically insulating.

Each substrate may be flexible.

Each substrate may be fitted around the throughbore of the downhole arrangement.

Each substrate may be fitted around the base member of the indicator element enclosure.

The use of one or more flexible substrates may allow the one or more substrates to be fitted around, to adopt or to comply with a non-planar geometry. For example, this may allow the one or more substrates to be fitted around, to adopt or to comply with the throughbore of the downhole arrangement or an outer surface of the base member of the indicator element enclosure.

Each indicator element may be formed by printing, writing, depositing or otherwise applying an electrically conductive material to a substrate. Thus, each indicator element may be formed using a relatively inexpensive manufacturing technique.

Each indicator element may comprise an electrically conductive path or track defined on a substrate.

Each indicator element may define an electrically conductive path or track on a substrate having a different configuration to the electrically conductive path or track of every other indicator element.

Each indicator element may have a generally convoluted configuration.

Each indicator element may have a spiral configuration.

Each indicator element may comprise one or more turns.

Each turn of each indicator element may have a curvature which increases towards a centre of the indicator element.

Each turn of each indicator element may comprise one or more straight sections.

Each substrate may be configured to support a capacitor.

The capacitor may be electrically connected between two ends of the electrically conductive path or track defined on the substrate.

Each substrate may define a capacitance between two ends of the electrically conductive path or track defined on the substrate.

Each substrate may comprise a dielectric material.

Each substrate may comprise a layer of dielectric material.

Each substrate may comprise an electrically conductive layer which is separated from the electrically conductive path or track by a layer of dielectric material so as to define a predetermined capacitance between two ends of the electrically conductive path or track.

Each substrate may comprise a dielectric material which extends through a thickness of the substrate.

Each substrate may comprise an electrically conductive back-plane which is separated from the electrically conductive path or track by the dielectric material of the substrate so as to define a predetermined capacitance between two ends of the electrically conductive path or track.

Each indicator element may comprise an electrically conductive ring.

The ring may comprise a metal.

The ring may extend around the throughbore of the downhole arrangement.

The ring may be defined by an annular portion of the downhole arrangement.

Each indicator element may be capable of providing a distinct magnetic field.

At least two of the indicator elements may be capable of providing magnetic fields of a different polarity.

At least two of the indicator elements may be capable of providing magnetic fields of a different strength.

Each indicator element may be capable of providing a static magnetic field.

Each indicator element may comprise a magnet.

Each indicator element may comprise a permanent magnet.

Each indicator element may comprise an electromagnet.

The plurality of indicator elements may comprise a plurality of substantially identical magnets, each magnet having a different orientation relative to the sensor arrangement.

The plurality of indicator elements may comprise a plurality of substantially identical magnets and a plurality of magnetic field attenuators, each magnetic field attenuator being located between a corresponding magnet and the sensor arrangement, and each magnetic field attenuator being configured to provide a different level of magnetic field attenuation.

The plurality of indicator elements may comprise a plurality of substantially identical magnets and a plurality of magnetic field apertures, each magnetic field aperture being located between a corresponding magnet and the sensor arrangement, and each magnetic field aperture being configured to spatially limit the extent of the magnetic field to a different degree.

The sensor arrangement may comprise an electrical conductor.

The sensor arrangement may comprise an insulated electrical conductor.

The sensor arrangement may extend along a path having at least one loop or turn.

The sensor arrangement may extend along a helical path or a spiral path.

The sensor arrangement may comprise at least one turn, loop or coil of wire.

The sensor arrangement may comprise a ring.

The sensor arrangement may comprise an electrical conductor which extends circumferentially around the deployable tool.

The sensor arrangement may extend completely around the deployable tool. This may enhance the strength of any coupling between the between the indicator elements and the sensor arrangement. This may allow coupling between the indicator elements and the sensor arrangement if the indicator elements are circumferentially non-continuous.

The sensor arrangement may extend part-way around the deployable tool.

The sensor arrangement may be arranged helically around the deployable tool.

The sensor arrangement may be arranged helically around a body portion of the deployable tool. Such an orientation of the sensor arrangement may be accommodated on the deployable tool without unduly increasing the radial extent of the deployable tool.

The sensor arrangement may extend around an axis arranged radially relative to a longitudinal axis of the downhole arrangement. Such an orientation of the sensor arrangement may serve to enhance coupling with a magnetic field extending from the indicator elements of the downhole arrangement.

The sensor arrangement may comprise a plurality of sensor elements.

The plurality of sensor elements may be electrically unconnected.

Each of the sensor elements may be independently connected to the controller.

The controller may be configured to measure an electrical signal existing on each sensor element of the sensor arrangement.

The plurality of sensor elements may have a predetermined spatial arrangement.

The plurality of sensor elements may have a fixed spatial arrangement.

Each sensor element may be coupled to one or more of the indicator elements simultaneously.

Each sensor element may be coupled to one or more of the indicator elements sequentially.

Each sensor element may be provided on the deployable tool.

The sensor elements may be circumferentially distributed around the deployable tool.

The sensor elements may have a uniform circumferential distribution around the deployable tool.

The controller may be configured to determine the position of the first indicator element with respect to the plurality of sensor elements from the electromagnetic field coupled to each of the sensor elements from the first indicator element.

The controller may be configured to determine the position of the second indicator with respect to the plurality of sensor elements from the electromagnetic field coupled to each of the sensor elements from the second indicator element.

The controller may be configured to determine a relative position of the first and second parts of the downhole arrangement from each of the determined positions of the first and second indicators with respect to the plurality of sensor elements.

The sensor arrangement may be formed separately from the deployable tool and then fitted around the deployable tool.

The sensor arrangement may be formed on a substrate.

The substrate may be generally planar.

The substrate may be electrically insulating.

The substrate may be flexible.

The substrate may be fitted around the deployable tool.

The substrate may be fitted around the base member of the sensor element enclosure.

The use of a flexible substrate may allow the substrate to be fitted around, to adopt or to comply with a non-planar geometry. For example, this may allow the substrate to be fitted around, to adopt or to comply with the deployable tool or an outer surface of the base member of the sensor arrangement enclosure.

The substrate may be rigid.

The sensor arrangement may be formed by printing, writing, depositing or otherwise applying an electrically conductive material to the substrate.

The sensor arrangement may comprise an electrically conductive path or track defined on the substrate.

The sensor arrangement may have a generally convoluted configuration.

The sensor arrangement may have a spiral configuration.

Each turn of the sensor arrangement may have a curvature which increases towards a centre of the sensor arrangement.

Each turn of the sensor arrangement may comprise one or more straight sections. Each turn, loop, coil or ring of the sensor arrangement may extend around a different axis, each axis arranged along a different radial direction relative to a longitudinal axis of the deployable tool.

The sensor arrangement may be encapsulated in a potting compound. Encapsulation of the sensor arrangement may provide protection for the sensor arrangement from an environment surrounding the sensor arrangement.

The deployable tool may comprise a sensor arrangement enclosure.

The sensor arrangement may be housed within the sensor arrangement enclosure.

The sensor arrangement enclosure may be filled with the potting compound. Filling the sensor arrangement enclosure with a potting compound may provide support for the sensor arrangement enclosure and provide enhanced environmental and mechanical protection for the sensor arrangement.

The potting compound may comprise an epoxy or an elastomeric compound.

The sensor arrangement enclosure may comprise a generally tubular base member and a generally tubular lid member.

The sensor elements may be wrapped around the base member.

At least the lid member of the sensor arrangement enclosure may be transparent to a magnetic field at a frequency in the range of 10 kHz to 1 MHz, 50 kHz to 500 kHz, or 100 kHz to 150 kHz.

The sensor arrangement enclosure may comprise a polyether ether ketone (PEEK) material. As well as being relatively transparent to an electromagnetic field in the frequency range of the magnetic field, PEEK is a relatively inert material and may be formed and/or machined.

The sensor arrangement may comprise a magnetic field sensor.

The sensor arrangement may comprise a plurality of magnetic field sensors.

The sensor arrangement may comprise a Hall effect sensor.

The sensor arrangement may comprise a plurality of Hall effect sensors.

The system may comprise a stimulator arrangement.

The stimulator arrangement may comprise a plurality of stimulator elements.

The plurality of stimulator elements may be electrically unconnected.

Each of the stimulator elements may be independently connected to the controller.

The plurality of stimulator elements may have a predetermined spatial arrangement.

The plurality of stimulator elements may have a fixed spatial arrangement.

Each stimulator element may be likened to a primary coil of a transformer and each of the indicator elements may be likened to a different secondary coil of a transformer. The sensor arrangement may be likened to a tertiary coil which is coupled to a time-varying magnetic field of the transformer for interrogation thereof.

Each stimulator element may be coupled to one or more of the indicator elements simultaneously.

Each stimulator element may be coupled to one or more of the indicator elements sequentially.

Each stimulator element may be provided on the deployable tool.

Each stimulator element may be electrically independent of the sensor arrangement.

This may at least partially isolate an electrical signal induced in the sensor arrangement from electrical signals applied to the stimulator elements. This may reduce electrical noise induced in the sensor arrangement, thereby improving measurement sensitivity.

The stimulator elements may be circumferentially distributed around the deployable tool.

The stimulator elements may have a uniform circumferential distribution around the deployable tool.

The controller may be configured to determine the position of the first indicator with respect to the plurality of stimulator elements from the electromagnetic field coupled to the sensor arrangement from the first indicator element for each stimulator element.

The controller may be configured to determine the position of the second indicator with respect to the plurality of stimulator elements from the electromagnetic field coupled to the sensor arrangement from the second indicator element for each stimulator element.

The controller may be configured to determine a relative position of the first and second parts of the downhole arrangement from each of the determined positions of the first and second indicators with respect to the plurality of stimulator elements.

Each of the stimulator elements may comprise an electrical conductor which extends circumferentially around the deployable tool.

Each of the stimulator elements may extend completely around the deployable tool. This may enhance the strength of any coupling between the between each stimulator element and the first and/or second indicator elements. This may allow coupling between each stimulator element and the first and/or second indicator elements if the first and/or second indicator elements are circumferentially non-continuous.

Each of the stimulator elements may extend part-way around the deployable tool.

Each of the stimulator elements may be arranged helically around the deployable tool.

Each of the stimulator elements may be arranged helically around a body portion of the deployable tool. Such an orientation of the stimulator elements may be accommodated on the deployable tool without unduly increasing the radial extent of the deployable tool.

Each of the stimulator elements may be encapsulated in a potting compound. Encapsulation of the stimulator elements may provide protection for the stimulator elements from an environment surrounding the stimulator element.

Each of the stimulator elements may be housed within the sensor arrangement enclosure.

The stimulator elements may extend around an axis arranged radially relative to a longitudinal axis of the downhole arrangement. Such an orientation of the stimulator elements may serve to enhance coupling of a respective magnetic field extending from each of the stimulator elements to the indicator elements of the downhole arrangement.

The stimulator elements may be formed separately from the deployable tool and then fitted around the deployable tool.

The stimulator elements may be formed on a substrate.

The substrate may be generally planar.

The substrate may be electrically insulating.

The substrate may be flexible.

The substrate may be fitted around the deployable tool.

The substrate may be fitted around the base member of the stimulator element enclosure.

The use of a flexible substrate may allow the substrate to be fitted around, to adopt or to comply with a non-planar geometry. For example, this may allow the substrate to be fitted around, to adopt or to comply with the deployable tool or an outer surface of the base member of the stimulator element enclosure.

The substrate may be rigid.

Each of the stimulator elements may be formed by printing, writing, depositing or otherwise applying an electrically conductive material to the substrate.

Each of the stimulator elements may comprise an electrically conductive path or track defined on the substrate.

Each of the stimulator elements may have a generally convoluted configuration.

Each of the stimulator elements may have a spiral configuration.

Each turn of each stimulator element may have a curvature which increases towards a centre of the stimulator element.

Each turn of each stimulator element may comprise one or more straight sections. Each turn, loop, coil or ring of each stimulator element may extend around a different axis, each axis arranged along a different radial direction relative to a longitudinal axis of the deployable tool.

The stimulator arrangement may be oriented orthogonally to the sensor arrangement. For example, the sensor arrangement may be arranged helically around a body portion of the deployable tool. The stimulator arrangement may extend around one or more axes which are arranged radially relative to a longitudinal axis of the deployable tool. Each turn, loop, coil or ring of the stimulator arrangement may be elongated in an axial direction relative to a longitudinal axis of the deployable tool.

Conversely, the stimulator arrangement may be arranged helically around a body portion of the deployable tool. The sensor arrangement may extend around one or more axes which are arranged radially relative to a longitudinal axis of the deployable tool. Each turn, loop, coil or ring of the sensor arrangement may be elongated in an axial direction relative to a longitudinal axis of the deployable tool.

Such orthogonal arrangements of the stimulator and sensor arrangements may mean that the electromagnetic field coupled from the stimulator arrangement is generally orthogonally oriented relative to an electromagnetic field coupled to the sensor arrangement. This may reduce any cross-coupling of the magnetic field from the stimulator arrangement directly to the sensor arrangement. This may reduce noise on the signal induced in the sensor arrangement, thereby improving measurement sensitivity.

The controller may be electrically connected to each of the stimulator elements.

The controller may be configured to generate and apply an electrical signal to each of the stimulator elements.

The controller may be configured to generate and apply an electrical signal to each of the stimulator elements one at a time.

The controller may be configured to measure an electrical signal existing on the sensor arrangement when stimulating the indicator elements using each of the stimulator elements.

The controller may be configured to determine a degree of coupling between the stimulator arrangement and the sensor arrangement via the indicator elements from the measured electrical signal.

The controller may be configured to determine a degree of coupling between the stimulator arrangement and the sensor arrangement via the indicator elements according to a frequency spectrum of the measured electrical signal.

The controller may be configured to determine a degree of coupling between the stimulator arrangement and the sensor arrangement via the indicator elements according to the shape of the frequency spectrum of the measured electrical signal.

The controller may be configured to determine a degree of coupling between the stimulator arrangement and the sensor arrangement via the indicator elements according to a resonant feature in the frequency spectrum of the measured electrical signal.

The controller may be configured to determine a degree of coupling between the stimulator arrangement and the sensor arrangement via the indicator elements according to a resonant peak or dip in the frequency spectrum of the measured electrical signal.

The controller may be configured to determine a degree of coupling between the stimulator arrangement and the sensor arrangement via the indicator elements according to a shape or Q-factor of the resonant feature.

The controller may be configured to determine a degree of coupling between the stimulator arrangement and the sensor arrangement via the indicator elements according to a frequency of the resonant feature.

The downhole arrangement may comprise a plurality of further indicator elements for providing an electromagnetic field which may be coupled to the sensor arrangement.

The plurality of further indicator elements may comprise one or more of the features of which the plurality of indicator elements may comprise. The further indicator elements may be accessible for coupling with the sensor arrangement regardless of a status of the downhole arrangement. The presence of such further indicator elements may permit identification of the downhole arrangement regardless of the state of the downhole arrangement.

The plurality of further indicator elements may be configured for location downhole of the plurality of indicator elements. This may permit the sensor arrangement of the deployable tool to couple with the plurality of further indicator elements before it detects the plurality of indicator elements as the deployable tool is pulled uphole from a position downhole of the plurality of further indicator elements. If the plurality of further indicator elements are accessible for coupling with the sensor arrangement regardless of a status of the downhole arrangement, this may permit the deployable tool to identify the downhole arrangement via coupling between the plurality of further indicator elements and the sensor arrangement and then check the degree of actuation and/or de-actuation of the downhole arrangement via coupling between the plurality of indicator elements and the sensor arrangement.

According to a twentieth aspect of the present invention there is provided a method for use in determining the relative position of first and second parts of a downhole arrangement, the method comprising:

coupling a first electromagnetic field from a first indicator element to a sensor arrangement, the first indicator element being fixed relative to a first part of the downhole arrangement;

coupling a second electromagnetic field from a second indicator element to the sensor arrangement, the second electromagnetic field being distinct from the first electromagnetic field, and the second indicator element being fixed relative to a second part of the downhole arrangement; and using the sensor arrangement to sense and discriminate between the first and second electromagnetic fields.

The method may comprise determining a degree of coupling of the first and second electromagnetic fields to the sensor arrangement.

The method may comprise determining the relative position of the first and second parts of the downhole arrangement from the determined degree of coupling of the first and second electromagnetic fields to the sensor arrangement.

The method may comprise selectively moving the first and second parts of the downhole arrangement relative to one another so as to change the first and second electromagnetic fields coupled to the sensor arrangement.

The method may comprise moving or running the sensor arrangement past the first and second indicator elements.

BRIEF DESCRIPTION OF THE DRAWINGS

The present invention will be further described by way of non-limiting example only with reference to the following drawings of which:

FIG. 1(a) is a schematic of a system for use in downhole communication or detection prior to actuation of a downhole arrangement;

FIG. 1(b) is a schematic of the system of FIG. 1(a) after actuation of the downhole arrangement;

FIG. 5(a) is a schematic of an alternative system for use in downhole communication or detection during identification of a downhole arrangement but prior to actuation of the downhole arrangement;

FIG. 5(b) is a schematic of the system of FIG. 5(a) after identification of the downhole arrangement but prior to actuation of the downhole arrangement;

FIG. 5(c) is a schematic of the system of FIG. 5(a) after actuation of the downhole arrangement;

FIG. 6(a) is a schematic of a plurality of further secondary elements of the system of FIGS. 5(a)-5(c);

FIG. 6(b) is a schematic of a first alternative plurality of further secondary elements of the system of FIGS. 5(a)-5(c);

FIG. 18 is a schematic side view of a system for use in determining a relative position of first and second parts of a downhole arrangement;

FIG. 20(a) is a schematic side view of an alternative system for use in downhole communication or detection; and FIG. 20(b) is a schematic cross-section on AA of the system of FIG. 20(a).

DETAILED DESCRIPTION OF THE DRAWINGS

Figure 2A:
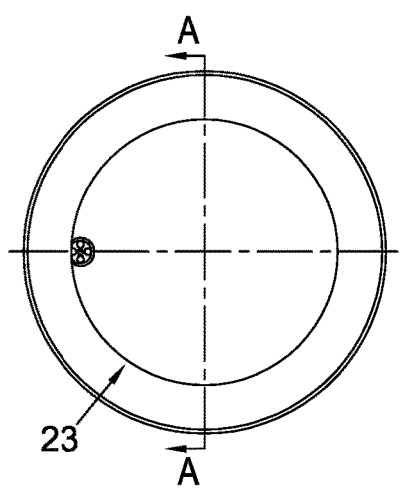
FIG. 2(a) is an end elevation of a primary enclosure for a primary element of the system of FIGS. 1(a) and 1(b)

Terms such as "up", "down", "upward", "downward", "uphole", "downhole" and the like are used in the following description of the drawings for ease of illustration only. One skilled in the art will understand that such terms are intended to refer to the particular orientation of the features shown in drawings, but are not intended to be limiting. For example, terms such as "up", "upward" and "uphole" may be used to refer to a direction along a borehole towards a point of entry of the borehole into the ground or the seabed, whilst terms such as "down", "downward" and "downhole" may be used to refer to a direction along a borehole away from the point of entry. As such, when a borehole is deviated from the vertical or is horizontal, such terms may refer to a direction which differs significantly from a vertical direction and may even refer to a horizontal direction.

Referring initially to FIG. 1(a) there is shown a system for downhole detection generally designated 10 installed within a wellbore 12. The wellbore 12 may comprise a borehole wall of an open hole section of an oil or gas well or may comprise a liner or a casing installed within an oil or gas well. The system 10 comprises a deployable tool in the form of a shifting tool generally designated 14 deployed within a through bore 16 of a downhole arrangement in the form of a downhole tool generally designated 18. The downhole tool 18 may be configured for at least one of injection, stimulation, fracturing and production. It should, however, be understood that the system 10 of FIG. 1(a) is not limited to use in such downhole operations, but may be used in other downhole operations.

The shifting tool 14 comprises a generally tubular body 20, a primary element in the form of an electrically insulated primary coil 22 housed within a generally annular primary enclosure 23, a controller 24 and a power source 26. The power source 26 is connected to the controller 24 for the provision of power thereto. The controller 24 is connected to the primary coil 22 for the application of an electrical signal thereto as will be described in more detail below.

The downhole tool 18 comprises a generally tubular body 30 which defines the through bore 16, a cover sleeve 32 which is slideable relative to the tubular body 30, and a secondary element 33 which includes an electrically insulated secondary coil 34 and a capacitor which is described in more detail with reference to FIG. 3 below. The secondary element 33 is housed within a generally annular secondary enclosure 35. The cover sleeve 32 is arranged radially inwardly of the secondary element 33 relative to a longitudinal axis 36 of the downhole tool 18. The downhole tool 18 is configured so that the cover sleeve 32 slides relative to the tubular body 30 of the downhole tool 18 in response to actuation of the downhole tool 18.

Figure 2B:
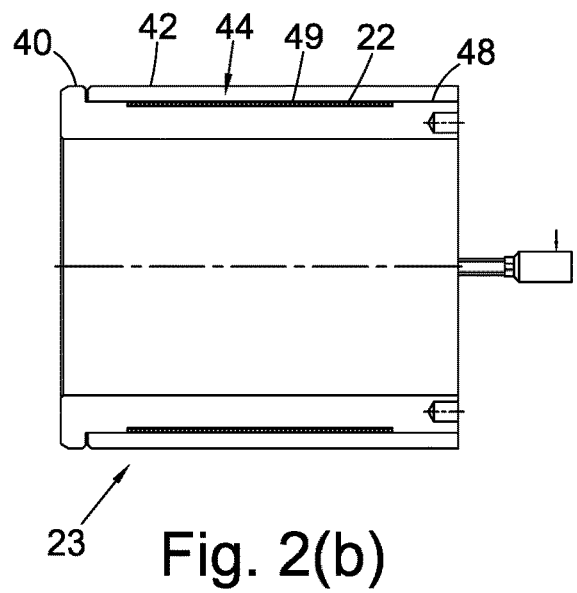
FIG. 2(b) is a longitudinal cross-section on AA of the primary enclosure of FIG. 2(a)

FIGS. 2(a) and 2(b) show the primary coil 22 housed within the primary enclosure 23. The primary enclosure 23 is formed from a polyether ether ketone (PEEK) material. The primary enclosure 23 comprises a generally tubular base member 40 and a tubular lid member 42. The base member 40 defines an annular recess 44 in an outer surface 48 thereof. The primary coil 22 is wrapped around the base member 40 within the recess 42. The lid member 42 is configured to fit around the outer surface 48 of the base member 40 so as to define an annular cavity 49 which encloses the primary coil 22. The cavity 49 is filled with the epoxy potting compound (not shown) so as to encapsulate the primary coil 22 thereby providing mechanical support to the primary enclosure 23 and enhancing the environmental protection provided by the primary enclosure 23 to the primary coil 22.

Figure 3:
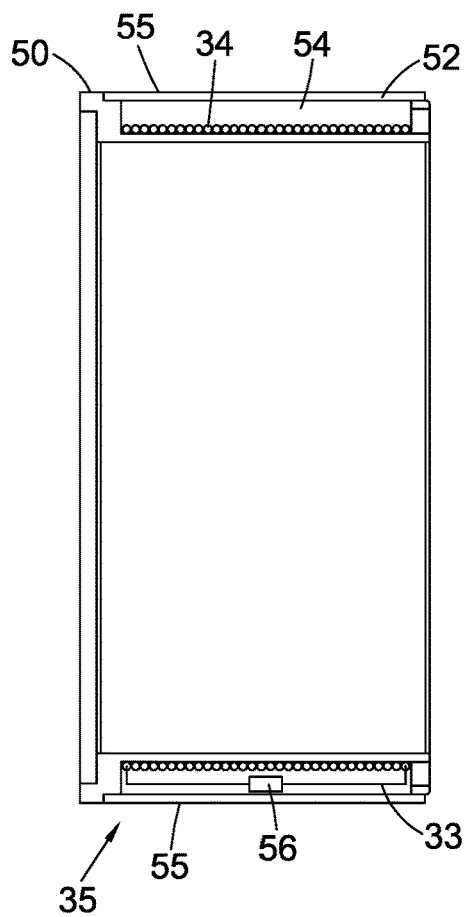
FIG. 3 is a longitudinal cross-section of a secondary enclosure for a secondary element of the system of FIGS. 1(a) and 1(b)

FIG. 3 shows the secondary coil 34 housed within the secondary enclosure 35. The secondary enclosure 35 is formed from a polyether ether ketone (PEEK) material. The secondary enclosure 35 comprises a generally tubular base member 50 and a tubular lid member 52 which co-operate so as to define a generally annular cavity 54. The secondary coil 34 is wrapped around the base member 50 within the cavity 54. The secondary enclosure 35 is configured so as to provide a radial separation between the secondary coil 34 and an outer surface 55 of the lid member 52. Such a radial separation may serve to reduce any electromagnetic coupling between the secondary coil 34 and the body 30 of the downhole tool 18. The two ends of the electrically conductive core of the secondary coil 34 are electrically connected to the capacitor 56 of the secondary element 33. The cavity 54 is filled with the epoxy potting compound (not shown) so as to encapsulate the secondary coil 34 and the capacitor 56 thereby providing mechanical support to the secondary enclosure 35 and enhancing the environmental protection provided by the secondary enclosure 35 to the secondary coil 34 and the capacitor 56.

In use, the shifting tool 14 is deployed downwardly through the through bore 16 defined by the downhole tool 18 until the shifting tool 14 is located downhole from the downhole tool 18. The controller 24 generates and applies an alternating current (AC) electrical signal to the primary coil 22 and measures an electrical signal existing on the primary coil 22. The controller 24 repeatedly sweeps the frequency of the applied electrical signal from 100 kHz to 150 kHz as shown in the uppermost traces in FIGS. 4(a) and 4(b) and monitors the measured electrical signal as the shifting tool 14 is pulled uphole from a position in which the primary coil 22 is located downhole from the secondary coil 34.

Prior to actuation of the downhole tool 18 as shown in FIG. 1(a), the cover sleeve 32 extends between the secondary coil 34 and the longitudinal axis 36 so as to cover the secondary coil 34. Accordingly, inductive coupling between the primary and secondary coils 22, 34 is prevented by the cover sleeve 32 prior to actuation of the downhole tool 18. The corresponding measured electrical signal in the absence of any electromagnetic coupling between the primary and secondary coils 22, 34 is shown in the middle trace in FIG. 4(a) as a function of time and the corresponding envelope of the measured electrical signal as a function of time is shown in the lowermost trace of FIG. 4(a). Since the frequency is proportional to time within any given frequency sweep period, one skilled in the art will understand that the electrical signal shown in the lowermost trace of FIG. 4(a) is representative of a magnitude frequency spectrum of the electrical signal.

Figure 4B:
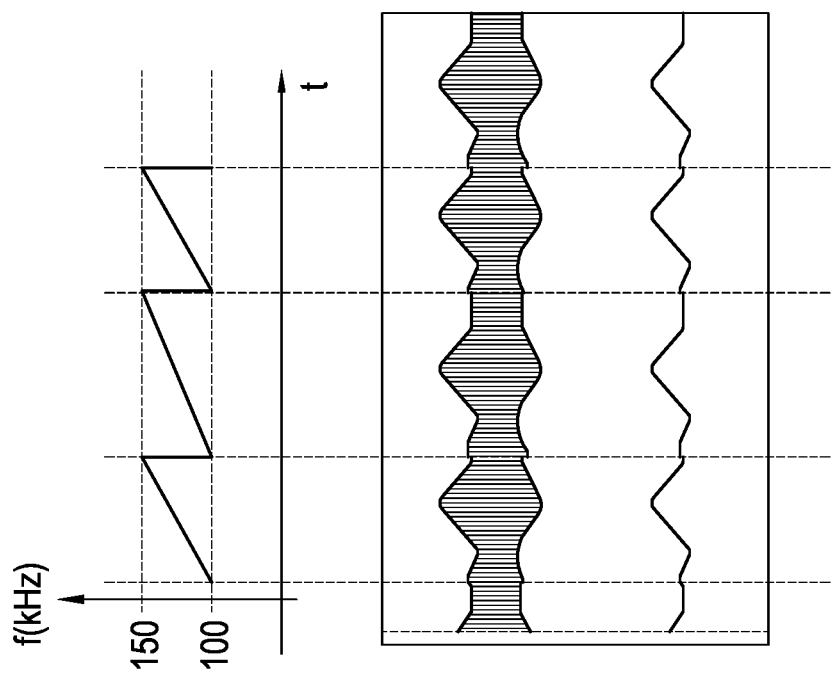
FIG. 4(b) shows frequency response traces measured when the primary and secondary elements are electromagnetically coupled as shown in FIG. 1(b)
Figure 4A:
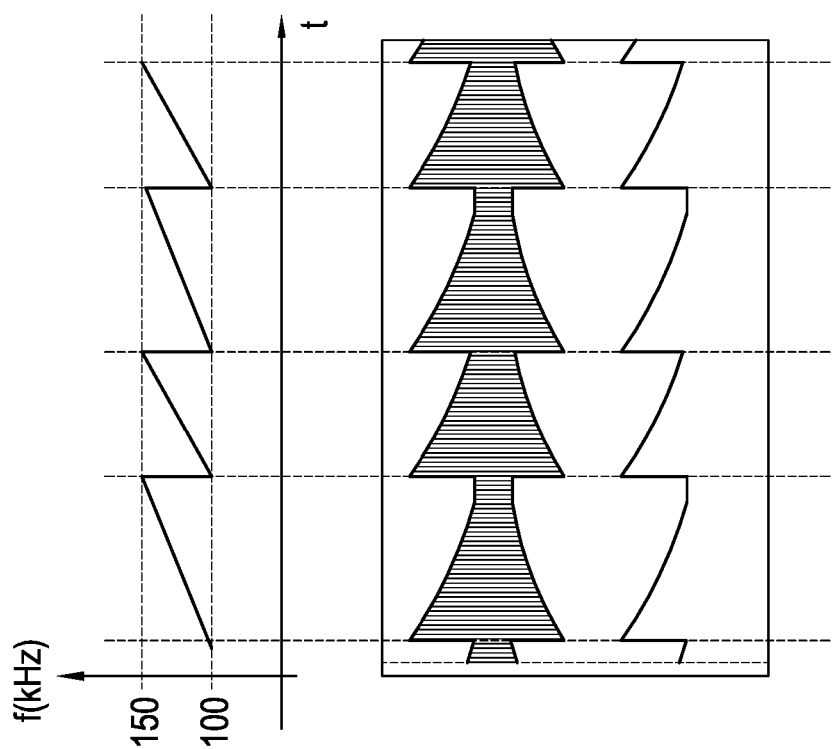
FIG. 4(a) shows frequency response traces measured without any electromagnetic coupling between primary and secondary elements corresponding to the configuration of the system shown in FIG. 1(a)

As shown in FIG. 4(a), the measured electrical signal in the absence of any inductive coupling between the primary and secondary coils 22, 34 generally decreases as the frequency of the applied electrical signal is swept from 100 kHz to 150 kHz. The controller 24 is configured to interpret detection of such a measured electrical signal as an indication that the downhole tool 18 is in a de-actuated state.

After actuation of the downhole tool 18 as shown in FIG. 1(b), the cover sleeve 32 is withdrawn from between the secondary coil 34 and the longitudinal axis 36 so as to reveal or provide access to the secondary coil 34 from the through-bore 16. Accordingly, after actuation of the downhole tool 18 inductive coupling between the primary and secondary coils 22, 34 may occur when the primary and secondary coils 22, 34 are axially aligned as shown in FIG. 1(b). This results in the induction of an alternating current in the secondary coil 34. This in turn modifies the electrical signal existing on the primary coil 22. The electrical signal measured on the primary coil when the primary and secondary coils 22, 34 are inductively coupled is shown in the middle trace of FIG. 4(b) as a function of time and the corresponding envelope of the measured electrical signal as a function of time is shown in the lower trace of FIG. 4(b).

As for FIG. 4(a), since the frequency is proportional to time within any given frequency sweep period, one skilled in the art will understand that the electrical signal shown in the lowermost trace of FIG. 4(b) is representative of a magnitude frequency spectrum of the electrical signal.

As shown in FIG. 4(b), the envelope of the measured electrical signal when the primary and secondary coils 22, 34 are inductively coupled displays a resonant peak close to a frequency of 125 kHz at the centre of the swept frequency range of 100 kHz to 150 kHz. The controller 24 is configured to interpret detection of such a resonant peak in the envelope of the measured electrical signal as an indication that the downhole tool 18 is in an actuated state.

In view of the foregoing description, the system 10 may be used to determine the status of the downhole tool 18. The controller 24 may log the determined status of the downhole tool 18 for analysis after recovery of the shifting tool 14 to surface. Additionally or alternatively, the controller 24 may comprise a transmitter (not shown) for transmission of the determined status to a surface receiver, for example via an electric line which connects the shifting tool 14 to surface.

With reference now to FIG. 5, there is shown an alternative system for downhole detection generally designated 110. The system 110 and the system 10 comprise many like features, and, as such, like features are identified with like reference numerals. The system 110 comprises a deployable tool in the form of a shifting tool generally designated 114 deployed within a through bore 116 of a downhole arrangement in the form of a downhole tool generally designated 118. The shifting tool 114 comprises a generally tubular body 120, a primary element in the form of a primary coil 122 housed within a generally annular primary enclosure 123, a controller 124 and a power source 126. The power source 126 is connected to the controller 124 for the provision of power thereto. The controller 124 is connected to the primary coil 122 for the application of an electrical signal thereto as will be described in more detail below.

The downhole tool 118 comprises a generally tubular body 130 which defines the through bore 116, a cover sleeve 132 which is slideable relative to the tubular body 130, and a secondary element 133 which includes an electrically insulated secondary coil 134 and a capacitor (not shown) housed within a generally annular secondary enclosure 135. The cover sleeve 132 is arranged radially inwardly of the secondary coil 134 relative to a longitudinal axis 136 of the downhole tool 118. The downhole tool 118 is configured so that the cover sleeve 132 slides relative to the tubular body 130 of the downhole tool 118 in response to actuation of the downhole tool 118.

Unlike the downhole tool 18, the downhole tool 118 comprises a plurality of further secondary elements in the form of a plurality of rings or a ring arrangement generally designated 170. The ring arrangement 170 is located downhole of the secondary coil 134 as shown in detail in FIG. 6(a). Each ring of the ring arrangement 170 has a first data configuration, a second data configuration or a checking configuration. In FIG. 6(a), rings configured according to the first data configuration are identified by reference numeral 172, rings configured according to the second data configuration are identified by reference numeral 174 and rings configured according to the checking configuration are identified by reference numeral 176. The rings 172, 174 and 176 have the same inner diameter. The rings 172, 174 and 176 have the same outer diameter.

Rings 172, 174 of the first and second data configurations are formed from steel. A checking ring 176 is formed from an electrically insulating material such as PEEK and or an elastomeric material. Rings 172 of the first data configuration have an axial extent which is twice the axial extent of the rings 174 of the second data configuration. The checking rings 176 have the same axial extent as the rings of the second data configuration 174.

The ring arrangement 170 comprises a first axially outer series of rings 180 at a downhole end 182 of the ring arrangement 170, a second axially outer series of rings 184 at an uphole end 186 of the ring arrangement 170, and an axially inner series of rings 188 located axially intermediate the first and second axially outer series of rings 180, 184. In order of appearance from the downhole end 182 of the ring arrangement 170, the first axially outer series of rings 180 comprises a ring 174, a ring 172 and a ring 174. As will be described in more detail below, the first axially outer series of rings 180 may serve to indicate a start or downhole end of the axially inner series of rings 188.

In the axially inner series of rings 188, alternate rings are checking rings 176 and each checking ring 176 is intermediate a ring 172 or a ring 174. As will be described in more detail below, the rings 172, 174 of the axially inner series of rings 188 define a binary code.

In order of appearance from the downhole end 182 of the ring arrangement 170, the second axially outer series of rings 184 comprises a ring 172, a ring 174 and a ring 172. As will be described in more detail below, the second axially outer series of rings 184 may serve to indicate an uphole end of the axially inner series of rings 188.

In use, the controller 124 generates and applies an alternating current (AC) electrical signal to the primary coil 122 and measures an electrical signal existing on the primary coil 122. The controller 124 repeatedly sweeps the frequency of the applied electrical signal from 100 kHz to 150 kHz and monitors the measured electrical signal as the shifting tool 114 is pulled uphole from a position in which the primary coil 122 is located downhole from the ring arrangement 170.

As the primary coil 122 passes the ring arrangement 170, the controller 124 repeatedly measures a magnitude frequency spectrum of the measured electrical signal. The magnitude frequency spectrum of the measured electrical signal varies according to any inductive coupling between the primary coil 122 and each ring 172, 174 and 176 of the ring arrangement 170. The first data configuration, the second data configuration and the checking configuration are designed such that rings configured according to different configurations provide different characteristic frequency spectra. The different characteristic frequency spectra may, for example, differ in shape. The different characteristic frequency spectra may have different spectral features. The different spectral features may, for example, have a different frequency. The different characteristic frequency spectra may have different resonant features. The different characteristic frequency spectra may have resonant features of a different shape. The different characteristic frequency spectra may have resonant features having a different Q-factor or the like.

The controller 124 is configured so as to identify the characteristic frequency spectrum of a ring 172 as a first binary symbol or a '1', and to identify the characteristic frequency spectrum of a ring 174 as a second binary symbol or a '0'. As the primary coil 122 passes the first axially outer series of rings 180, the controller 124 detects a code of '010'. The controller 124 treats the subsequent frequency spectra of the measured electrical signal for each of the rings of the axially inner series of rings 188 as symbols of a code until the primary coil 122 passes the second axially outer series of rings 184 and the controller 124 detects a code of '101'. The repeated appearance of a checking ring 176 enables the controller 124 to perform a checking function in which the series of frequency spectra of the measured electrical signal is checked to ascertain whether the frequency spectrum of the measured electrical signal corresponding to the checking rings 176 is detected in the correct repeating sequence. This may permit a series of readings obtained while the primary coil 122 is stationary relative to the ring arrangement 170 to be distinguished from a series of readings obtained as the primary coil 122 is run past the ring arrangement 170.

The code defined by the rings of the axially inner series of rings 188 may define a unique identification number for the downhole tool 118. Once the controller 124 has determined the code defined by the rings of the axially inner series of rings 188, the controller 124 may actuate the downhole tool 118. The secondary coil 134 may subsequently be used to determine whether the downhole tool 118 has been successfully actuated. Additionally or alternatively, the controller 124 may log the determined code or transmit the same to a surface receiver (not shown). Additionally or alternatively, the controller 124 may be configured to receive a command from a surface transmitter (not shown) for actuating the downhole tool depending on the code transmitted to the surface receiver (not shown).

An alternative plurality of further secondary elements in the form of a plurality of rings or a ring arrangement 270 is shown FIG. 6(b). The ring arrangement 270 of FIG. 6(b) shares many like features with the ring arrangement 170 of FIG. 6(a) and, as such, like features share like reference numerals. Each ring of the ring arrangement 270 has a first data configuration, a second data configuration or a checking configuration. In FIG. 6(b), rings configured according to the first data configuration are identified by reference numeral 272, rings configured according to the second data configuration are identified by reference numeral 274 and rings configured according to the checking configuration are identified by reference numeral 276. The rings 272, 274 and 276 have the same axial extent and the same outer diameter, but different inner diameters. The difference in inner diameter of the different configurations of rings 272, 274 and 276 means that the controller 124 measures a different characteristic frequency spectrum of the measured electrical signal for each different configuration.

Figure 7B:
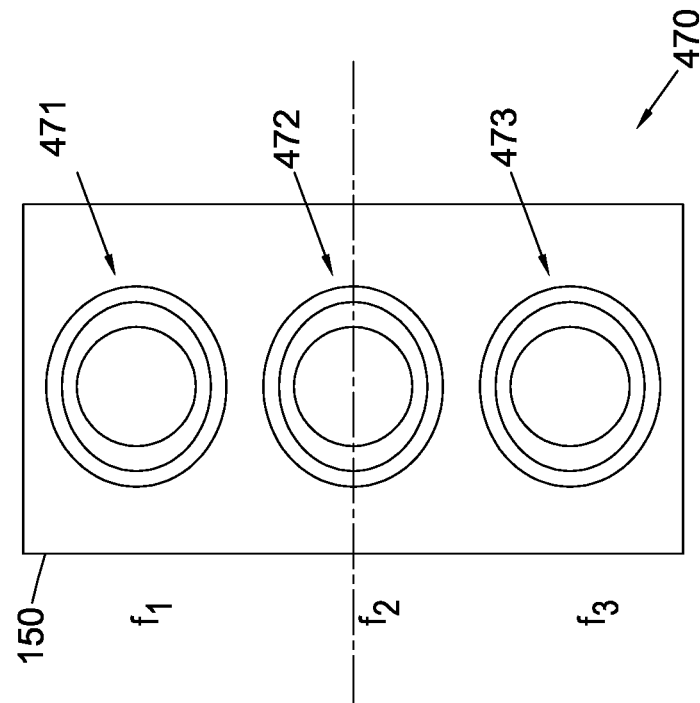
FIG. 7(b) is a schematic of a third alternative plurality of further secondary elements of the system of FIGS. 5(a)-5(c)
Figure 7A:
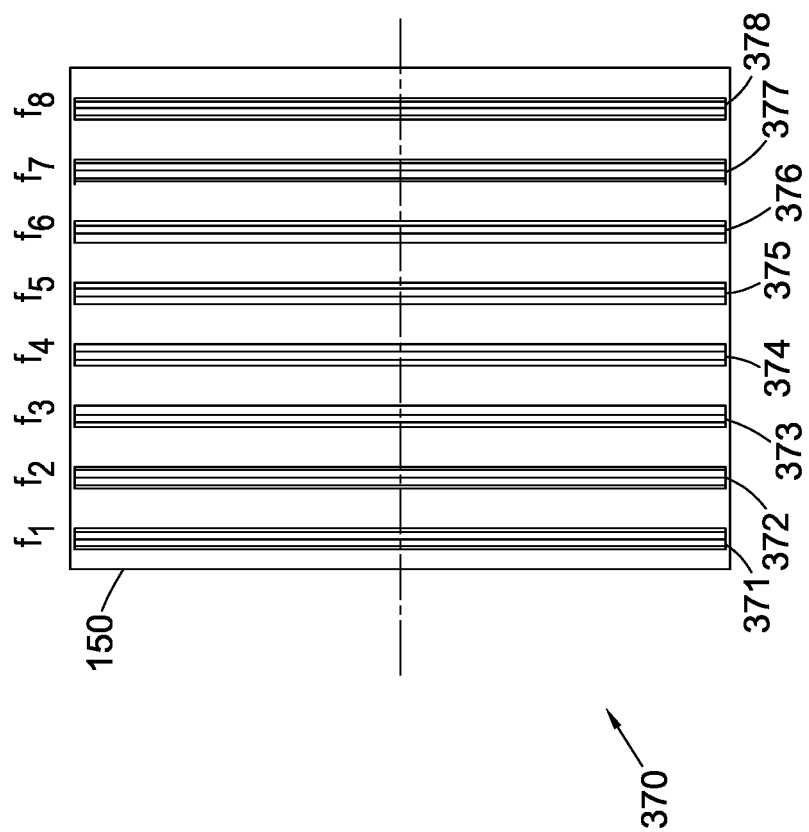
FIG. 7(a) is a schematic of a second alternative plurality of further secondary elements of the system of FIGS. 5(a)-5(c)

A second alternative plurality of further secondary elements 370 is shown in FIG. 7(a). Each further secondary element comprises a corresponding coil of insulated wire 371-378 which is arranged circumferentially around a further base member 150 of a type similar to the base member 50 of the secondary enclosure 35 shown in FIG. 3. Each further secondary element further comprises a corresponding capacitor (not shown) electrically connected between the ends of each wire 371-378. Each further secondary element of the second alternative plurality of further secondary elements 370 is configured such that electromagnetic coupling between the primary element 122 and each further secondary element provides a corresponding measured electrical signal having a characteristic frequency spectrum. In other words, each further secondary element may be configured so as to have a characteristic frequency response. In particular, each further secondary element may be configured so as to have a characteristic resonant feature at a corresponding resonant frequency $f_1$-$f_8$.

The particular combination of resonant frequencies $f_1$-$f_8$ may define a number or code such as a unique identification code for the downhole tool 118. The resonant frequencies $f_1$-$f_8$ may together define a finite set of eight frequencies. The detection of one of the resonant frequencies $f_1$-$f_8$ is indicative of the presence of the corresponding coil of insulated wire 371-378 and may be taken to represent a first binary symbol or a '1'. The absence of one of the resonant frequencies $f_1$-$f_8$ is indicative of the absence of the corresponding coil of insulated wire 371-378 and may be taken to represent a second binary symbol or a '0'. Each resonant frequency may represent a different binary digit of an eight digit binary number permitting decimal numbers from 0 to 255 to be encoded. In principle, therefore, the use of eight further secondary elements may permit up to 256 downhole tools to be identified in a completion string.

In practice, it may be necessary to dedicate one or more of the resonant frequencies $f_1$-$f_8$ or to use additional further secondary elements for checking purposes. For example, an identically configured further secondary element or checking element may be used for every downhole tool in a workstring so that detection of a downhole tool can be positively verified before the downhole tool in question is identified. The use of a checking element in this way may serve to at least partially reduce the risk of any false readings. The use multiple checking elements, for example, checking elements at either end of the plurality of further secondary elements of every downhole tool may further reduce the risk of any false readings. The use of checking elements at either end of the plurality of further secondary elements of every downhole tool may also permit correction for changes in downhole conditions such as downhole temperature and pressure which might cause the resonant frequencies $f_1$-$f_8$ to shift.

Although the coils of wire 371-378 are shown in FIG. 7(a) as being axially separated, one skilled in the art will appreciate that the separation of the coils of wire 371-378 may be greater or less than that shown in FIG. 7(a) and may even be zero so that the coils of wire 371-378 are all located at the same axial position.

A third alternative plurality of further secondary elements 470 is shown in FIG. 7(b). Each further secondary element comprises a corresponding coil of insulated wire 471-478 arranged around a different radial direction relative to a longitudinal axis 136 of the downhole tool 118. Each further secondary element further comprises a corresponding capacitor (not shown) electrically connected between the ends of each wire 471-478. The coils of insulated wire 471-478 are circumferentially distributed around a further base member 150 of a type similar to the base member 50 of the secondary enclosure 35 shown in FIG. 3. The third alternative plurality of further secondary elements 470 of FIG. 7(b) may be more easily manufactured than the second alternative plurality of further secondary elements 370 of FIG. 7(a) because each coil of wire 471-478 may be wound or otherwise formed separately from the base member 150 of the secondary enclosure 135 and then mounted on or attached to the base member 150.

Each further secondary element of the third alternative plurality of further secondary elements 470 is configured such that electromagnetic coupling between the primary element 122 and each further secondary element provides a corresponding measured electrical signal having a characteristic frequency spectrum. In other words, each further secondary element may be configured so as to have a characteristic frequency response. In particular, each further secondary element may be configured so as to have a characteristic resonant feature at a corresponding resonant frequency $f_1$-$f_8$. The particular combination of resonant frequencies $f_1$-$f_8$ may define a number or code such as a unique identification code for the downhole tool 118.

Figure 8A:
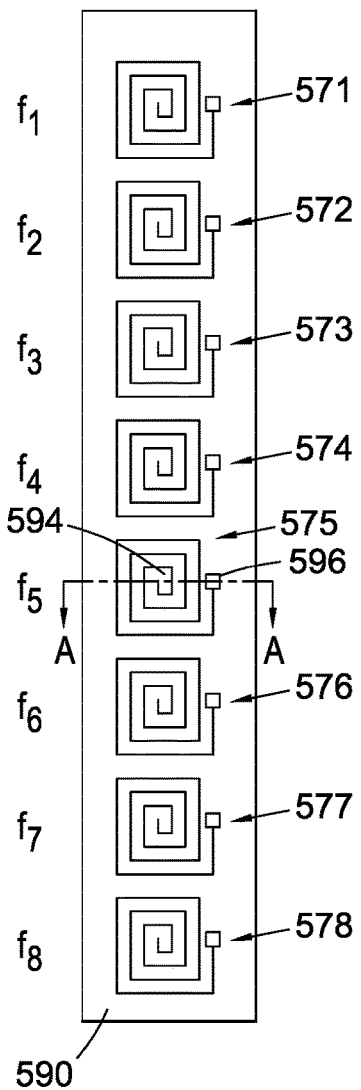
FIG. 8(a) is a schematic of a fourth alternative plurality of further secondary elements of the system of FIGS. 5(a)-5(c) before being mounted around a base member of a secondary enclosure.
Figure 8B:
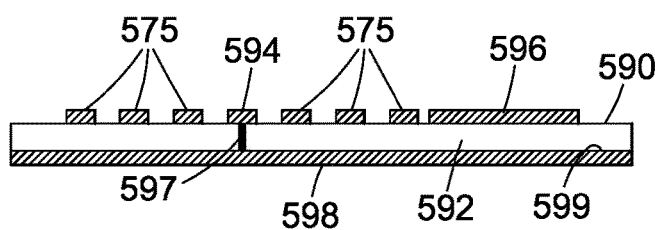
FIG. 8(b) is a cross-section on AA of the fourth alternative plurality of further secondary elements of FIG. 8(a)

A fourth alternative plurality of further secondary elements 570 is shown in FIGS. 8(a) and 8(b) before the further secondary elements 570 are mounted around a further base member (not shown). Each further secondary element comprises a corresponding insulated conductor 571-578 which defines a generally spiral path on a first surface 590 of an electrically insulating substrate 592.

The spiral path of each conductor 571-578 extends from a first end 594 located in the vicinity of a centre of the spiral path to an electrically conductive pad 596 located at a second end. The first end 594 of the conductor 575 is electrically connected by a through conductor 597 which extends through the substrate 592 to an electrically conductive back-plane 598 on a second surface 599 of the substrate 592. The pad 596 and the back-plane 598 may together define a capacitor which is connected between the first and second ends of each conductor 571-578. Such a capacitor may be more robust and may, therefore, be less prone to failure in a hostile downhole environment compared with a surface mount capacitor. Alternatively, depending on the environmental conditions, a surface mount capacitor may be used as this may avoid the need for the through conductor 597 or the back-plane 598.

Moreover, the conductors 571-578, the pad 596 and the back-plane 598 may be formed by printing, painting, depositing or otherwise applying an electrically conductive material to a planar substrate. This may not only improve control of the manufacturing process and therefore enhance the accuracy of the resonant frequency for each further secondary element, but this may also simplify the manufacturing process and reduce manufacturing costs.

The substrate 592 may be sufficiently flexible to permit the substrate 592 and the plurality of further secondary elements 570 defined thereon to be mounted together around a base member (not shown) of a secondary enclosure (not shown) so that each conductor 571-578 is arranged around a different radial direction relative to a longitudinal axis 136 of the downhole tool 118.

Alternatively, if the substrate 592 is rigid or is not sufficiently flexible, then the plurality of further secondary elements 570 may be diced and mounted separately around a further base member (not shown) of a type similar to the base member 50 of the secondary enclosure 35 shown in FIG. 3 so that each conductor 571-578 is arranged around a different radial direction relative to a longitudinal axis 136 of the downhole tool 118.

Once mounted around the further base member, a cover or sleeve is fitted over the further base member to define a further secondary enclosure (not shown) similar to the secondary enclosure 35 shown in FIG. 3. The further secondary enclosure is filled with an epoxy potting compound (not shown) so as to encapsulate the further secondary elements 570 defined on the substrate 592 thereby providing mechanical support to the further secondary enclosure and enhancing the environmental protection provided by the further secondary enclosure to the further secondary elements 570.

The spiral path of each conductor 571-578 and the pad 596 of each conductor are configured such that electromagnetic coupling between the primary element 122 and each further secondary element provides a corresponding measured electrical signal having a characteristic frequency spectrum. In other words, each further secondary element may be configured so as to have a characteristic frequency response. In particular, each further secondary element of the fourth alternative plurality of further secondary elements 570 may be configured so as to have a characteristic resonant feature at a corresponding resonant frequency $f_1$-$f_8$.

Regardless of which plurality of further secondary elements 370, 470 or 570 is used, the characteristic frequency spectrum of one or more of the further secondary elements may be selectively and irreversibly altered by selectively exposing one or more of the further secondary elements to an electromagnetic field of sufficient strength. Such an electromagnetic field may be used to selectively fuse, melt, burn, and/or break an electrical conductor of one or more of the further secondary elements. The one or more of the further secondary elements may be configured for this purpose. For example, the resistivity and/or cross-section of the electrical conductor of the one or more further secondary elements may be selected to fuse, melt, burn, and/or break for electromagnetic field strengths in excess of a predetermined threshold electromagnetic field strength.

Depending on the strength of the electromagnetic field, the characteristic resonant feature may be irreversibly altered, for example irreversibly suppressed or eliminated. This may be used to irreversibly alter a code defined by the resonant frequencies $f_1$-$f_8$ of any of the plurality of further secondary elements 370, 470 or 570.

Figure 9:
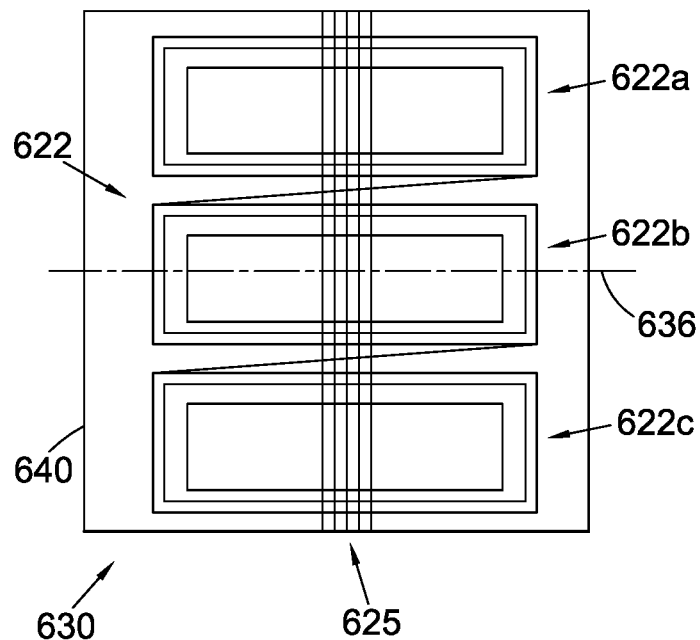
FIG. 9 is a schematic of an alternative primary element and a tertiary element for use in the system of FIGS. 1(a) and 1(b) or the system of FIGS. 5(a)-5(c)

FIG. 9 shows a primary and tertiary element arrangement 630 comprising a primary element 622 and a tertiary element 625 for use in the system 10 of FIGS. 1(a) and 1(b) or the system 110 of FIGS. 5(a)-5(c).

The tertiary element 625 is circumferentially or helically wound around a generally tubular base member 640 and is electrically insulated from the primary element 622.

The primary element 622 comprises a plurality of primary coils 622a, 622b, 622c etc connected electrically in series. Each primary coil 622a, 622b, 622c etc extends around a corresponding axis, each axis arranged along a different radial direction relative to a longitudinal axis 636 of a downhole tool (not shown). Each primary coil 622a, 622b, 622c etc is elongated in a direction along the longitudinal axis 636. The primary coils 622a, 622b, 622c etc are mounted on the base member 640 of a primary enclosure (not shown) of a type similar to the primary enclosure 23 shown in FIG. 2. The primary enclosure is subsequently mounted on the shifting tool 114.

Since the primary coils 622a, 622b, 622c etc are connected electrically in series, when an electrical current is applied to the primary coils 622a, 622b, 622c etc, all of the primary coils 622a, 622b, 622c etc generate respective electromagnetic fields at the same time. One skilled in the art will appreciate that when used with one of the further secondary elements of FIG. 7(b) or FIGS. 8(a) and 8(b), it may be advantageous for the axial extent of the primary coils 622a, 622b, 622c etc to be greater or equal to the axial extent of the coils 471-478 or the conductors 571-578 for improved electromagnetic coupling therebetween. Moreover, the angular separation of the primary coils 622a, 622b, 622c etc around the circumference of the base member 640 upon which the primary coils 622a, 622b, 622c etc are mounted should be selected according to the angular separation of the different conductors of the further secondary elements of FIG. 7(b) or of FIGS. 8(a) and 8(b) so as to avoid the possibility of reduced electromagnetic coupling when the primary coils and the further secondary elements are rotationally misaligned.

In use, a controller (not shown in FIG. 9) such as controller 124 of FIGS. 5(a)-5(c) generates and applies an alternating current (AC) to the primary element 622 on the shifting tool 114 which produces an AC electromagnetic field. When the primary element 622 is electromagnetically coupled to further secondary elements (for example, the coils 471-478 of FIG. 7(b) or the conductors 571-578 of FIGS. 8(a) and 8(b) of the downhole tool 118), an AC current is induced in the further secondary elements 471-478, 571-578. The resonant frequency response of each further secondary element 471-478, 571-578 is imposed upon the AC current induced in the further secondary element. The AC current induced in each further secondary element 471-478, 571-578 produces an AC electromagnetic field which is electromagnetically coupled to the tertiary element 625 on the shifting tool 114. The controller 124 detects the AC current signal received by the tertiary element 625 and monitors the received signal as a function of swept frequency as previously described above with reference to FIGS. 4(a) and 4(b). The generally orthogonal orientation of the axially elongated primary coils 622a, 622b, 622c etc of the primary element 622 and the generally circumferential coil of the tertiary element 625 reduces any cross-coupling of the signal from the primary element 622 directly to the tertiary element 625 without first inducing an AC current in one or more of the further secondary elements 471-478, 571-578. This may improve a signal to noise ratio of the detected signal received at the tertiary element 625, thereby improving measurement sensitivity.

Figure 10:
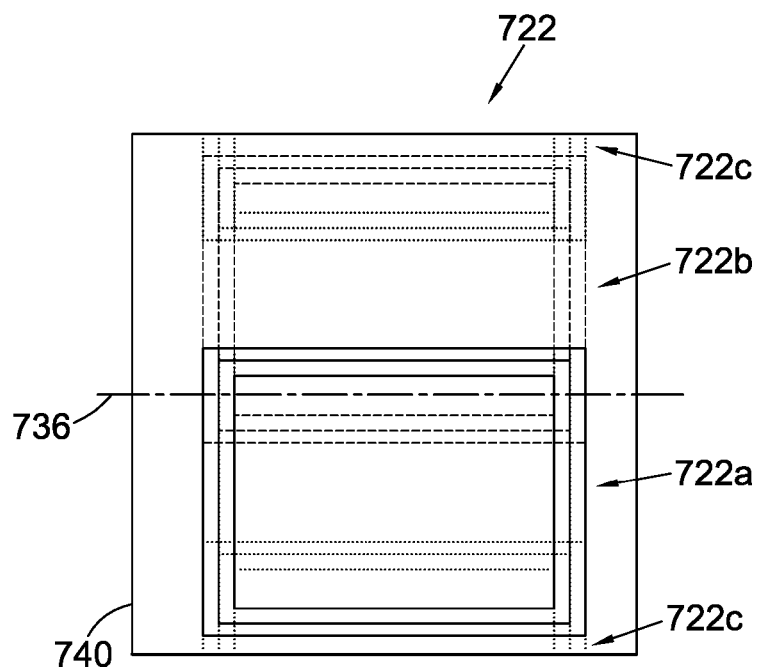
FIG. 10 is a schematic of a plurality of primary elements for use in the system of FIGS. 5(a)-5(c)

FIG. 10 shows a plurality of primary elements 722 for use in the system 10 of FIGS. 1(a) and 1(b) or the system 110 of FIGS. 5(a)-5(c). The plurality of primary elements 722 comprises a first primary element 722a (illustrated using solid lines in FIGS. 10 and 11), a second primary element 722b (illustrated using dashed lines in FIGS. 10 and 11) and a third primary element 722c (illustrated using dotted lines in FIGS. 10 and 11). Each primary element 722a, 722b and 722c is arranged around a base member 740 which defines an axis 736. In use, the axis 736 is aligned co-axially with the axis 36 of system 10 or the axis 136 of system 110.

Each primary element 722a, 722b and 722c comprises a pair of coils which are connected electrically in parallel. Both coils of each primary element 722a, 722b and 722c are located diametrically opposite one another. It should be understood that both coils of the third primary element 722c are visible in FIG. 10 (illustrated using dotted lines) but that only one of the coils of the primary element 722a and only one of the coils of the primary element 722b are visible in FIG. 10.

Figure 11:
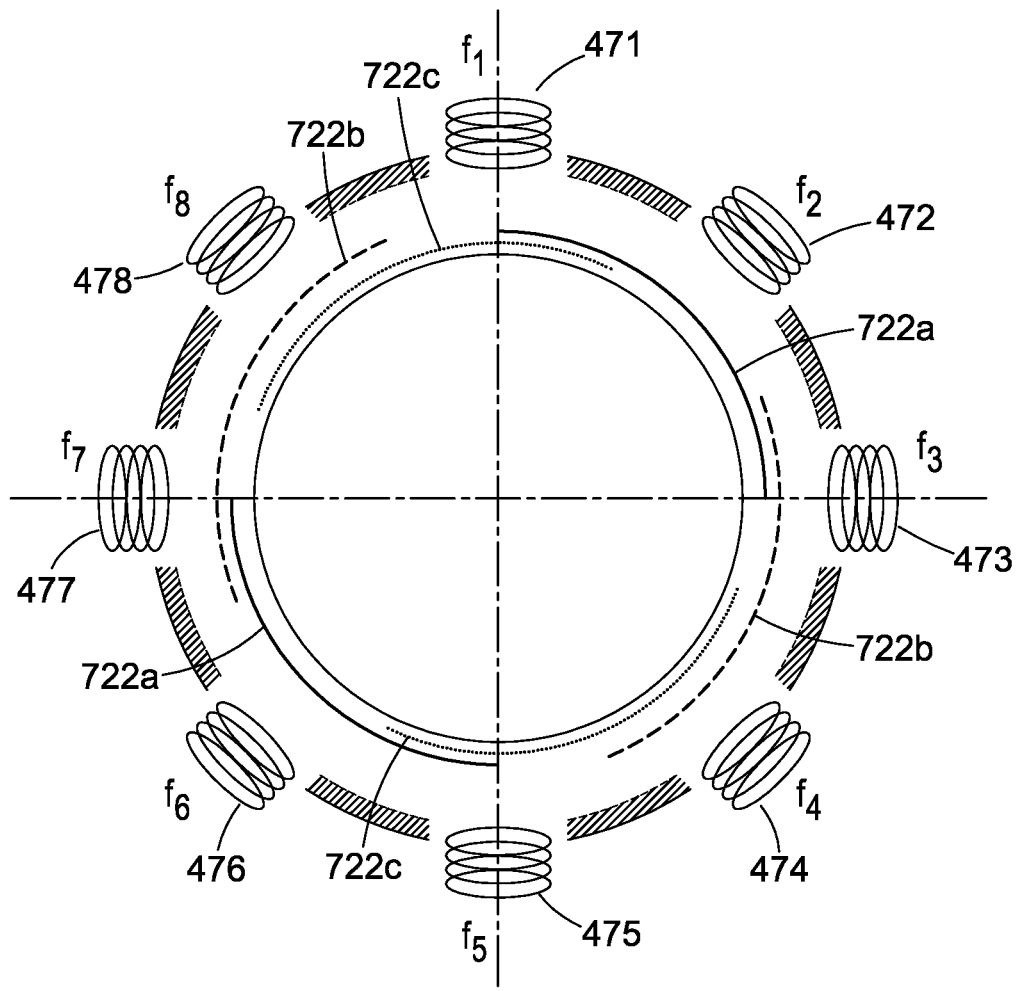
FIG. 11 is a schematic of the plurality of primary elements of FIG. 10 in use in the system of FIGS. 5(a)-5(c) with the third alternative plurality of further secondary elements of FIG. 7(b)

The plurality of primary elements 722 is shown in use in FIG. 11 which represents a cross-section taken perpendicular to the axis 136 of the system 110 when used with the third alternative plurality 470 of further secondary elements 471-478 shown in FIG. 7(b). As shown in FIGS. 10 and 11, the coils of each primary element 722a, 722b and 722c have a circumferential extent of 90° around the body 120 of the shifting tool 114. A coil of each primary element 722a, 722b and 722c overlaps circumferentially with a coil of an adjacent primary element 722a, 722b and 722c by approximately 20°. As will be described in more detail below such an arrangement of primary coils may be used to provide an electromagnetic field which is circumferentially more uniform for coupling to any of the secondary elements 471-478 as the shifting tool 114 is run through the throughbore 116 defined by the downhole tool 118.

In use, an electrical signal is applied to the coils of each primary element 722a, 722b and 722c one at a time to ensure that the electromagnetic field swept circumferentially around the shifting tool 114 and the frequency of the electrical signal is stepped over a desired frequency range which is known to include the resonant frequencies f1-f8 of the secondary elements 471-478 to be detected as the shifting tool 114 is run through the throughbore 116. The frequency step size is selected so as to be smaller than a bandwidth of each of the resonant peaks in the frequency response of the secondary elements 471-478 at the respective resonant frequencies f1-f8.

During a first transmit period, the controller 124 applies an electrical signal at a first frequency to the coils of the first primary element 722a. During a first receive period subsequent to the first transmit period, the controller 124 detects any residual response such as any residual ringing of one of the secondary elements 471-478 present on the coils of the first primary element 722a at the first frequency. The transmit and receive steps are repeated for the first primary element 722a for each frequency in the desired frequency range. The transmit and receive steps are then repeated for each frequency in the desired frequency range for each of the other primary elements 722b and 722c to ensure a sweep of the electromagnetic field both circumferentially around the shifting tool 114 and through the desired frequency range.

In an alternative method, the controller 124 applies an electrical signal at a first frequency to the coils of the first primary element 722a during a first transmit period and detects an electrical signal present on the coils of the first primary element 722a during a first receive period subsequent to the first transmit period. The controller 124 then applies an electrical signal at the first frequency to the coils of the second primary element 722b during a second transmit period and detects an electrical signal present on the coils of the second primary element 722b during a second receive period subsequent to the first transmit period. The transmit and receive steps are repeated for the coils of the third primary element 722c before the frequency is stepped up to the next frequency in the desired frequency range. The process is repeated for each of the primary elements 722a, 722b and 722c at each frequency in the desired frequency range.

One skilled in the art will appreciate that various modifications are possible to the downhole detection systems 10 and 110. For example, rather than comprising a secondary coil 134, the secondary element 133 may comprise a series of rings such as one of the series of rings 170, 270. Although such a secondary element would be covered by the cover sleeve 132 and would not be accessible when the downhole tool 118 is in a de-actuated state, such a secondary element may be used to not only indicate the status of the downhole tool 118, but to also identify the downhole tool 118 after actuation of the downhole tool 118.

One or both of the shifting tools 14, 114 may comprise a further primary element in the form of a further primary coil (not shown) wound around the shifting tool 14, 114. The addition of such a further primary coil may provide redundancy for more accurate and/or more reliable detection of the status and/or identity of a downhole tool 18, 118. Such a further primary coil may also serve as a spare primary coil which may be used in the event of failure of the primary coil 22, 122.

Rather than using eight further secondary elements, more or fewer further secondary elements may be used. This may permit numbers such as identification codes to be associated with a downhole tool which are greater than or less than 255.

Each further secondary element may define a different resonant frequency to every other further secondary element. At least two of the further secondary elements may define the same resonant frequency.

A converse orthogonal arrangement of primary and tertiary elements may be used to that shown in FIG. 9. In such a converse arrangement, the primary and tertiary elements are still mounted on a base member and are still electrically insulated from one another, but it is the primary element that is circumferentially or helically wound around the base member and the tertiary element which comprises a plurality of tertiary coils connected electrically in series. Each tertiary coil extends around a corresponding axis, each axis arranged along a different radial direction relative to a longitudinal axis of the downhole tool. Each tertiary coil is elongated in a direction along the longitudinal axis.

The following description of FIGS. 12-19(*b*), refers to one or more stimulator elements, one or more indicator elements, one or more sensor elements, and one or more further indicator elements. It should understood that each stimulator element may comprise a primary element described with reference to any of FIGS. 1-11, each indicator element may comprise a secondary element as described with reference to any of FIGS. 1-11, each sensor element may comprise a tertiary element as described with reference to any of FIGS. 1-11, and each further indicator element may comprise any further secondary element as described with reference to any of FIGS. 1-11.

Figure 12:
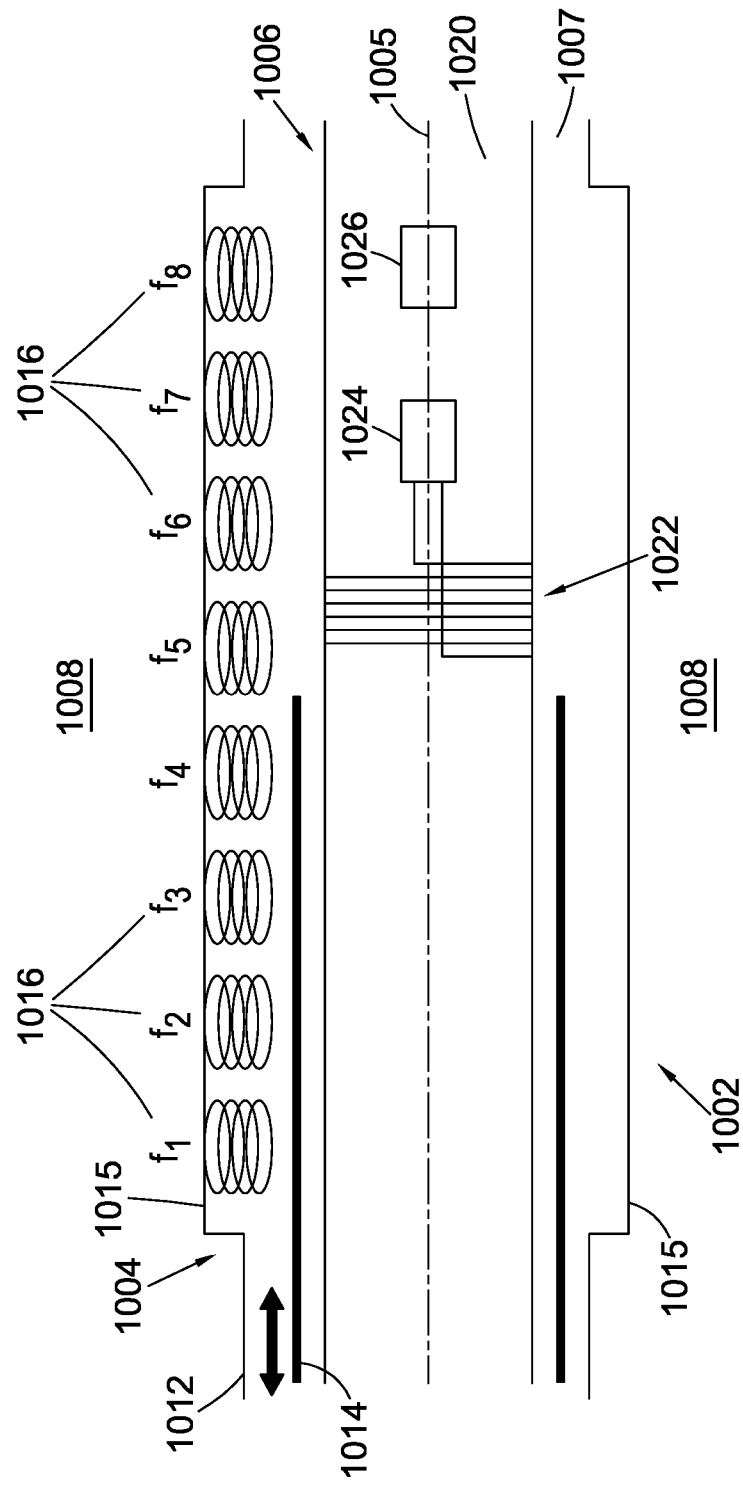
FIG. 12 is a schematic side view of a system for use in determining a relative position of first and second parts of a downhole arrangement.

Referring now to FIG. 12, there is shown a downhole system generally designated 1002 comprising a downhole arrangement in the form of a downhole completion tool generally designated 1004 and a deployable tool in the form of a shifting tool 1006. The completion tool 1004 extends along a longitudinal axis 1005 and defines a through bore 1007 internally thereof. The shifting tool 1006 is deployed within the through bore 1007. The downhole completion tool 1004 is installed adjacent to a hydrocarbon bearing formation 1008. It should be understood that the downhole direction is to the right in FIG. 12. The same is true of FIGS. 13, 14, 16, 18 and 19(*a*).

The downhole completion tool 1004 may be configured to perform various downhole operations. For example, the downhole completion tool 1004 may be used for the purposes of fracturing the formation 1008 and/or controlling the production of hydrocarbon fluids from the formation 1008 into the through bore 1007. Such operations are typically performed by opening or closing flow ports (not shown) of the downhole completion tool 1004 to permit fluid to flow between the formation 1008 and the through bore 1007. The downhole completion tool 1004 comprises a first part in the form of a main body 1012 and a second part in the form of a sleeve 1014 which is configured for sliding relative to the main body 1012. The main body 1012 defines a first set of apertures (not shown). The sleeve 1014 defines a second set of corresponding apertures (not shown). The sliding sleeve 1014 is moveable relative to the main body 1012 until the first and second sets of apertures (not shown) are fully aligned so as to define the flow ports (not shown). To close the flow ports (not shown), the sliding sleeve 1014 is moved until the first and second sets of apertures (not shown) are mis-aligned.

In some applications, it may be desirable to provide a flow restriction on the flow of fluids between the formation 1008 and the through bore 1007. This may require that the first and second sets of apertures (not shown) are only partially aligned. The shifting tool 1006 is deployed within the through bore 1007 on a support member (not shown), such as wireline, slickline, E-line, coiled tubing or the like and, as will be described in more detail below, is used to determine the position of the sliding sleeve 1014 relative to the main body 1012 of the completion tool 1004. This may provide an indication of the degree to which the first and second sets of apertures (not shown) are aligned and, therefore, an indication of the size of flow restriction provided by the flow ports (not shown).

The completion tool 1004 comprises a circumferential recess 1015 which accommodates a plurality of axially distributed indicator elements 1016. Each indicator element 1016 comprises an electrical conductor which defines an electrically conductive path having a plurality of turns or loops. More specifically, each indicator element 1016 comprises a helical coil of wire extending helically around a corresponding axis which is aligned radially relative to the longitudinal axis 1005 of the completion tool 1004. Each indicator element 1016 further comprises a capacitor (not shown) connected between the ends of the corresponding coil of wire. The geometry of the wire coil and the size of the capacitor are selected so as to provide the indicator element 1016 with a characteristic resonant frequency response having a characteristic resonant feature at a predetermined resonant frequency. Each indicator element 1016 is configured to have a different resonant frequency f1-f8 in the frequency range of 100-150 kHz.

The shifting tool 1006 comprises a main body 1020 and a stimulator element in the form of a primary coil 1022 wound circumferentially around an outer diameter of the main body 1020. The shifting tool 1006 further comprises a controller 1024 and a power source 1026 for providing power to the controller 1024. The controller 1024 is electrically connected to the ends of the primary coil 1022. The controller 1024 is configured to generate and apply an alternating current electrical signal to the primary coil 1022 and to measure an electrical signal existing on the primary coil 1022.

In use, the shifting tool 1006 is deployed downhole of the completion tool 1004 and pulled upwardly past the completion tool 1004. The shifting tool 1006 actuates the sliding sleeve 1014 to a position corresponding to a desired flow restriction and the primary coil 1022 and is pulled upwardly past the indicator elements 1016 to determine the relative position of sliding sleeve 1014 relative to the main body 1012 of the completion tool 1004 as will be described in more detail below.

The controller 1024 generates and applies a swept frequency alternating current electrical signal to the primary coil 1022 and monitors the electrical signal existing on the primary coil 1022 as the primary coil 1022 and is pulled upwardly past the indicator elements 1016. The frequency of the alternating current electrical signal applied to the primary coil 1022 is repeatedly swept between 100-150 kHz. As the primary coil 1022 is pulled upwardly past the indicator elements 1016, the controller monitors the frequency spectrum of the electrical signal existing on the primary coil 1022. With reference to the position of the sliding sleeve 1014 relative to the main body 1012 of the completion tool 1004 shown in FIG. 1, as the primary coil 1022 is pulled upwardly past all of the indicator elements 1016, the controller 1024 detects a resonant feature at resonant frequencies f8, f7, f6 and f5. No resonant features are detected at resonant frequencies f4, f3, f2 or f1 because the sliding sleeve 1014 prevents coupling of the magnetic field from the primary coil 1022 to the indicator element 1016 having these resonant frequencies. The controller 1024 is pre-programmed with the predetermined axial distribution of the indicator elements 1016 and subsequently uses this information together with the detected resonant frequencies f8, f7, f6 and f5 to determine the position of the sliding sleeve 1014 relative to the main body 1012 of the completion tool 1004.

Figure 13:
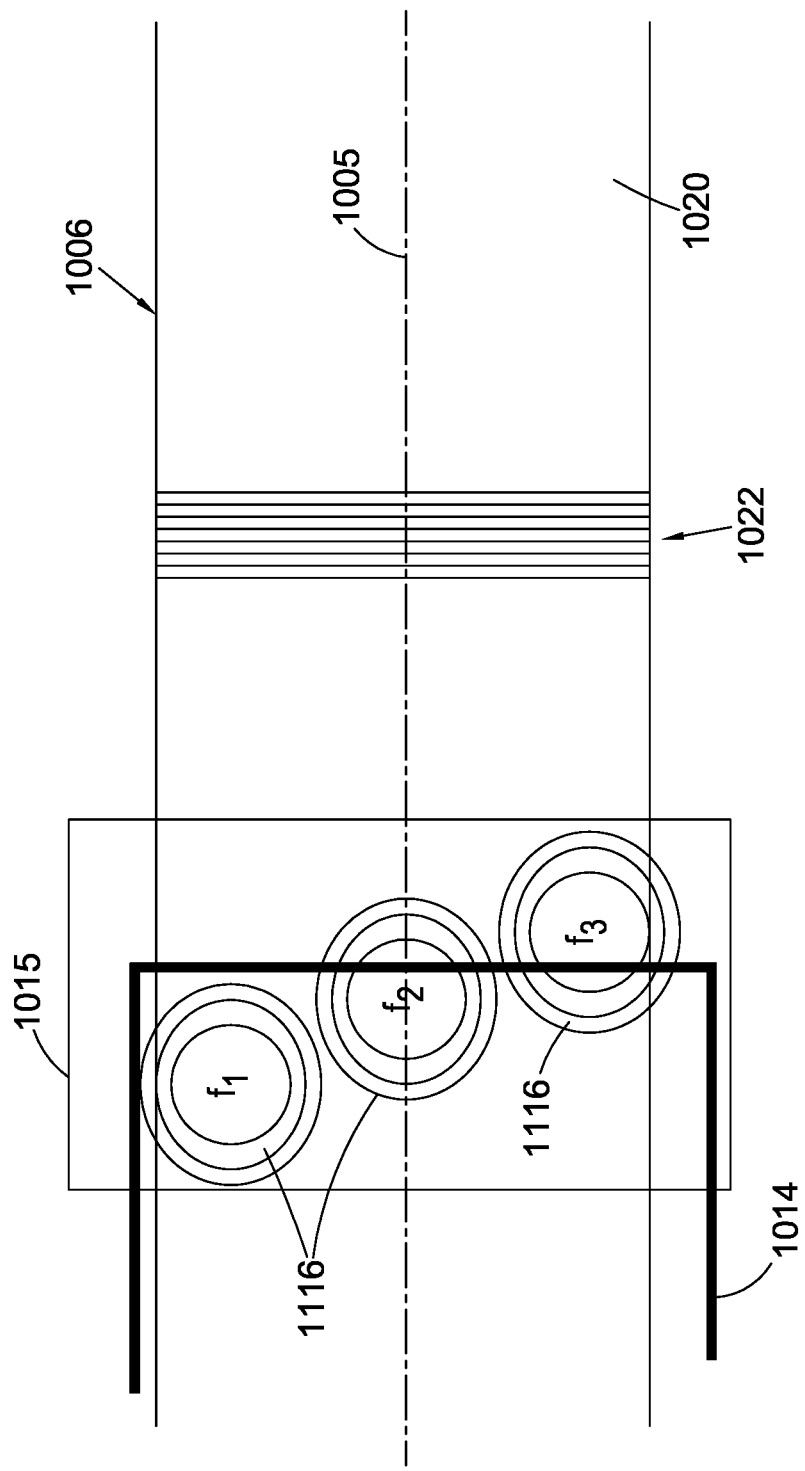
FIG. 13 is a schematic side view of an alternative indicator arrangement for use with the system of FIG. 12.

FIG. 13 shows an alternative arrangement of indicator elements 1116 for use with the system 1002 of FIG. 12. The indicator elements 1116 are identical to the indicator elements 1016 of FIG. 12 in all respects except that the indicator elements 1116 are arranged helically around the through bore 1007 of the completion tool 1004. As shown in FIG. 13, this allows the indicator elements 1116 to be arranged with an axial overlap so as to enhance the resolution of the measurement of the axial position of the sliding sleeve 1014 relative to the main body 1012 of the completion tool 1004 in the axial direction relative to the longitudinal axis 1005.

Figure 14:
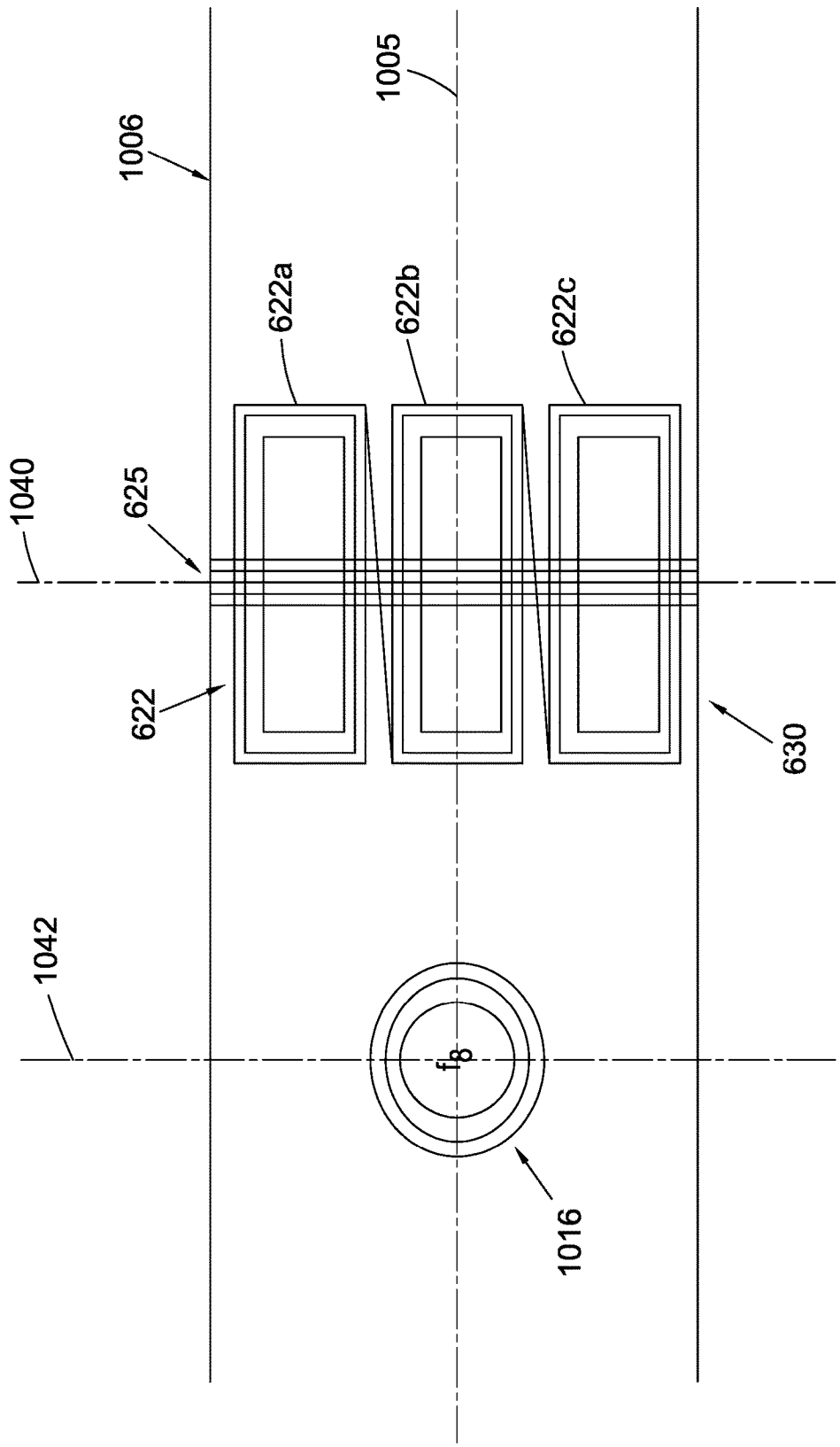
FIG. 14 is a schematic side view showing the primary and tertiary element arrangement of FIG. 9 in use with a single secondary element.

FIG. 14 illustrates the primary and tertiary element arrangement 630 of FIG. 9 in use for stimulating and sensing a single indicator element or secondary element 1016 of the completion tool 1004 of FIG. 12. The primary and tertiary element arrangement 630 is arranged symmetrically about a lateral plane 1040 which is perpendicular to the longitudinal axis 1005 of the completion tool 1004. Similarly, the secondary element 1016 has a resonant frequency f8 and is arranged symmetrically about a lateral plane 1042 which is also perpendicular to the longitudinal axis 1005 of the completion tool 1004. The separation of the lateral planes 1040 and 1042 defines an axial offset between the secondary element 1016 and the primary and tertiary element arrangement 630. It has been discovered that when one of the coils 622a, 622b, 622c of the primary element 622 is aligned axially (zero axial offset) and circumferentially with the secondary element 1016, the resonant feature in the frequency spectrum of the signal measured on the tertiary element 625 by the controller 1024 is suppressed. Moreover, the suppression of the resonant feature is relatively sensitive to the misalignment of the coils 622a, 622b, 622c of the primary element 622 and the secondary element 1016. For coils having a major dimension of the order of several tens of millimeters, the suppression of the resonant feature disappears for misalignments on the order of a few millimeters. The suppression of the resonant feature in the frequency spectrum has been attributed to the inversion of the phase of the electrical signal measured on the tertiary element 625 as the tertiary element 625 passes the secondary element 1016. Such suppression of the resonant feature may provide a relatively high resolution method of determining the position of the sliding sleeve 1014 relative to the main body 1012 of the completion tool 1004.

Figure 15:
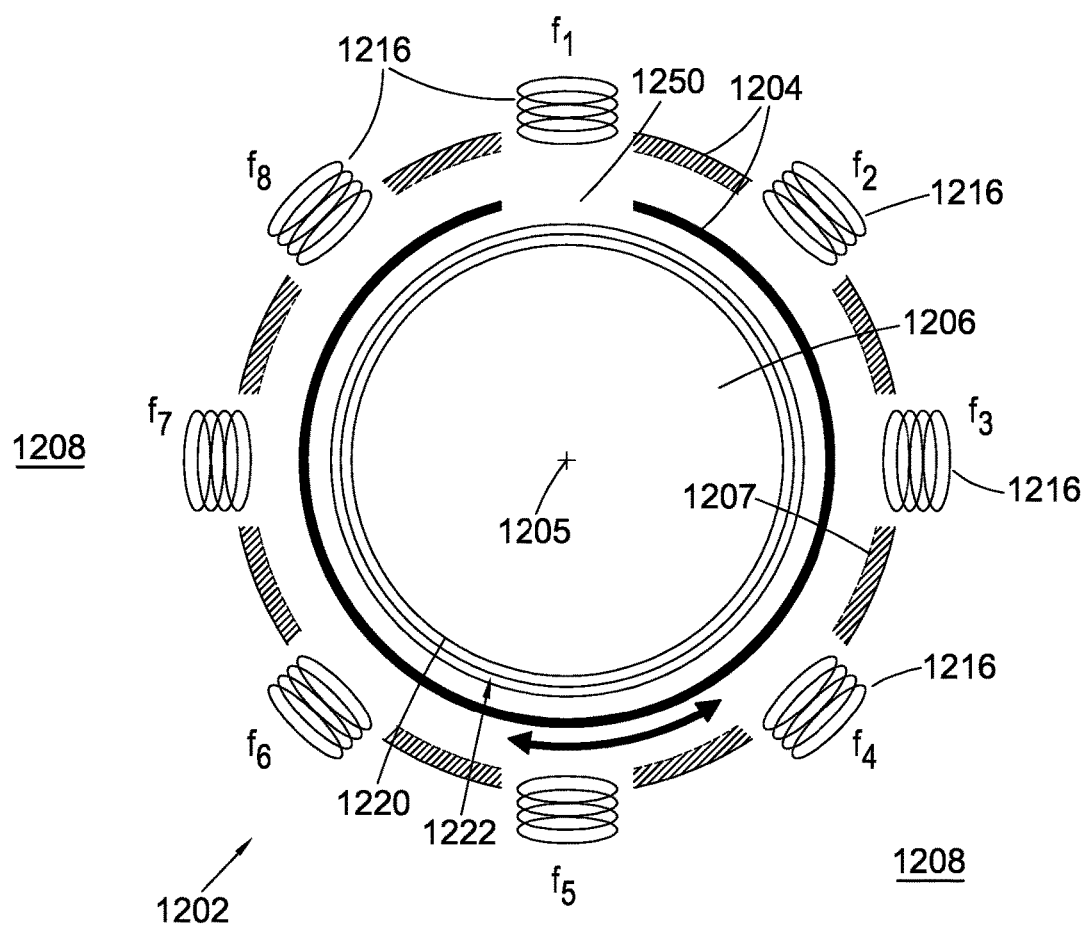
FIG. 15 is a schematic cross-sectional view of a system for use in determining a relative position of first and second parts of a downhole arrangement.

FIG. 15 shows a further downhole system generally designated 1202 comprising a downhole arrangement in the form of a downhole completion tool generally designated 1204 and a deployable tool in the form of a shifting tool 1206. The completion tool 1204 extends along a longitudinal axis 1205 and defines a through bore 1207 internally thereof. The shifting tool 1206 is deployed within the through bore 1207. The downhole completion tool 1204 is installed adjacent to a hydrocarbon bearing formation 1208.

The downhole system 1202 of FIG. 15 shares many like features with the downhole system 1002 of FIG. 12 and, as such, like features share like reference numerals. Like the completion tool 1004 of the system of FIG. 12, the completion tool 1204 of the system 1202 of FIG. 15 comprises a main body 1212 and a sleeve 1214. Unlike the completion tool 1004 of the system of FIG. 12, however, the sleeve 1214 of the completion tool 1204 shown in FIG. 15 rotates relative to the main body 1212 so as to circumferentially align or misalign apertures (not shown) and thereby control flow restriction. The sleeve 1214 defines a transparent window 1250 which extends circumferentially around a portion of the circumference of the sleeve 1214. The shifting tool 1206 comprises a stimulator element in the form of a primary coil 1222 which extends circumferentially around the main body 1220 of the shifting tool 1206.

In use, when the window 1250 is circumferentially aligned between the primary coil 1222 and an indicator element 1216, the controller 1224 (not shown) detects the characteristic resonant feature and determines the relative alignment of the sleeve 1214 relative to the main body 1212 from the frequency of the detected resonant feature and from knowledge of the circumferential distribution of the indicator elements 1216.

Figure 16:
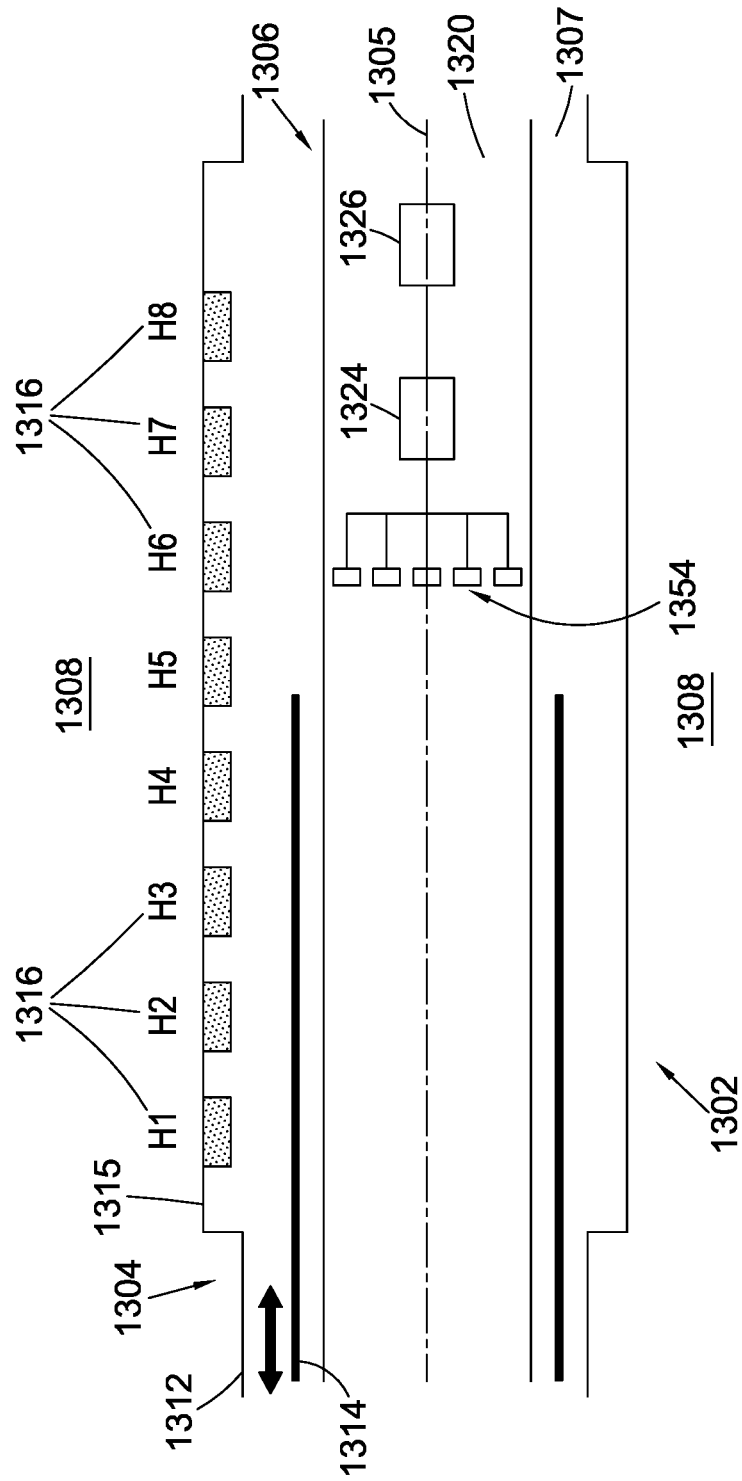
FIG. 16 is a schematic side view of a system for use in determining a relative position of first and second parts of a downhole arrangement.

FIG. 16 shows a downhole system generally designated 1302 comprising a downhole arrangement in the form of a downhole completion tool generally designated 1304 and a deployable tool in the form of a shifting tool 1306. The completion tool 1304 extends along a longitudinal axis 1305 and defines a through bore 1307 internally thereof. The shifting tool 1306 is deployed within the through bore 1307. The downhole completion tool 1304 is installed adjacent to a hydrocarbon bearing formation 1308.

The downhole system 1302 of FIG. 16 shares many like features with the downhole system 1002 of FIG. 12 and, as such, like features share like reference numerals. Like the completion tool 1004 of the system of FIG. 12, the completion tool 1304 of the system 1302 of FIG. 16 comprises a main body 1312 and a sleeve 1314. Unlike the completion tool 1004 of the system of FIG. 12, however, the downhole system 1302 of FIG. 16 comprises a plurality of indicator elements in the form of a plurality of permanent magnets 1316, wherein each magnet 1316 is configured so as to provide a different or a distinctive magnetic field H1-H8 to every other magnet 1316. The magnets 1316 may be configured differently for this purpose. For example, the magnets 1316 may be structurally identical but oriented differently. Some of the magnets 1316 may have a north pole directed towards the through bore 1307 and some of the magnets 1316 may have a south pole directed towards the through bore 1307. Each magnet 1316 may have a different magnetic attenuator (not shown) inserted between the magnet 1316 and the through bore 1307. Each magnet 1316 may have a different sized aperture (not shown) inserted between the magnet 1316 and the through bore 1307. Unlike the shifting tool 1006 of FIG. 12, the shifting tool 1306 does not comprise a stimulator element of any kind. Unlike the shifting tool 1006 of FIG. 12, the shifting tool 1306 of FIG. 16 comprises a sensor arrangement in the form of a circumferentially distributed plurality of magnetic field sensor elements in the form of a circumferentially distributed plurality of Hall effect sensors 1354.

In use, as the shifting tool 1306 is pulled upwardly, the Hall effect sensors 1354 move past the magnets 1316. From knowledge of the axial distribution of the magnets 1316 and from the magnetic filed measurements provided by the Hall effect sensors 1354, the controller 1324 may determine the position of the sliding sleeve 1314 relative to the main body 1312 of the completion tool 1304.

Figure 17:
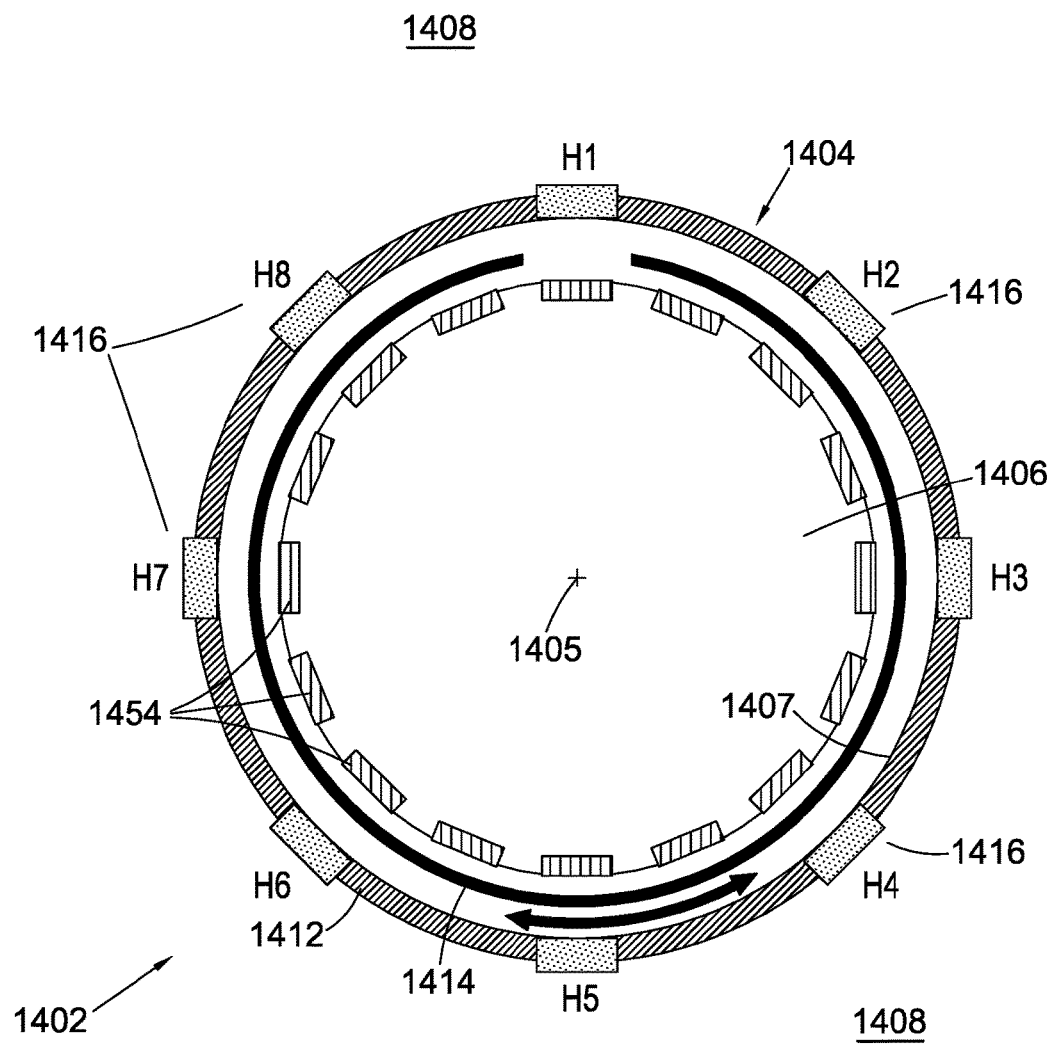
FIG. 17 is a schematic cross-sectional view of a system for use in determining a relative position of first and second parts of a downhole arrangement.

FIG. 17 shows a downhole system generally designated 1402 comprising a downhole arrangement in the form of a downhole completion tool generally designated 1404 and a deployable tool in the form of a shifting tool 1406. The completion tool 1404 extends along a longitudinal axis 1405 and defines a through bore 1407 internally thereof. The shifting tool 1406 is deployed within the through bore 1407. The downhole completion tool 1404 is installed adjacent to a hydrocarbon bearing formation 1408. The completion tool 1404 comprises a main body 1412 and a sleeve 1314 which is rotatable relative to the main body 1412. Like the system 1302 of FIG. 16, the system 1402 of FIG. 17 relies upon a plurality of magnets 1416, wherein each magnet 1416 provides a different magnetic field to every other magnet 1416. The shifting tool 1406 comprises a plurality of circumferentially distributed Hall effect sensors 1454.

In use, as the shifting tool 1406 is pulled upwardly, the Hall effect sensors 1454 move past the magnets 1416. From knowledge of the circumferential distribution of the magnets 1416 and from the magnetic field measurements provided by the Hall effect sensors 1454, the controller (not shown) may determine the position of the rotatable sleeve 1414 relative to the main body 1412 of the completion tool 1404.

FIG. 18 shows a downhole system generally designated 1502 comprising a downhole arrangement in the form of a downhole completion tool generally designated 1504 and a deployable tool in the form of a shifting tool 1506. The completion tool 1504 extends along a longitudinal axis 1505 and defines a through bore 1507 internally thereof. The shifting tool 1506 is deployed within the through bore 1507. The downhole completion tool 1504 is installed adjacent to a hydrocarbon bearing formation 1508. The completion tool 1504 comprises a first part 1512 and a second part 1514 which is rotatable relative to the first part 1512 so as to adjust a degree of flow restriction provided by the completion tool 1504. As shown in FIG. 18, the completion tool 1504 only comprises two indicator elements 1516. A first indicator element in the form of a coil and capacitor (not shown) having a first resonant frequency f1 is mounted on the first part 1512 of the completion tool 1504. A second indicator element in the form of a coil and capacitor (not shown) having a second resonant frequency f2 is mounted on the second part 1514 of the completion tool 1504.

The shifting tool 1506 comprises a plurality 1532 of stimulator elements in the form of a plurality of circumferentially distributed coils 1534 which are electrically insulated from one another. The stimulator elements 1534 are independently electrically connected to the controller (not shown). The shifting tool 1506 further comprises a sensor element in the form of a coil 1533 which extends circumferentially around the shifting tool 1506. The coil 1533 is also independently electrically connected to the controller (not shown).

In use, as the shifting tool 1506 is pulled upwardly, the stimulator elements 1534 move past the indicator elements 1516. The controller (not shown) sequentially stimulates each of the different stimulator elements 1534 with a swept frequency electrical signal until magnetic coupling with the second indicator element having the second resonant frequency f2 occurs. The controller then records the stimulator element used for the detection of the resonant frequency f2. The shifting tool 1506 continues upwardly until magnetic coupling with the first indicator element having the first resonant frequency f1 occurs. The controller then records the stimulator element used for the detection of the resonant frequency f1. From knowledge of the circumferential distribution of the stimulator elements 1534 and from the recorded stimulator elements used for the detection of the resonant frequencies f1 and f2, the controller determines the relative rotational positions of the first and second parts 1512 and 1514 of the completion tool 1504.

In a variant (not shown) of the system 1502 of FIG. 18 for measuring the relative linear position between first and second parts of a completion tool, the completion tool may comprise a mechanical arrangement which converts relative linear motion between the first and second parts into rotational motion of part 1514 relative to part 1512. For example, the completion tool may comprise a helical groove and pin arrangement (not shown) for this purpose.

Figures 19A, 19B:
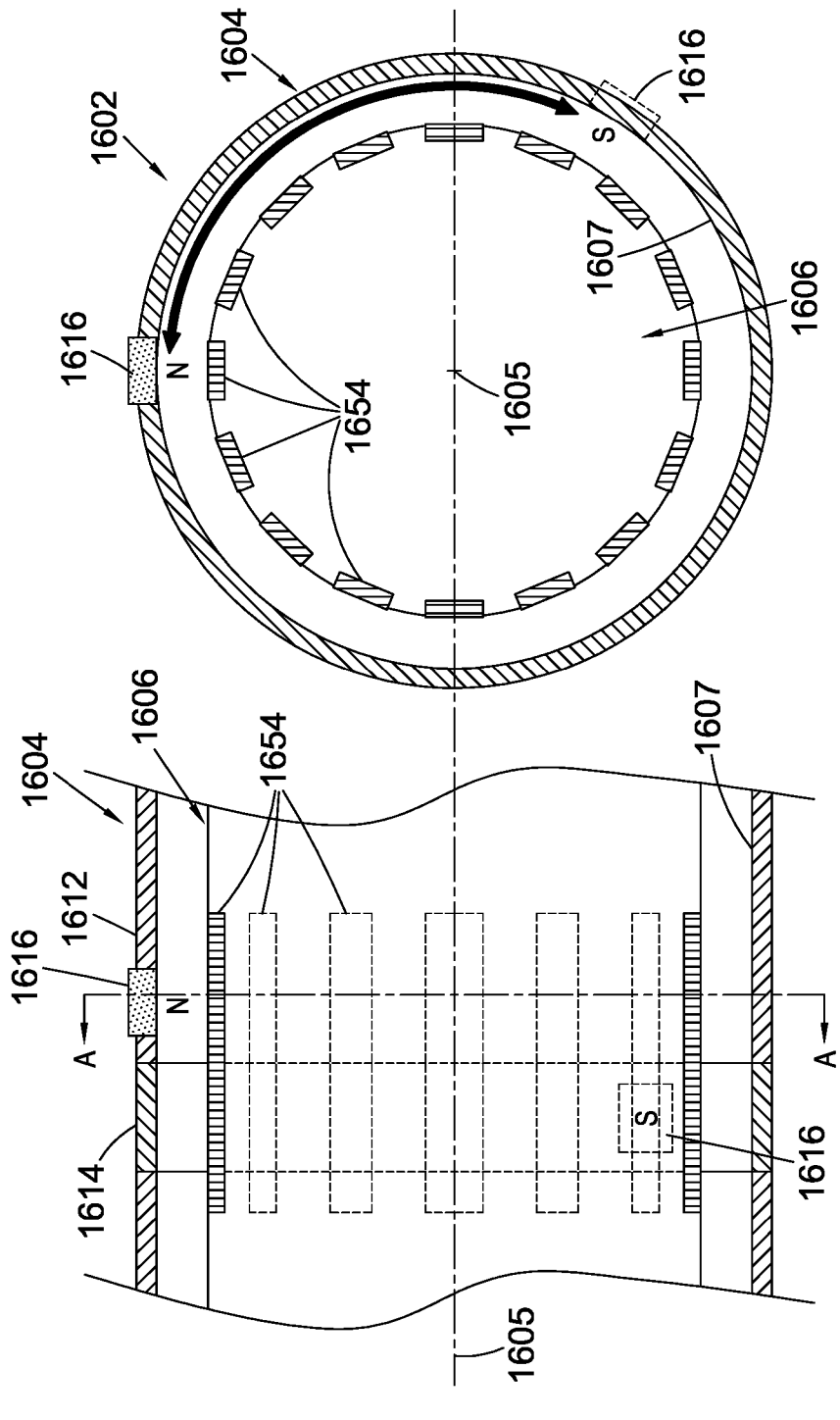
FIG. 19(a) is a schematic side view of a system for use in determining a relative position of first and second parts of a downhole arrangement.
FIG. 19(b) is a schematic cross-section on AA of the system of FIG. 19(a)

FIGS. 19(*a*) and 19(*b*) show a downhole system generally designated 1602 comprising a downhole arrangement in the form of a downhole completion tool generally designated 1604 and a deployable tool in the form of a shifting tool 1606. The completion tool 1604 extends along a longitudinal axis 1605 and defines a through bore 1607 internally thereof. The shifting tool 1606 is deployed within the through bore 1607. The downhole completion tool 1604 is installed adjacent to a hydrocarbon bearing formation 1608. The completion tool 1604 comprises a first part 1612 and a second part 1614 which is rotatable relative to the first part 1612 so as to adjust a degree of flow restriction provided by the completion tool 1604. As shown in FIG. 19, the completion tool 1604 only comprises two indicator elements 1616. A first indicator element 1616 is mounted on the first part 1612 of the completion tool 1604 and takes the form of a first permanent magnet having its north pole directed towards the through bore 1607. A second indicator element 1616 is mounted on the second part 1614 of the completion tool 1606 and takes the form of a second permanent magnet having its south pole directed towards the through bore 1607.

The shifting tool 1606 comprises a circumferentially distributed array of Hall effect sensors 1654. Each of the Hall effect sensor 1654 are independently electrically connected to the controller (not shown).

In use, as the shifting tool 1606 is pulled upwardly, the controller (not shown) sequentially monitors the magnetic field strength around the circumference of the shifting tool 1606 using the Hall effect sensors 1654 until a magnetic field is detected from the N pole. The controller then records the Hall effect sensor 1654 which detected the N pole. The shifting tool 1606 continues upwardly until a magnetic field is detected from the S pole. The controller then records the Hall effect sensor 1654 which detected the S pole. From knowledge of the circumferential distribution of the Hall effect sensors 1654 and from the Hall effect sensors which detected the N and S poles, the controller determines the relative rotational positions of the first and second parts 1612 and 1614 of the completion tool 604. The system 1602 is particularly advantageous because it only requires permanent magnets to be located downhole with the completion tool 1604.

In a variant (not shown) of the system 1602 of FIG. 19 for measuring the relative linear position between first and second parts of a completion tool, the completion tool may comprise a mechanical arrangement which converts relative linear motion between the first and second parts into rotational motion of part 1614 relative to part 1612. For example, the completion tool may comprise a helical groove and pin arrangement (not shown) for this purpose.

One skilled in the art will understand that various modifications of the systems of FIGS. 12 to 19(*b*) are possible without departing from the scope of the present invention. For example, the indicator elements 1016 shown in FIG. 12 may extend circumferentially around the through bore 1007. The number of stimulator elements, the number of indicator elements and/or the number of sensor elements may be greater or fewer than illustrated in FIGS. 12 to 19(*b*). Rather than only using one indicator element 1516 on each part 1512, 1514 of the completion tool 1504 of FIG. 18, more than one indicator element 1516 may be used on each part 1512, 1514, wherein each indicator element 1516 has a different resonant frequency.

One skilled in the art will understand that various modifications of any of the systems of FIGS. 1 to 19(*b*) are possible without departing from the scope of the present invention. For example, with reference to the system 10 of FIGS. 1(*a*) and 1(*b*) and the system 110 of FIGS. 5(*a*)-5(*c*), rather than the primary element 22, 122, the controller 24, 124 and the power supply 26, 126 being located on the shifting tool 14, 114 and the secondary element 34, 134, and/or the further secondary element 170 being located on the downhole tool 18, 118, the primary element 22, 122, the controller 24, 124 and the power supply 26, 126 may be located on the downhole tool 18, 118 and the secondary element 34, 134, and/or the further secondary element 170 may be located on the shifting tool 14, 114.

In a further alternative variant shown in FIGS. 20(*a*) and 20(*b*), primary elements 1722*a*, 1722*b* and 1722*c* etc, a controller 1724 and a power supply 1726 may be located on a downhole tool 1718 and a plurality of secondary elements 1734 may be mounted on a carrier 1714 which is run, dropped, pumped or otherwise conveyed along a throughbore 1716 defined by the downhole tool 1718. It should be appreciated that, in the interests of clarity, only primary element 1722*b* is shown in FIG. 20(*a*). Like the primary elements 722*a*, 722*b* and 722*c* etc described with reference to FIGS. 10 and 11, the primary elements 1722*a*, 1722*b* and 1722*c* etc each comprise a pair of diametrically opposed, parallel connected coils. The operation of the primary elements 1722*a*, 1722*b* and 1722*c* is identical to the operation of the primary elements 722*a*, 722*b* and 722*c* etc described with reference to FIGS. 10 and 11. The carrier 1714 may comprise a head portion 1714*a* and an elongated body portion 1714*b*. As a consequence of this configuration of the carrier 1714, the secondary elements 1734 may adopt a preferred orientation relative to the throughbore 1716 of the downhole tool 1718 when conveyed by a fluid flowing along the throughbore 1716. This may serve to improve the coupling of an electromagnetic field between the primary elements 1722*a*, 1722*b* and 1722*c* etc located on the downhole tool 1718 and the secondary elements 1734. The secondary elements 1734 may also be encapsulated for mechanical and/or environmental protection. In such a further alternative variant, the secondary elements 1734 may provide the function of a tag which may be provided from surface. However, unlike an RFID tag which incorporates active electronics, the carrier 1714 and the secondary elements 1734 would be electronically passive and would therefore be more robust and more reliable in a high temperature environment. It should be understood that other primary element arrangements may also be used in connection with the carrier 1714 and the secondary elements 1734. For example, there may be more or fewer primary elements than shown in FIGS. 20(*a*) and 20(*b*). There may be only one primary element. The one or more primary elements may be oriented differently. For example, the one or more primary elements may extend circumferentially or helically around the throughbore 1716.

The invention claimed is:

1. A system for use in downhole communication or detection, the system comprising:
   a downhole arrangement defining a throughbore;
   a primary element; and
   a plurality of secondary elements,
   wherein one of the primary element and the plurality of secondary elements is provided on the downhole arrangement and the other of the primary element and the plurality of secondary elements is provided in the throughbore,
   wherein the primary element and each of the secondary elements are configurable for coupling of an electromagnetic field therebetween, and wherein each secondary element extends around a different axis, each axis arranged along a different radial direction relative to a longitudinal axis of the downhole arrangement.

2. A system according to claim 1, wherein each secondary element has a geometry and/or is formed from one or more materials selected to provide the electromagnetic field coupled between the primary element and the secondary elements with one or more characteristic features, or wherein each secondary element is configured so as to have a characteristic frequency response or a characteristic time-variant response, or wherein each secondary element is electronically passive.

3. A system according to claim 1, wherein the electromagnetic field comprises a magnetic and/or an electric field; or wherein the electromagnetic field comprises a time-varying magnetic field; or wherein the electromagnetic field has a frequency in the range of 10 kHz to 1 MHz, 50 kHz to 500 kHz, or 100 kHz to 150 kHz.

4. A system according to claim 1, comprising a deployable tool, wherein the primary element is provided on one of the downhole arrangement and the deployable tool and each secondary elements are provided on the other of the downhole arrangement and the deployable tool.

5. A system according to claim 1, wherein the primary element comprises an insulated conductor; or wherein the primary element comprises an electrically conductive turn, loop, coil or ring; or wherein the primary element comprises a plurality of electrically conductive turns, loops, coils or rings.

6. A system according to claim 1, wherein each secondary element comprises an insulated conductor; or wherein each secondary element comprises an electrically conductive turn, loop, coil or ring; or wherein each secondary element comprises a plurality of electrically conductive turns, loops, coils or rings.

7. A system according to claim 1, wherein each secondary element is configured to be selectively altered; or wherein each secondary element is configured to be irreversibly altered; or wherein each secondary element is configured to allow selective alteration of a frequency and/or time-variant response of the secondary element; or wherein each secondary element is configured to be selectively altered by melting, fusing, burning and/or breaking of each secondary element; or wherein each secondary element is configured to be selectively altered on coupling an electromagnetic field of sufficient strength with each secondary element.

8. A system according to claim 1, wherein the configuration of each secondary element is selected from a finite set of different secondary element configurations.

9. A system according to claim 1, wherein each secondary element is formed on a common substrate; or wherein each secondary element comprises a corresponding electrically conductive path or track defined on a flexible electrically insulating substrate which extends around the throughbore of the downhole arrangement; or wherein each secondary element comprises a corresponding capacitance defined by, or mounted on, the substrate.

10. A system according to claim 1, comprising a plurality of primary elements.

11. A system according to claim 1, comprising a controller configured to generate and apply an electrical signal to the primary element, measure an electrical signal existing on the primary element and determine a degree of coupling of the electromagnetic field between the primary element and each secondary element from the measured electrical signal.

12. A system according to claim 1, comprising a tertiary element provided with the primary element, wherein the tertiary element is electrically independent of the primary element.

13. A system according to claim 12, wherein the primary and tertiary elements are orthogonally oriented; or wherein the primary element comprises a plurality of turns, loops, coils or rings, each turn, loop, coil or ring of the primary element extends around a different axis, each axis is arranged along a different radial direction relative to a longitudinal axis of the downhole arrangement, each turn, loop, coil or ring is elongated along a direction parallel to the longitudinal axis, and the tertiary element extends circumferentially or helically relative to the longitudinal axis; or wherein the system comprises a controller configured to generate and apply an electrical signal to the primary element, measure an electrical signal existing on the tertiary element and determine a degree of electromagnetic coupling between the primary element and each secondary element from the measured electrical signal.

14. A system according to claim 1, wherein the downhole arrangement is configurable between a first configuration in which coupling of the electromagnetic field between the primary element and each secondary element is prevented and a second configuration in which coupling of the electromagnetic field between the primary element and each secondary element is permitted.

15. A system according to claim 1, comprising a plurality of further secondary elements, the primary element and each of the further secondary elements being configurable for coupling of an electromagnetic field therebetween.

16. A system according to claim 15, wherein each of the further secondary elements are accessible for coupling of an electromagnetic field thereto from the primary element regardless of a status of the downhole arrangement; or wherein the plurality of further secondary elements is configured for location downhole of the secondary element.

17. A system according to claim 1, wherein each secondary element is electronically passive.

18. A system for use in downhole communication or detection, the system comprising:
   a downhole arrangement defining a throughbore;
   a primary element; and
   a secondary element,
   wherein one of the primary and secondary elements is provided on the downhole arrangement and the other of the primary and secondary elements is provided in the throughbore, and the primary and secondary elements are configurable for coupling of an electromagnetic field therebetween;
   wherein the downhole arrangement is configurable between a first configuration in which coupling of the electromagnetic field between the primary and secondary elements is prevented and a second configuration in which coupling of the electromagnetic field between the primary and secondary elements is permitted;
   wherein the downhole arrangement comprises a cover member, each secondary element is arranged radially outwardly of the cover member relative to a longitudinal axis of the throughbore of the downhole arrangement, and each secondary element and the cover member are moveable relative to one another; and
   wherein the cover member extends at least partially between the secondary element and the throughbore of the downhole arrangement in the first configuration and the cover member is at least partially withdrawn from between the secondary element and the throughbore of the downhole arrangement in the second configuration.

19. A system for use in downhole communication or detection comprising:
- a downhole arrangement defining a throughbore;
- a primary element; and
- a plurality of secondary elements,
- wherein one of the primary element and the plurality of secondary elements is provided on the downhole arrangement and the other of the primary element and the plurality of secondary elements is provided in the throughbore, and the primary element and each of the secondary elements are configurable for coupling of an electromagnetic field therebetween,
- wherein each secondary element is unconnected electrically to the other secondary elements,
- wherein each secondary element is configured so as to provide the electromagnetic field coupled between the primary and each secondary element with one or more characteristic features, and
- wherein each secondary element extends around a different axis, each axis arranged along a different radial direction relative to a longitudinal axis of the downhole arrangement.

* * * * *